United States Patent [19]
Kuki et al.

[11] Patent Number: 5,821,731
[45] Date of Patent: Oct. 13, 1998

[54] CONNECTION SYSTEM AND CONNECTION METHOD FOR AN ELECTRIC AUTOMOTIVE VEHICLE

[75] Inventors: Heiji Kuki; Sho Miyazaki; Tsutomu Tanaka; Kunihiko Watanabe; Shuichi Kanagawa, all of Yokkaichi; Tomohiro Keishi, Osaka; Hiroshige Deguchi, Osaka; Shuji Arisaka, Osaka, all of Japan

[73] Assignee: Sumitomo Wiring Systems, Ltd., Japan

[21] Appl. No.: 791,110

[22] Filed: Jan. 30, 1997

[30] Foreign Application Priority Data

| Jan. 30, 1996 | [JP] | Japan | 8-014032 |
|---|---|---|---|
| Feb. 2, 1996 | [JP] | Japan | 8-017486 |
| Apr. 3, 1996 | [JP] | Japan | 8-081750 |
| Jul. 22, 1996 | [JP] | Japan | 8-192187 |

[51] Int. Cl.$^6$ ............................................. H02J 7/00
[52] U.S. Cl. ............................................. 320/108; 320/109
[58] Field of Search ............................. 320/108, 109

[56] References Cited

U.S. PATENT DOCUMENTS

| 4,347,472 | 8/1982 | Lemelson | 320/109 |
|---|---|---|---|
| 5,216,402 | 6/1993 | Carosa . | |
| 5,272,431 | 12/1993 | Nee . | |
| 5,341,083 | 8/1994 | Klontz et al. | 320/108 |
| 5,461,298 | 10/1995 | Lara et al. | 320/109 |
| 5,498,948 | 3/1996 | Bruni et al. . | |
| 5,523,666 | 6/1996 | Hoelzl et al. | 320/109 |
| 5,614,808 | 3/1997 | Konoya et al. | 320/109 |
| 5,617,003 | 4/1997 | Odachi et al. | 320/108 |
| 5,654,621 | 8/1997 | Seelig | 320/108 |

FOREIGN PATENT DOCUMENTS

| 0 586 315 | 3/1994 | European Pat. Off. . |
|---|---|---|
| 60-24539 | 6/1985 | Japan . |
| WO 94/09544 | 4/1994 | WIPO . |
| WO 94/28560 | 12/1994 | WIPO . |
| WO 95/22191 | 8/1995 | WIPO . |

OTHER PUBLICATIONS

Patent Abstracts of Japan—vol. 7, No. 163 (M–229), 16 Jul. 1983 & JP 58 069404.
Patent Abstracts of Japan—vol. 18, No. 663 (M–1723), 14 Dec. 1994 & JP 06 261423.
Patent Abstracts of Japan—vol. 18, No. 157 (E–1058), 19 Apr. 1991 & JP 03 027732.
Patent Abstracts of Japan—vol. 16, No. 245 (M–1260), 4 Jun. 1992 & JP 04 054805.
"Hands Free Electric Vehicle Charging System"—No. 338, Jun. 1992—p. 517.
"Hands Free Electric Vehicle Charging System"'No. 338, Jun. 1992—p. 482.

*Primary Examiner*—Peter S. Wong
*Assistant Examiner*—K. Shin
*Attorney, Agent, or Firm*—Anthony J. Casella; Gerald E. Hespos; Ludomir A. Budzyn

[57] ABSTRACT

A connection system and connection method for easily charging an electric automotive vehicle are provided. A secondary coil 20 connected with a battery 21 is provided at the bottom of a body of an electric automotive vehicle E. On the other hand, a recess A is formed in the ground of a parking lot, and a coil moving device 30 for movably supporting a primary coil 10 is installed in the recess A. Three magnetic sensors 50 are provided on a body 40 of the coil moving device 30. Further, power supply circuits 13*a* to 13*e* provided in an external power supply equipment 11 at the back of the parking lot and a main controller 12 supply power to the primary coil 10, magnetic sensors 50 and coil moving device 30 and control them. In order to charge the battery 21, the vehicle E is parked, straddling the recess A, and the secondary coil 20 is excited. Then, the magnetic sensors 50 detect the position of the secondary coil 20, and the main controller 12 drives the coil moving device 30 to guide the primary coil 10 to a position where both coils 10, 20 are to be electromagnetically coupled.

15 Claims, 47 Drawing Sheets

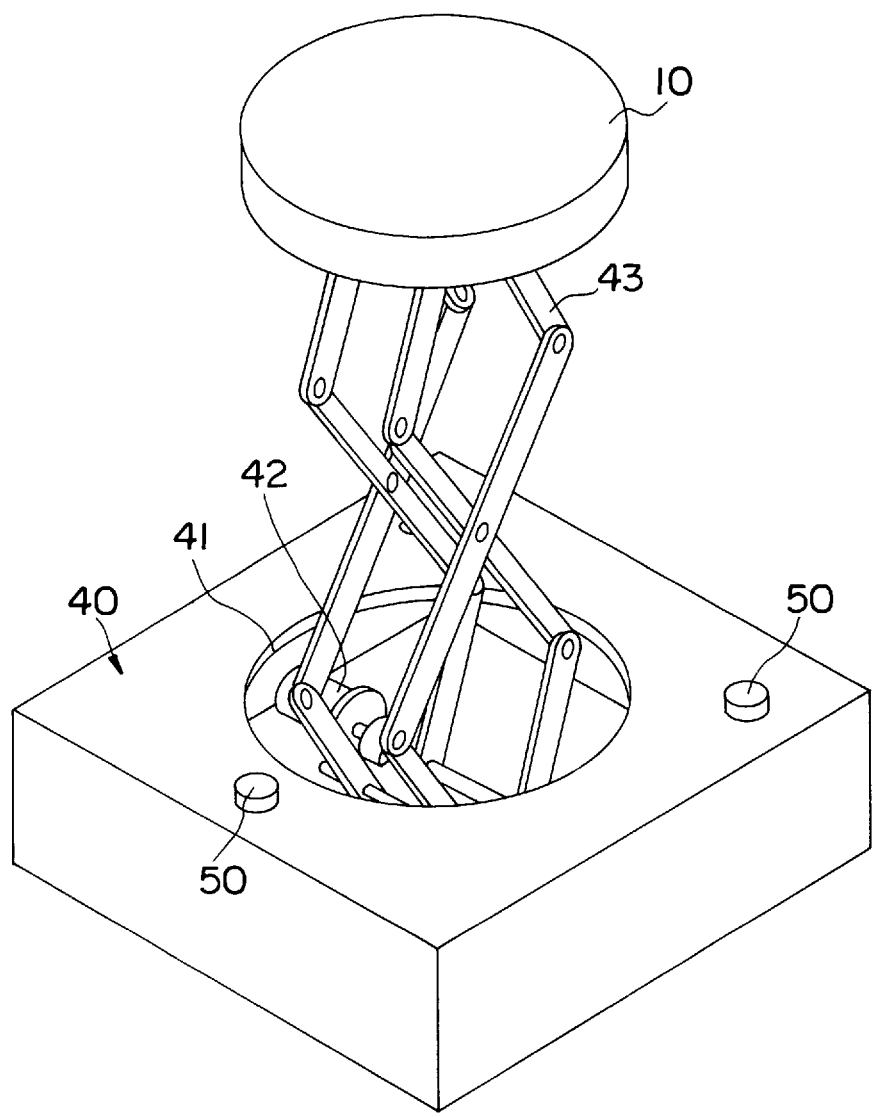
F I G. 6

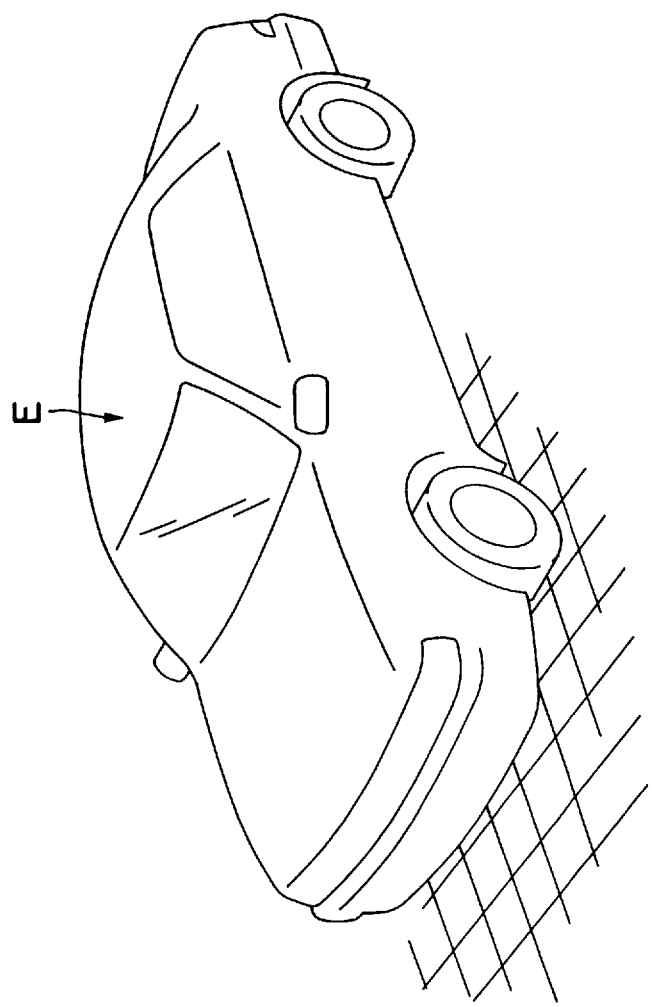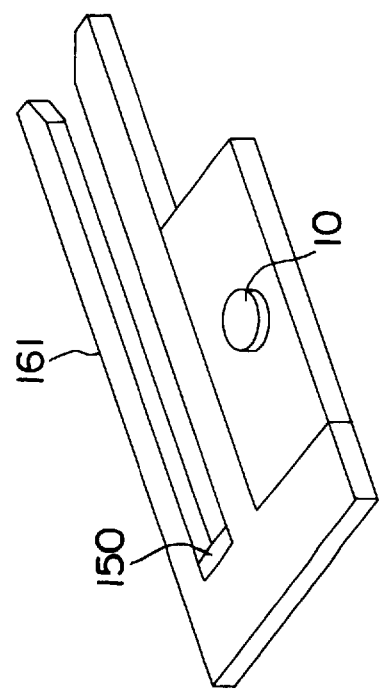
FIG. 41

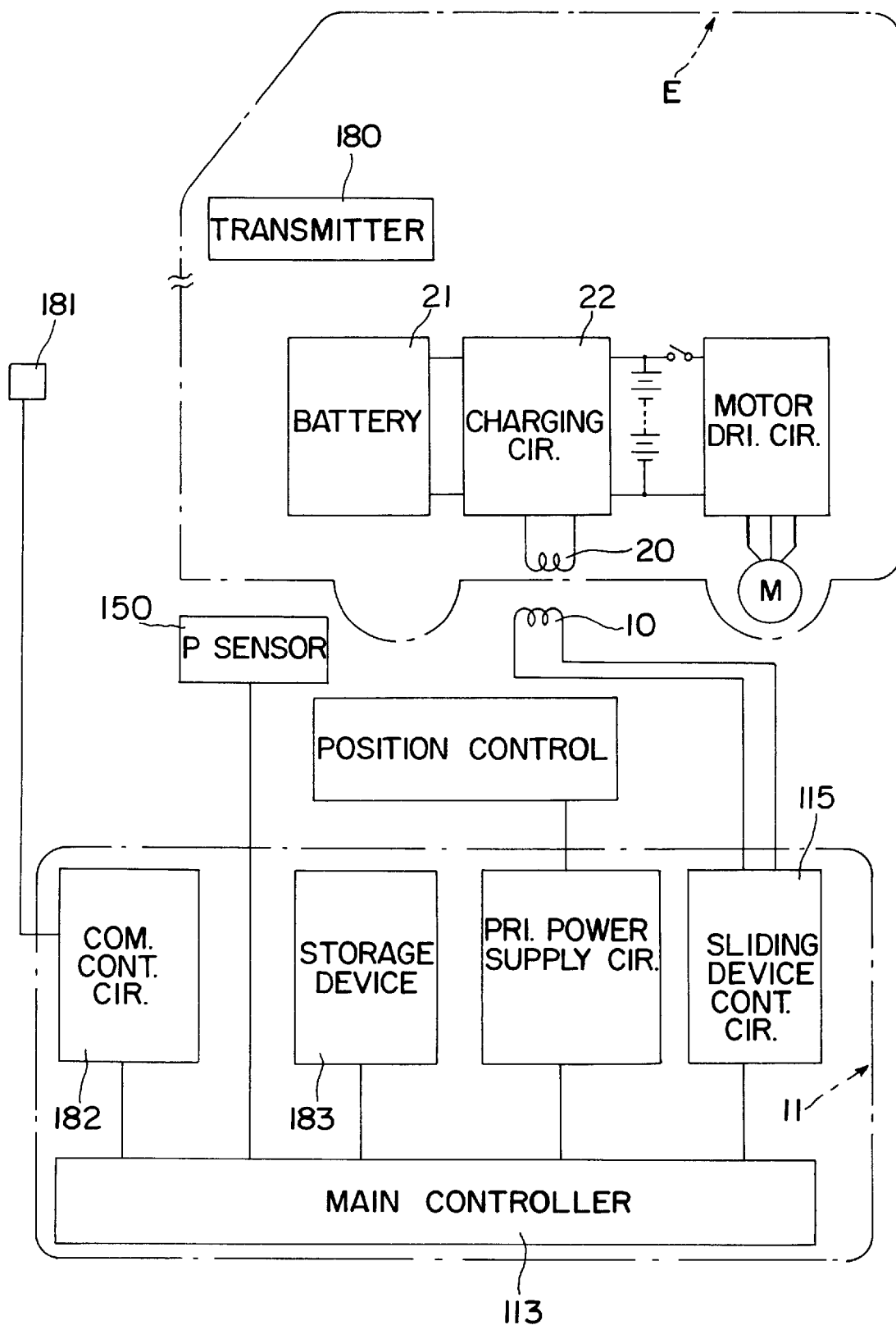
F I G. 44

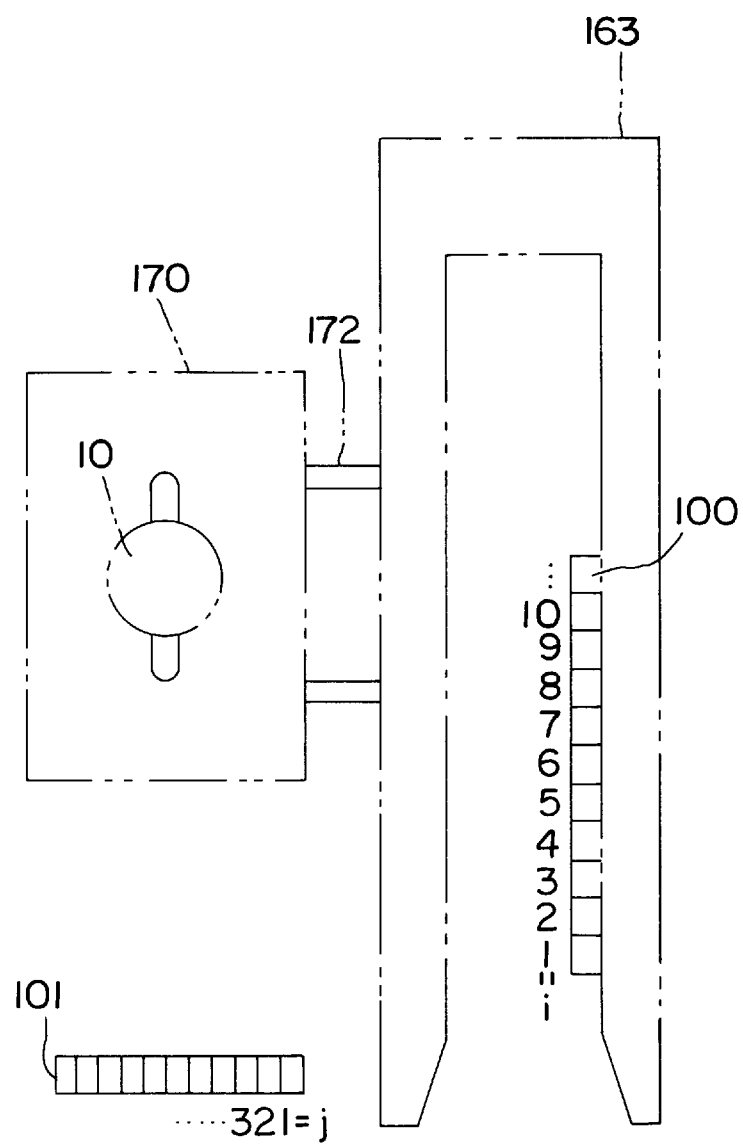
F I G. 47

CONNECTION SYSTEM AND CONNECTION METHOD FOR AN ELECTRIC AUTOMOTIVE VEHICLE

BACKGROUND OF THE INVENTION

1. Field of the Invention

The present invention relates to a connection system, in particular to a charging system, and to a connection method, in particular to a charging method, for charging an electric automotive vehicle.

2. Description of the Prior Art

A known charging system for charging an electric automotive vehicle is shown in FIG. 57. A main body of an electric automotive vehicle 1 is provided with a vehicle side connector 2 connected with a drive battery used to drive the vehicle, and an external power supply connector 3 is connected with the vehicle side connector 2. The power supply connector 3 is provided at the leading end of a cable 5 extending from a power source 4 for the charging which is installed outside the vehicle. Power from the power source 4 is supplied to the drive battery via the connectors 2 and 3, thereby performing charging.

The above charging system requires operations of taking the power supply connector 3 from a charging facility, conveying it to the vehicle 1 while withdrawing the cable 5, and connecting it with the vehicle side connector 2 after opening a connector lid 1a of the vehicle body. These operations are very cumbersome.

Further, since a prior art charging connector is constructed such that a passage of power is established by bringing terminals into engagement, a large resistance acts during the engaging operation. Accordingly, a relatively large force is needed to engage the connectors. Further, a function for preventing a current leak due to water drops such as raindrops needs to be provided.

In view of the above problems, an object of the present invention is to provide a connection system and connection method allowing an easy charging the electric automotive vehicle.

SUMMARY OF THE INVENTION

According to the invention, there is provided a connection system, in particular a charging system, for charging a battery or drive battery of an electric automotive vehicle used to drive the vehicle. The system comprises a primary coil connected or connectable with an external power source and a secondary coil connected or connectable with a battery or a load. The primary coil can be electromagnetically coupled or connected with the secondary coil for inducing a current in the secondary coil. According to a preferred embodiment, the connection system further comprises a coil position detecting means for detecting a positional relationship and/or a connection state or coupling condition between the primary and secondary coils (preferably for automatically coupling or connecting the primary and secondary coils). Preferably the connection system also comprises a coil moving means having a driving device and adapted to move at least one of the primary and secondary coils to a desired position.

The connection system may further comprise a control means for controlling the driving device of the coil moving means based on the detection result of the coil position detecting means to position or arrange the primary coil and/or the secondary coil in a predetermined or predeterminable positional relationship with respect to each other.

Thus the control means may guide one or both coils relative to one another to a position where they are to be electromagnetically coupled.

The coil position detecting means may detect the positional relationship between the primary and secondary coils based on an alternating and/or constant magnetic field generated by exciting at least one of the primary and secondary coils.

Most preferably, the coil position detecting means comprises one magnetic sensor or a plurality of spaced apart magnetic sensors that may be provided at the primary coil. Thus the coil position detecting means may detect the positional relationship between the primary and secondary coils based on a comparison result obtained by comparing the magnetic field intensities detected by the single magnetic sensor at different positions or detected by the plurality of magnetic sensors.

According to a further embodiment, the one or more magnetic sensors comprise at least one coil, at least one Hall probe means and/or at least one magnetoresistant device.

Preferably, the coil moving means comprises a body arrangeable or installed on a ground of a parking lot, gas station, garage or the like, to support the primary coil. The coil moving means further includes X-axis driving means for linearly moving the body along a specified direction, and Y-axis driving means for linearly moving the body along a direction arranged at an angle different from 0° or 180°, in particular substantially 90° to the moving direction of the body by the X-axis driving means. The coil moving means may comprise a pantograph mechanism, a ball screw mechanism and/or a fluid cylinder mechanism.

Further preferably, the coil moving means comprises: a body for supporting the primary coil, one or more wheels mounted on the body to drive the body, on the ground, and a driving mechanism controlled by the control means to drive the wheels.

According to a further preferred embodiment, the primary coil and the coil moving means are provided on a wall surface, and are arranged at an angle different from 0° or 180°, in particular substantially normal to the ground, e.g. of a parking lot. The coil moving means moves the primary coil along one or more directions substantially parallel to the ground and/or substantially normal thereto, and preferably substantially parallel to the wall surface.

The connection system may further comprise at least one wheel guide which is so provided as to have a predetermined or predeterminable positional relationship with respect to the primary coil. Thus one or more wheels of the vehicle are guided or guidable by the wheel guide to an electromagnetic connection or coupling position, where the secondary coil of the vehicle is or can be substantially electromagnetically connected with the primary coil.

The connection system may further comprise a position adjusting apparatus for differing or adjusting relative positions of the wheel guide and the primary coil, and/or a vehicle type discriminating apparatus for discriminating a type of vehicle being parked. In particular the secondary coil of the vehicle and the primary coil may be guided to the electromagnetic connection position by driving the position adjusting apparatus in accordance with the vehicle type discriminated by the vehicle type discriminating apparatus.

The coil moving means may be provided on a coil positioning apparatus supported by an elastic support means on a wall surface disposed at an angle different from 0° or 180°, preferably substantially normal, to the ground. The elastic support means allows for an elastic positioning of the coil positioning apparatus, preferably in dependence of a side wall portion e.g. a bumper of the vehicle, for achieving a connection or coupling of the primary and secondary coils.

A charging control circuit may be provided for controlling the exciting of the primary coil. The charging control circuit may comprise a remaining capacity detecting means for detecting a remaining capacity of the battery. The charging control circuit preferably excites the primary coil if the remaining capacity detected by the remaining capacity detecting means is equal to or smaller than a predetermined or predeterminable value.

A display means also may be provided for displaying a charging or charged state corresponding to the remaining capacity of the battery. The display means preferably is in the parking space and/or on the vehicle.

Further, there may be provided an identification code transmitting means provided in connection with the secondary coil, in particular provided in the vehicle. An identification code checking means may be provided in connection with the primary coil, in particular provided in the parking space, for comparing an identification code received from the identification code transmitting means with a prestored identification code. A charging control circuit then may excite the primary coil on condition that the identification codes compared by the identification code checking means agree.

According to a further preferred embodiment of the invention there is provided a connection system, in particular a charging system for charging a drive battery of an electric automotive vehicle used to drive the vehicle by electromagnetically coupling a primary coil connected to an external power source with a secondary coil connected to the drive battery. The system comprises coil position detecting means for detecting a positional relationship between the primary and secondary coils. The system also includes a coil moving means, which comprises a driving device and which is adapted to move at least one of the primary and secondary coils to a desired position. Control means is provided for controlling the driving device of the coil moving means based on the detection result of the coil position detecting means to guide both coils to a position where they are to be electromagnetically coupled.

With this construction, since the coils are guided to the position where they are to be electromagnetically coupled while the positions thereof are being detected, no electromagnetic connection is established while the coils are displaced from each other. Thus, charging can be performed with a good energy transmission efficiency.

Preferably, the coil position detecting means detects the positional relationship between the primary and secondary coils based on a magnetic field generated by exciting one of the primary and secondary coils.

With this construction, since the primary and secondary coils in principle provided for the power transmission can be used to detect the positional relationship thereof, a production cost can be reduced by reducing the number of parts.

In order to detect the positional relationship of the coils based on a magnetic field generated by one of the coils, there may be considered two constructions. In a first construction, magnetic sensors are provided at the primary coil and the secondary coil is excited as described below (i.e. the coil position detecting means comprises a plurality of spaced apart magnetic sensors provided at the primary coil) and detects the positional relationship between the primary and secondary coils based on a comparison result obtained by comparing the magnetic field intensities detected by the magnetic sensors. In a second construction, the primary coil is merely excited without providing the magnetic sensors. In the latter construction, when the primary coil is excited, the phase of a current flowing through the primary coil differs depending upon the degree of magnetic connection between the primary and secondary coils. Accordingly, a distance between the two coils can be detected by measuring the phase difference between an exciting voltage and an exciting current.

Further preferably, the coil position detecting means comprises a plurality of spaced apart magnetic sensors provided at the primary coil, and detects the positional relationship between the primary and secondary coils based on a comparison result obtained by comparing the magnetic field intensities detected by the magnetic sensors.

In this construction, since a plurality of magnetic sensors are spaced apart, the detection results of the magnetic field intensities detected by the respective magnetic sensors differ depending upon the distance from the excited coil and the directions thereof. Accordingly, the positional relationship of the coils can be detected by calculation based on the different detection results and the positional relationship of the magnetic sensors.

Still further preferably, the coil moving means comprises a body installed on a ground of a parking lot to support the primary coil, X-axis driving means for linearly moving the body along a specified direction, and Y-axis driving means for linearly moving the body along a direction normal to the moving direction of the body by the X-axis driving means.

With the above construction, the primary coil can be freely moved to the desired position by the two driving means. Further, since the two driving means form orthogonal coordinate systems, the control means can easily conduct a calculation for the operation of these driving means.

Most preferably, the coil moving means comprises a body for supporting the primary coil, wheels mounted on the body to drive the body on the ground, and a driving mechanism controlled by the control means to drive the wheels.

In the above construction, the body carrying the primary coil runs toward the secondary coil on the ground of the parking lot. Accordingly, this charging system can be adopted without necessitating a large-scale reconstruction in already existing parking facilities.

According to another preferred embodiment of the invention there is provided a connection or charging system for charging an electric automotive vehicle during parking. The vehicle comprises a battery as a drive source and a secondary coil, preferably provided at the bottom of a vehicle body, and connectable with an external power source unit. A primary coil connected with the external power source unit preferably is provided in a position where the vehicle is to be parked and is to be electromagnetically connected or coupled with the secondary coil to supply power to the drive battery and/or a load.

With the above construction, since the secondary coil is provided at the bottom of the vehicle, the primary and secondary coils are caused to face each other by parking the vehicle in a predetermined position. Accordingly, a preparation for the charging of the vehicle can be considerably easily performed.

At least one of the primary and secondary coils may be supported by coil moving means which is movable between an induction position and a standby position, in particular substantially upward and downward.

With the above construction, since the coil(s) is/are moved upward and downward by the coil moving means, the facing coils can be brought sufficiently close to each other, enhancing the degree of electromagnetic connection. This leads to an improved power transmission efficiency.

Further preferably, there is further provided a parking position detecting means for making a detection that the parked vehicle is in a predetermined charging position, and the primary coil is excited upon making said detection.

With the above construction, the charging is performed on condition that the vehicle is in the charging position. This prevents the vehicle from being charged while the primary and secondary coils are displaced from each other. Accordingly, the coils can be properly electromagnetically connected to ensure a satisfactory charging efficiency.

Still further preferably, there is further provided a wheel guide which is so provided as to have a specified positional relationship with respect to the primary coil. The wheels of the vehicle are guided by the wheel guide to an electromagnetic connection position where the secondary coil of the vehicle is electromagnetically connected with the primary coil.

With the above construction, since the coils are guided to the electromagnetic connection position by advancing the vehicle along the wheel guide, the charging of the vehicle can be far more easily prepared, constantly in an identical or similar manner.

Most preferably, there are further provided a position adjusting apparatus for differing relative positions of the wheel guide and the primary coil and a vehicle type discriminating apparatus for discriminating a type of the vehicle to be parked. The secondary coil of the vehicle and the primary coil are guided to the electromagnetic connection position by driving the position adjusting apparatus in accordance with the vehicle type discriminated by the vehicle type discriminating apparatus.

With the above construction, the relative positions of the wheel guide and the primary coil are adjusted by the position adjusting apparatus based on the discrimination result of the vehicle type discriminating apparatus. Accordingly, even if the positional relationship of the wheels and the secondary coil varies depending upon the vehicle type, the vehicles of different types can be guided to the respective proper charging positions. Thus, there can be realized a general-purpose charging system which is independent of the vehicle type.

According to a further preferred embodiment, there are further provided a position adjusting apparatus for differing relative positions of the wheel guide and the primary coil and a secondary coil measuring apparatus for measuring a positional relationship of the secondary coil and the wheels of the vehicle to be parked. The secondary coil of the vehicle and the primary coil are guided to the electromagnetic connection position by driving the position adjusting apparatus in accordance with the position of the secondary coil measured by the secondary coil position measuring apparatus.

With the above construction, the position of the secondary coil provided at the bottom of the vehicle is measured as a positional relationship to the wheels, and the relative positions of the wheel guide and the primary coil are adjusted by the position adjusting apparatus based on the measurement result. Accordingly, even if the positional relationship of the wheels and the secondary coil varies depending upon the vehicle type, the vehicles of different types can be guided to the respective proper charging positions. Thus, there can be realized a general-purpose charging system which is independent of the vehicle type.

According to the invention, there is further provided a connection method, in particular a charging method for charging a battery or drive battery of an electric automotive vehicle used to drive the vehicle, in particular using a connecting system according to the invention. The method comprises a first step of electromagnetically coupling a primary coil that is connected or connectable to an external power source with a secondary coil connected or connectable to a battery and/or a load. The method proceeds by inducing a current from the primary coil in the secondary coil.

The connection method may further comprise the step of determining the positional relationship and/or a coupling or connection state of the primary and secondary coils with respect to each other. The method may also comprise positioning the primary and the secondary coils in a predetermined or predeterminable modified positional relationship with respect to each other based on the determined positional relationship. The positioning step preferably is performed automatically.

Preferably, the determination step comprises a step of analyzing one or more detection signals of a coil position detecting means and/or comparing two or more detection signals of a coil position detecting means. In particular the determining step includes comparing magnetic field intensities detected by one or more magnetic sensors of the coil position detecting means, and controlling a coil moving means in accordance with the result of the analyzing step and/or of the comparison step.

Further preferably, the determination step comprises a step of exciting at least one of the primary coil and the secondary coil and, preferably detecting the induction in the other of the primary coil and the secondary coil or in a magnetic sensor means.

Most preferably, the excitation of at least one of the primary coil and the secondary coil is performed with a specified frequency and wherein the determination step further comprises a step of comparing a phase of an exciting voltage with the phase of the induced current in the other of the primary coil and the secondary coil.

These and other objects, features and advantages of the present invention will become more apparent upon a reading of the following detailed description and accompanying drawings in which the same reference numerals refer to same or similar elements.

BRIEF DESCRIPTION OF THE DRAWINGS

FIG. 6 is a perspective view showing a state where a primary coil is raised by extending a pantograph.

FIG. 41 is a perspective view of a first modification of a wheel guide of the seventh embodiment.

FIG. 44 is a block diagram of the eighth embodiment.

FIG. 47 is a schematic plan view showing the arrangement of sensors of the ninth embodiment.

DETAILED DESCRIPTION OF THE PREFERRED EMBODIMENTS

Hereafter, a first embodiment of the invention is described with reference to FIGS. 1 to 14.

Figure 1:
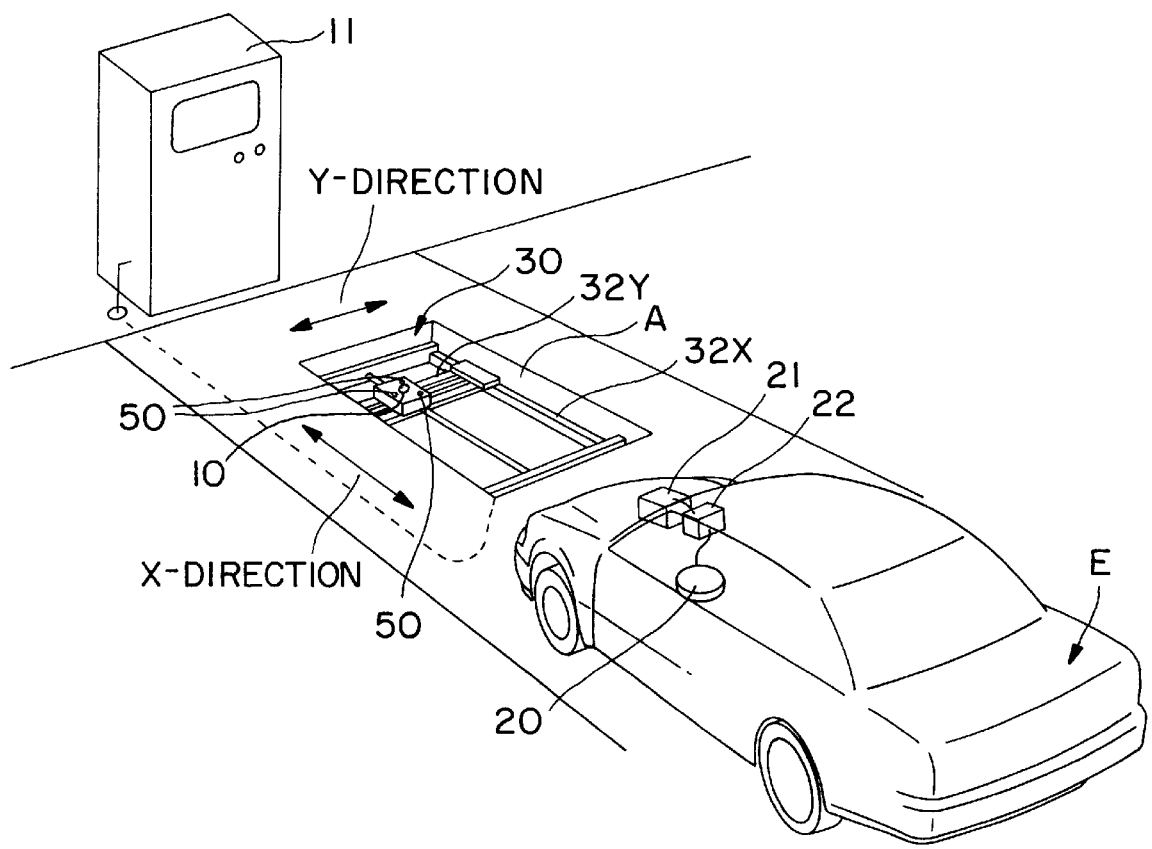
FIG. 1 is a perspective view of a first embodiment of the invention.

FIG. 1 shows an electric automotive vehicle E advancing into a parking lot equipped with a charging system 11 according to the invention.

The vehicle E includes, as a main power source, a battery 21 which is a charging device for a driving source. Upon receipt of power supplied from the battery 21, a motor for driving the vehicle and a variety of electric devices function. A secondary coil 20 is connected with the battery or accumulator 21 via a charging circuit 22, and an alternating current induced by the secondary coil 20 is charged or accumulated after being rectified.

Figure 2:
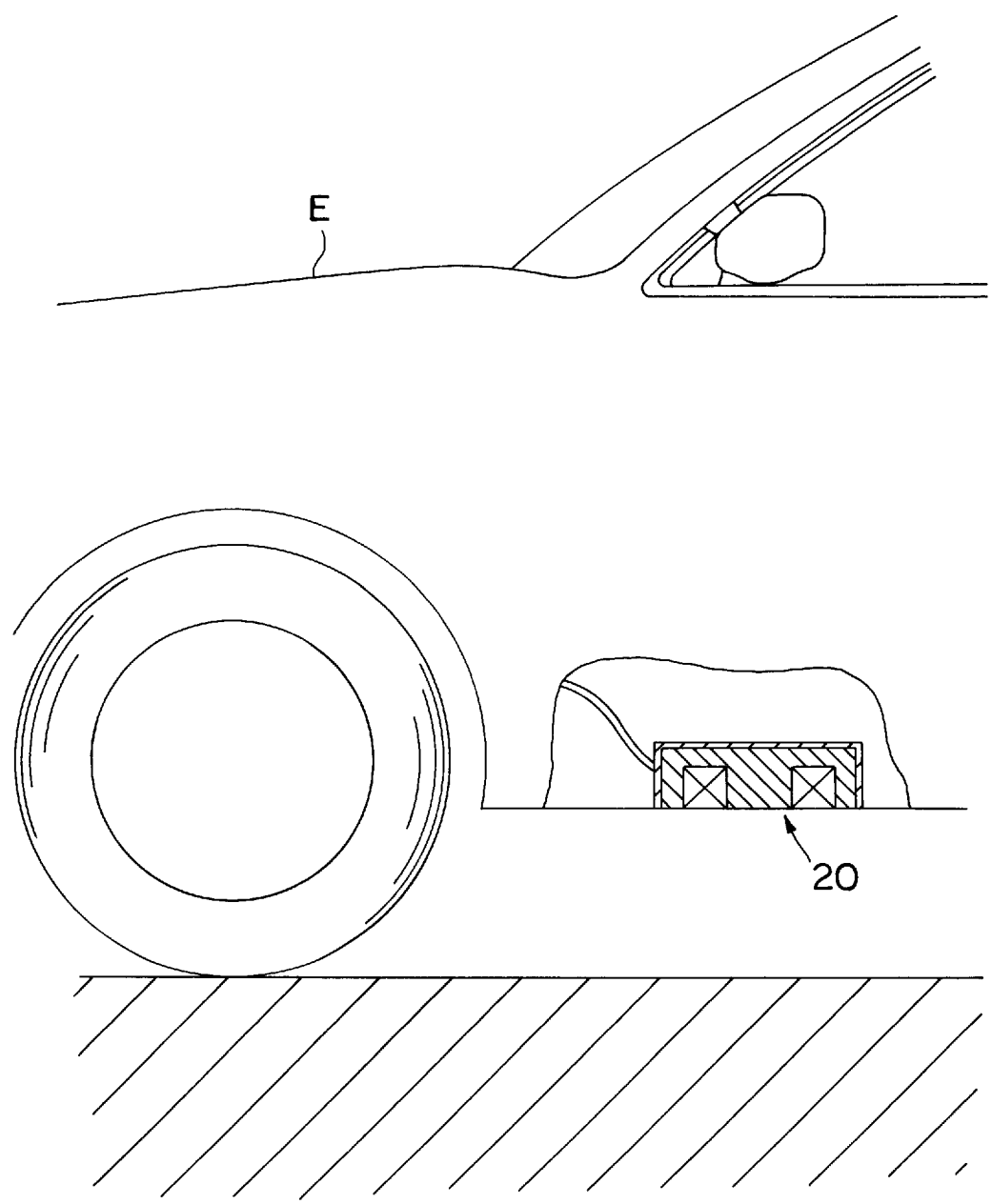
FIG. 2 is a side view partly in section showing a secondary coil in its mount position in an electric automotive vehicle.

The secondary coil 20 is particularly in the form of a flat disk formed by, e.g. winding a wire around a magnetic core of ferrite, and is accommodated in a protection casing e.g. of synthetic resin. As shown in FIG. 2, the secondary coil 20 is mounted at the bottom of the vehicle body with the longitudinal axis of the magnetic core along a substantially vertical direction, so as to substantially face the ground. The secondary coil 20 generates an alternating magnetic field by being excited in a specified cycle in accordance with the operation of an operation unit provided in the vehicle E. The alternating magnetic field is used for the position detection.

On the other hand, a recess A is formed in the ground of the parking lot, and a coil moving device 30 (coil moving means) for movably supporting a primary coil 10 is provided in the recess A. The width of the recess A is slightly narrower than the spacing between the left and right wheels of the vehicle E, and the length thereof is about the half of the length of the vehicle E.

Figure 3:
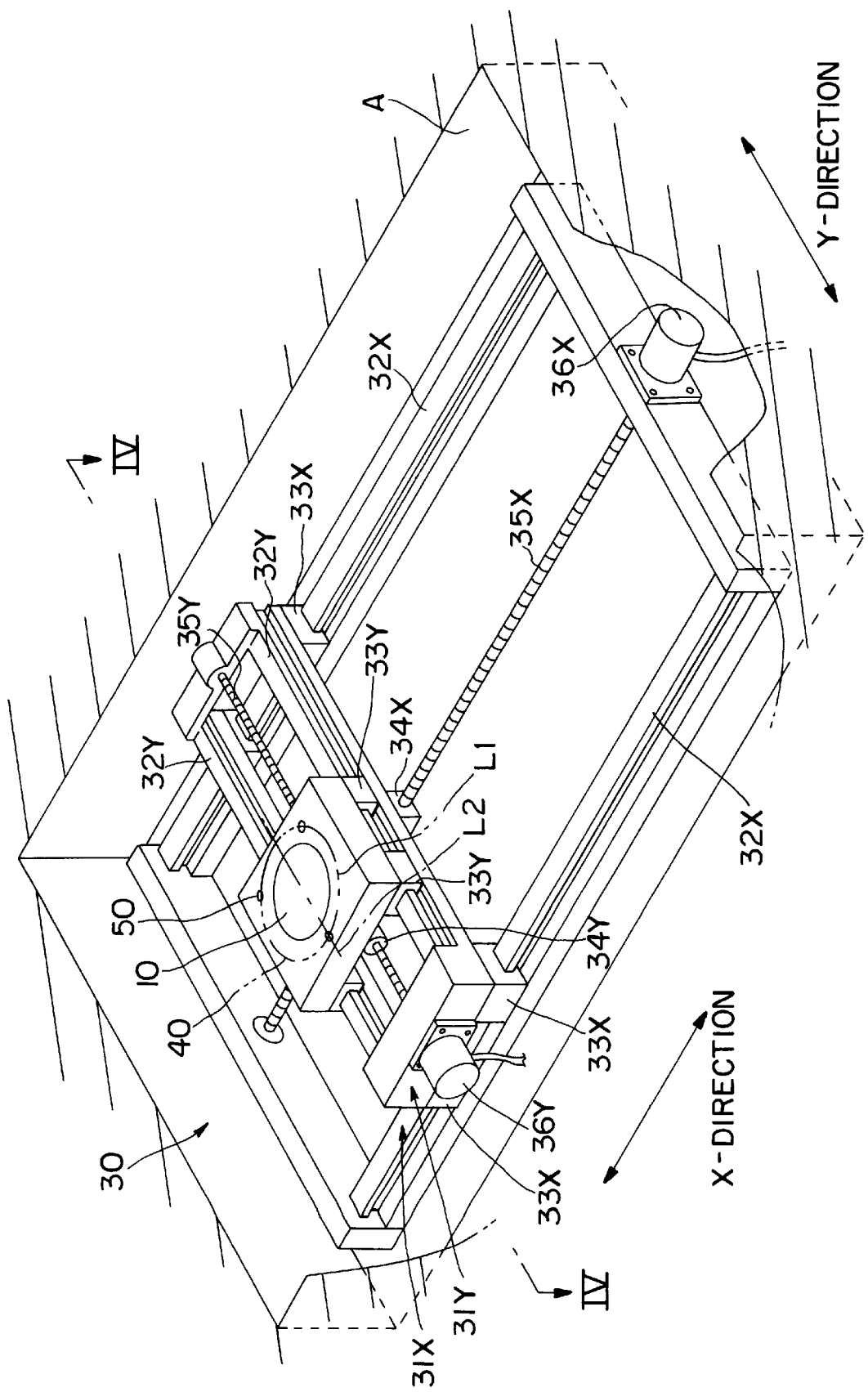
FIG. 3 is a perspective view of a coil moving means of the first embodiment.

The coil moving device 30 in the recess A includes, as shown in FIG. 3, a so-called X-Y table for moving a flat boxlike body 40 in two mutually orthogonal directions by two sliding units 31.

Hereafter, the construction of the sliding units is described. The two sliding units are distinguished by adding suffixes x, y to reference numerals (31 to 37). When no suffixes x, y are given, both sliding units are referred to.

The sliding unit 31 includes a pair of rails 32 supported in parallel and a slider 33 for making a linear movement along the rails 32 with a low friction. Between the rails 32, a ball screw mechanism including an internally threaded portion 34 and an externally threaded portion 35 is provided substantially in parallel with the rails 32. The internally threaded portion 34 is mounted on an object supported by the slider 33, and the externally threaded portion 35 is coupled with a rotatable shaft of a motor 36. The housing of the motor 36 is secured at a side where the rails 32 are supported. A driving force of the motor 36 acts to move the object supported by the slider 33 along the rails 32.

In the coil moving device 30, the rails 32x of one sliding unit are secured to the bottom surface of the recess A (this sliding unit is called an X-axis driving unit 31x), and the rails 32y of the other sliding unit are supported on the slider 33x of the X-axis driving unit 31x so as to extend in a direction normal to the rails 32x (this other sliding unit is called a Y-axis driving unit 31y). The flat boxlike body 40 is supported on the slider 33y of the Y-axis driving unit 31x, and is moved to any desired position with respect to the ground of the parking lot by moving the driving units 31x, 31y. The moving direction of the X-axis driving unit 31x is a direction along which the vehicle E advances in the parking lot as shown in FIG. 1 (hereafter, the moving direction of the X-axis and Y-axis driving units are referred to as X-direction and Y-direction, respectively).

Figure 4:
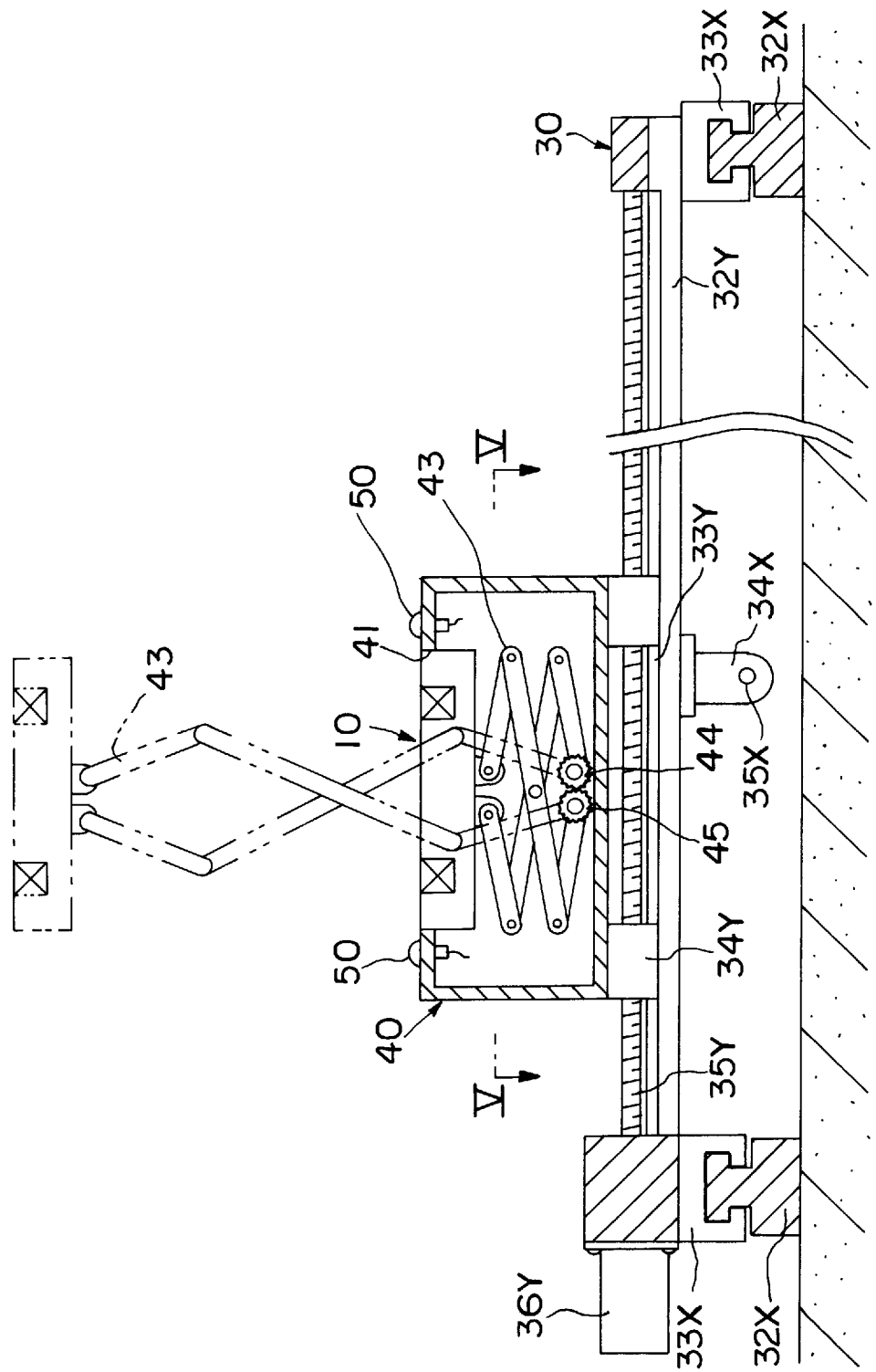
FIG. 4 is a section along IV—IV of FIG. 3.
Figure 5:
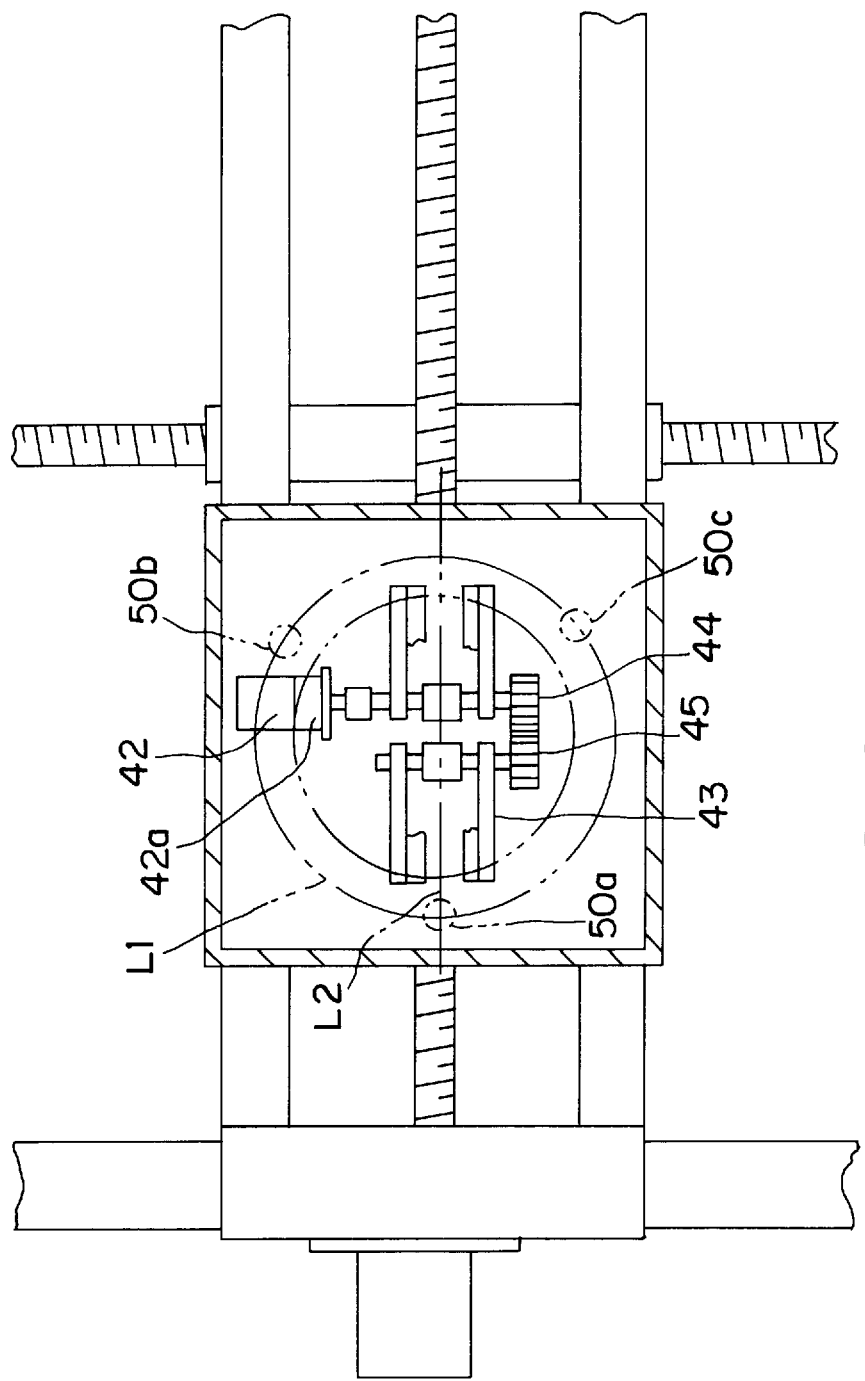
FIG. 5 is a section along V—V of FIG. 4.

As shown in FIGS. 4 and 6, the body 40 has a circular opening 41 in its upper surface. The primary coil 10 is provided in the opening 41, and three magnetic sensors 50 (coil position detecting means) are arranged around the opening 41. Further, a pantograph 43 which extends and contracts by being driven by a motor 42 shown in FIG. 5 is provided in the body 40. One end of the pantograph 43 is secured to the bottom surface, and the other end thereof is secured to the bottom surface of the primary coil 10, thereby making the primary coil 10 movable upward and downward i.e. in the direction toward the automotive vehicle E as shown in FIG. 6.

The primary coil 10 is in the form of a flat plate formed by winding a wire around a magnetic core of, e.g. ferrite, and is accommodated in a circular protection casing of, e.g. synthetic resin. The outer diameter of the protection casing is such that it is fitted into the opening 41 with a slight clearance therebetween. In other words, the primary coil 10, the opening 41 and a circle (L1 in FIGS. 3 and 5) along which the sensors 50 are substantially arranged are preferably concentric circles. The sensors 50 are so arranged as to trisect the circle L1.

Gears 44, 45 are provided on parts of the pantograph 43 so that the pantograph 43 moves laterally symmetrically, making the pantograph 43 extendible and contractible along the vertical direction. The motor 42 is coupled with one of the gears 44, 45 to transmit the driving force thereof. The motor 42 is provided with a speed reducer 42a so as to generate a suitable driving force at a suitable speed. Although the pantograph 43 is used to move the primary coil 10 upward and downward, a ball screw or an air cylinder may be used.

Each of the three magnetic sensors 50 is formed by, e.g. molding a small coil wound by a wire with synthetic resin, and detects the intensity of the magnetic field by an electromotive force induced in the small coil. One of the sensors 50 is arranged on a line (L2' in FIGS. 3 and 5) passing through the center of the primary coil 10 in parallel with the Y-direction, and is so arranged around the opening 41 as to trisect the circle L1 with the other two sensors 50 as described above (hereafter, the magnetic sensor located on the line L2 is identified by 50a, and the other two sensors are identified by 50b, 50c with respect to the clockwise direction from the sensor 50a).

The basic principle of the coil position detection is as follows.

Figure 7:
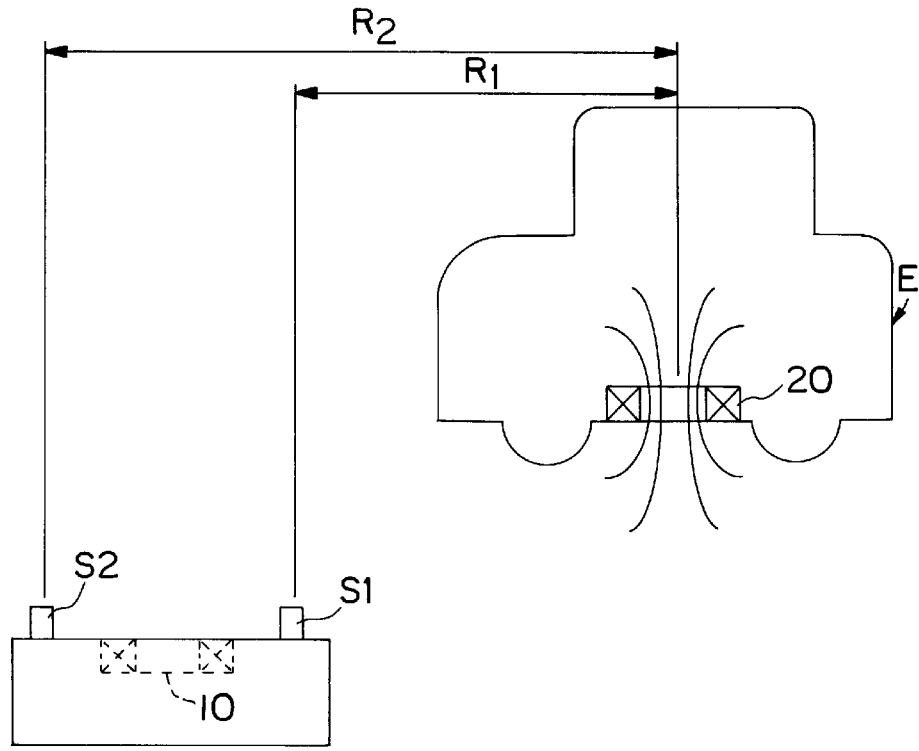
FIG. 7 is a diagram showing a state where magnetic sensors a, b are at different distance from the secondary coil.
Figure 8:
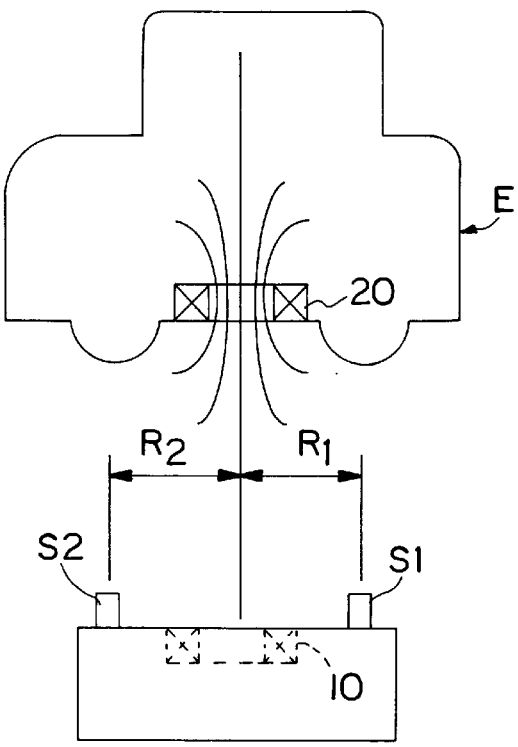
FIG. 8 is a diagram showing a state where the magnetic sensors a, b are equidistant from the secondary coil.
Figure 9:
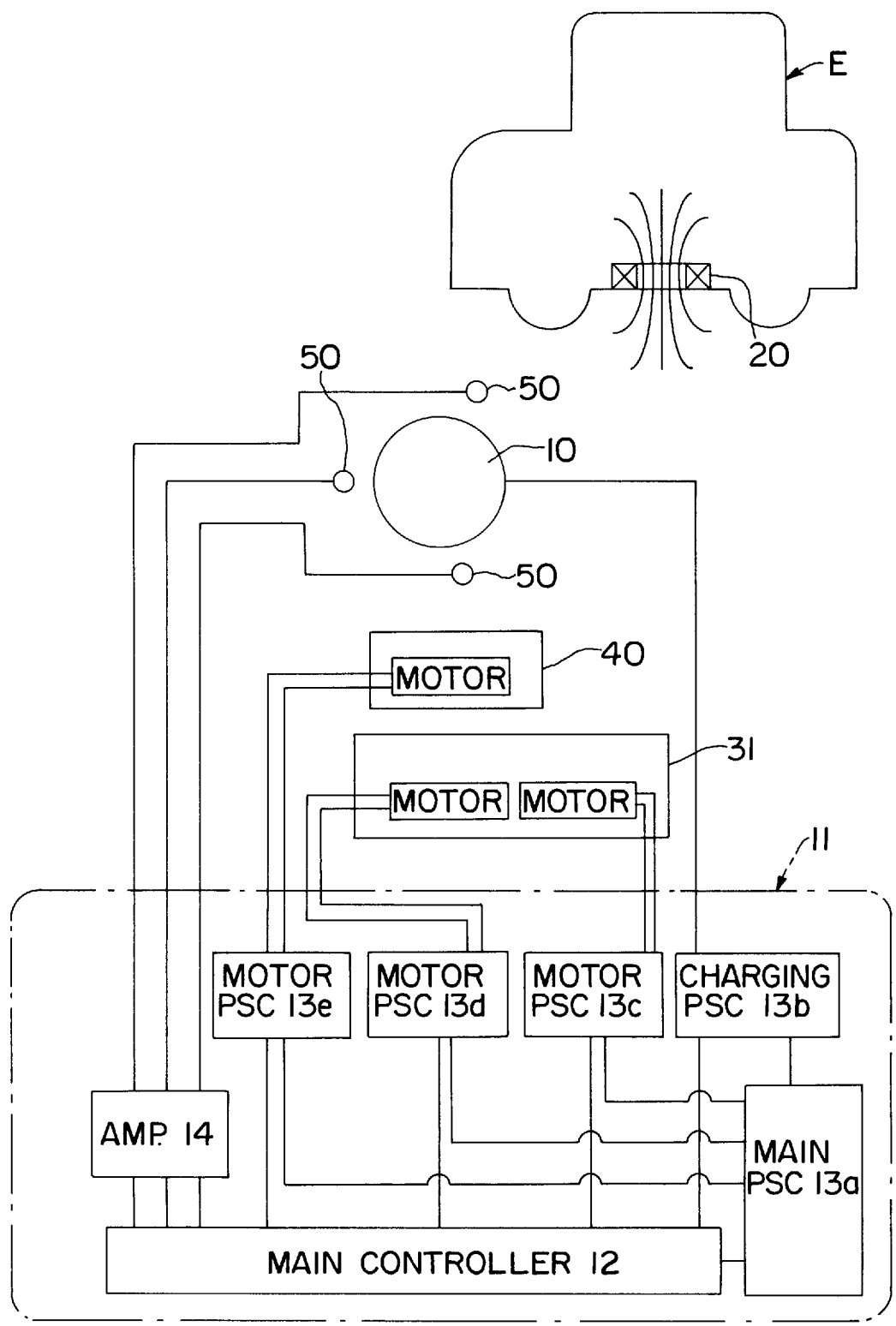
FIG. 9 is a block diagram showing the system construction of the first embodiment.
Figure 10:
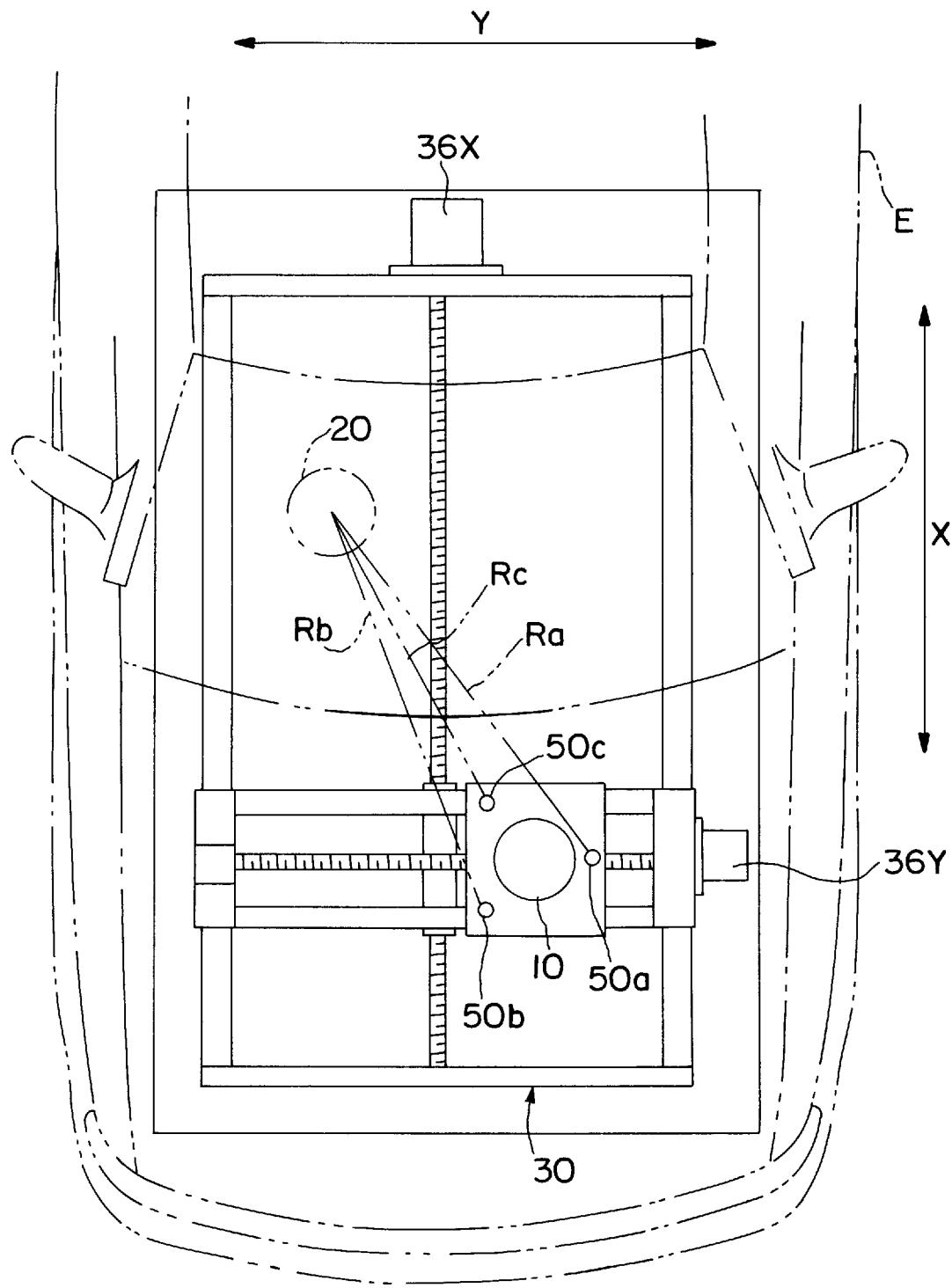
FIG. 10 is a plan view showing a state where the primary coil of the coil moving means is distanced from the second coil of the vehicle.

As diagrammatically shown in FIG. 7, when the vehicle E is parked at the parking lot and a constant or alternating magnetic field is generated by exciting the secondary coil 20, the magnetic field intensities detected by the magnetic sensors (S1, S2 in FIG. 7) spaced from the secondary coil 20 by different distances (R1, R2 in FIG. 7) differ. As the body 40 is moved toward the magnetic sensor S1 having detected the stronger magnetic field intensity, the respective magnetic sensors S1, S2 become equidistant from the secondary coil 20, with the result that the magnetic field intensities detected by the sensors S1, S2 substantially agree. If this principle is applied to the three sensors 50a, 50b, 50c of this embodiment, the primary coil 10 concentric with the circle L1 is right opposed to the secondary coil 20 when the magnetic field intensities detected by these sensors 50 agree.

The magnetic sensors are not limited to those of the aforementioned coil type, but Hall devices, magnetoresistance devices or the like may be used.

Signal lines or power transmission lines of the aforementioned primary coil 10, three magnetic sensors 50 and motors (36x, 36y, 42) are connected with a main controller 12 (control means) or power supply circuits 13a to 13e (the magnetic sensors 50 are connected via an amplifier 14) in the external power supply equipment 11. The signals detected by the magnetic sensors 50 are processed by the main controller 12 to operate the respective elements. The algorithm of the data processing by the main controller 12 is described below, together with the charging procedure of this embodiment.

The vehicle E is advanced into the parking lot (FIG. 1) to park such that the recess A is located between the left and right wheels of the vehicle E (FIG. 10), and the secondary coil 20 is switched to a charging preparatory state by the operation unit of the vehicle E.

Then, the secondary coil 20 is excited to generate a specified alternating magnetic field in the parking lot. Unless the secondary and primary coils 20, 10 are accurately opposed to each other, distances Ra, Rb, Rc between the three magnetic sensors 50a, 50b, 50c and the center of the secondary coil 20 differ, with the result that the magnetic field intensities detected by these sensors 50 also differ.

The different detection results of the sensors 50 are compared in the main controller 12 as described below, and the coil moving device 30 is driven based on the comparison result.

Figure 11:
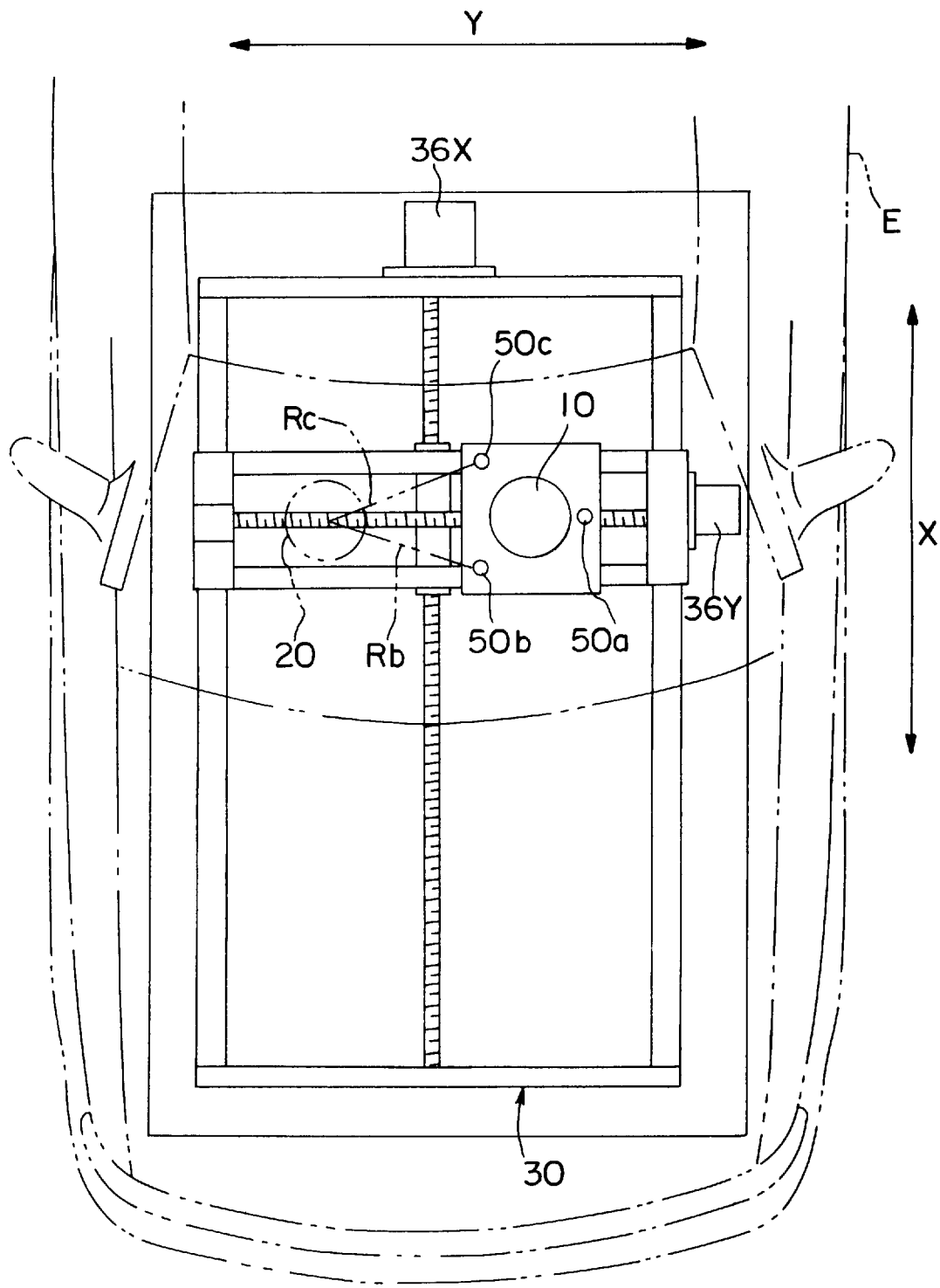
FIG. 11 is a plan view showing a state where there is no displacement along an X-direction between the primary and secondary coils.
Figure 12:
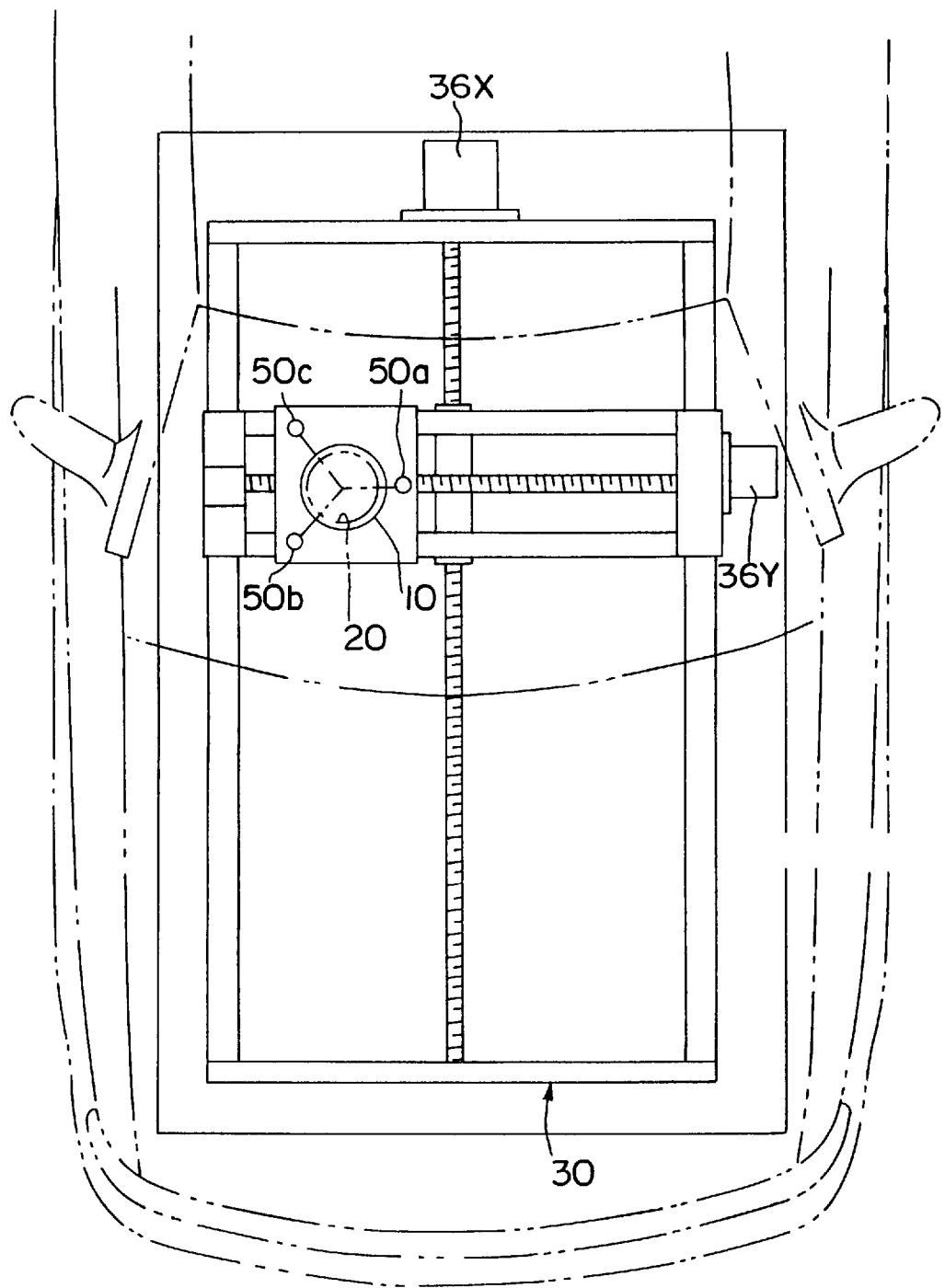
FIG. 12 is a plan view showing a state where there is no displacement along a Y-direction between the primary and secondary coils.

First, in order to correct the displacement of the coils 10, 20 along the X-direction, the detection results of the magnetic sensors 50b, 50c arranged along the X-direction are compared. The secondary coil 10 is moved by the X-axis driving unit 31x toward the magnetic sensor 50c having detected the stronger magnetic field intensity until the detection results agree. When the primary and secondary coils 10, 20 are located on the same line parallel with the Y-direction as shown in FIG. 11, i.e. there is no displacement along the X-direction, the magnetic sensors 50b, 50c are substantially equidistant from the secondary coil 20 (Rb=Rc) and the X-axis driving unit 31x stops. Subsequently, in order to correct a displacement along the Y-direction, the detection results of the magnetic sensors 50b (may also be 50c) and 50a, and the Y-axis driving unit 31y is driven in the same manner as above. Then, as shown in FIG. 12, both sensors become substantially equidistant from the secondary coil 20 in a position where the primary and secondary coils 10, 20 are right opposed to each other, and the Y-axis driving unit 31y stops.

Figure 13:
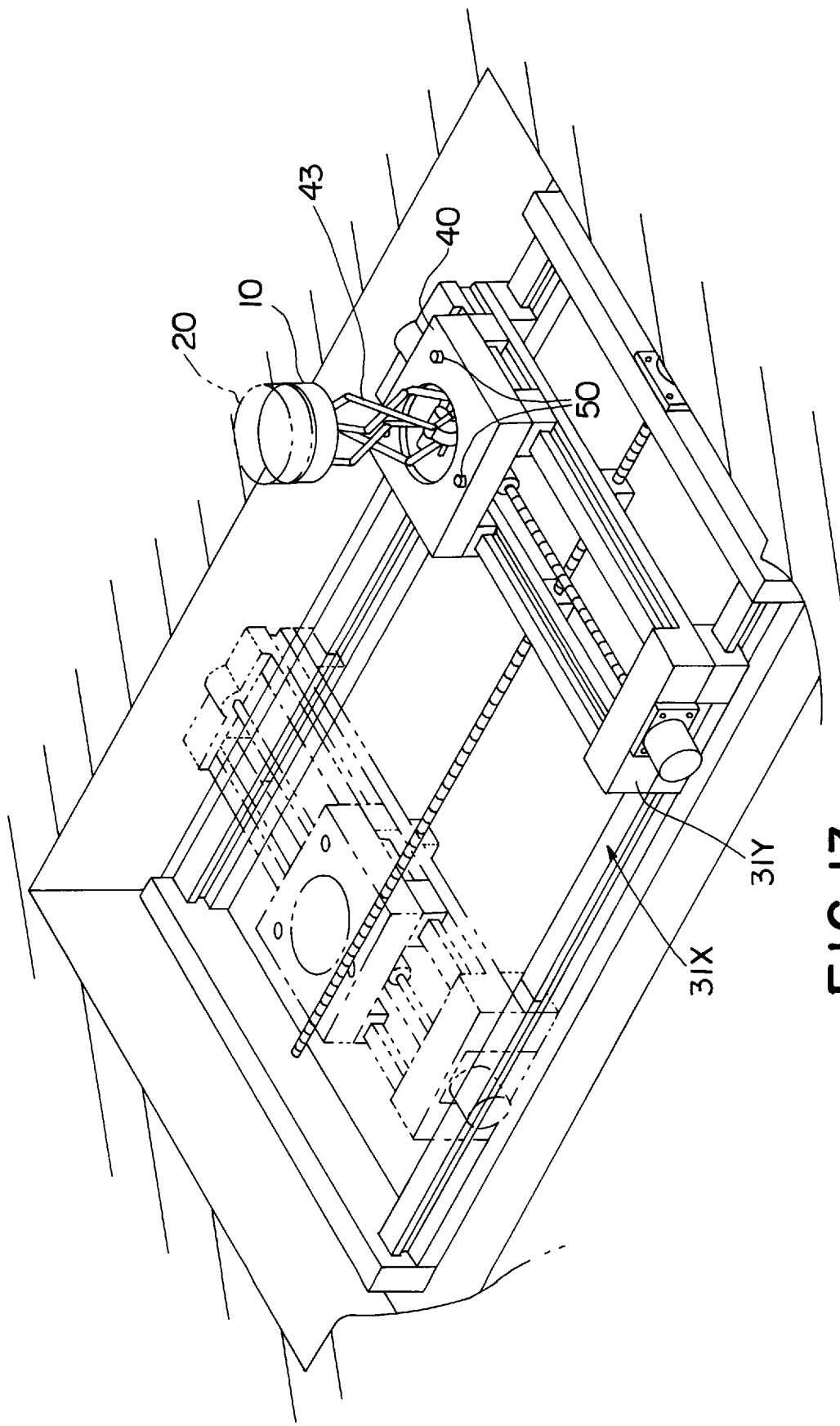
FIG. 13 is a perspective view showing a state where the primary and secondary coils are brought into contact.
Figure 14:
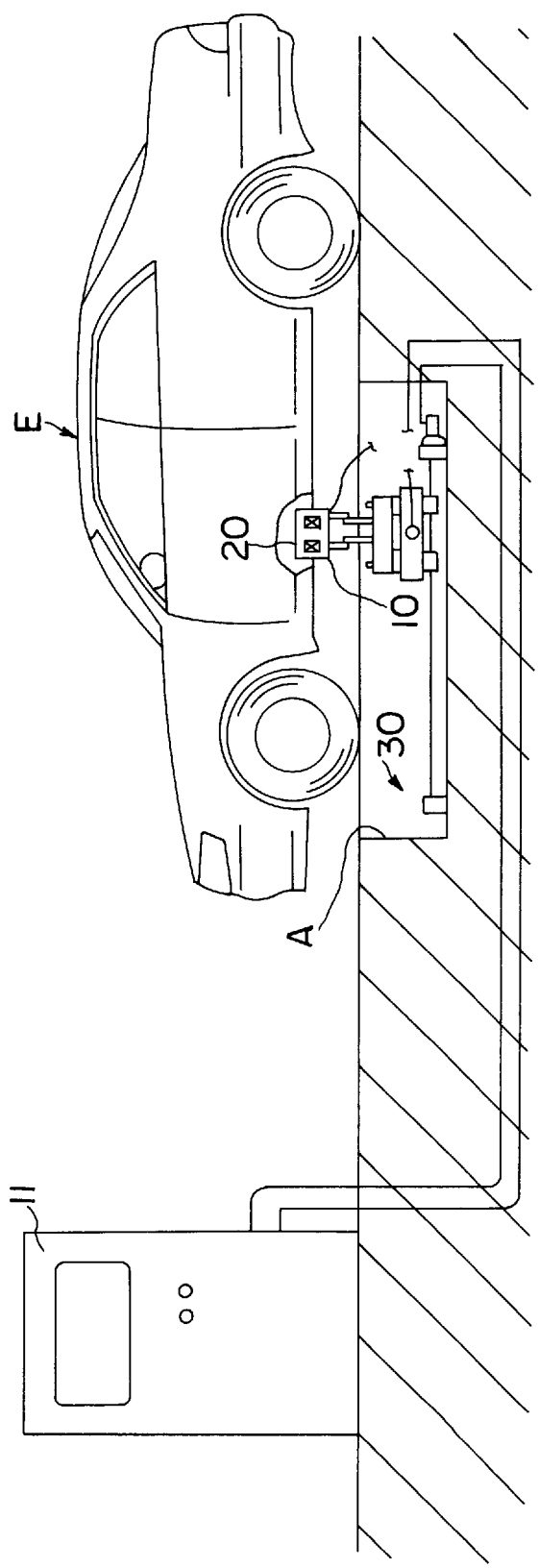
FIG. 14 is a side view showing a state where the primary and secondary coils are brought into contact.

When the main controller 12 confirms that the detection results of the three sensors 50 are substantially equal in this position (the primary coil 10 is positioned again if the detection results are substantially at variance), the motor 42 is driven to extend the pantograph 43 upward as shown in FIGS. 13 and 14, bringing the protection casings of both coils 10, 20 into contact. At this stage, a current value of the motor 42 is fed back to the main controller 12 so as to prevent the coils 10, 20 from being forcibly pressed against each other. Further, upon confirmation of the contact of the coils 10, 20 by the feedback of the current value, the primary coil 10 is excited. In the vehicle E, the charging circuit 22 confirms the completion of the charging preparation based on the voltage generated in the secondary coil 20 by the magnetic field of the primary coil 10, and excitation of the secondary coil 20 is stopped to charge the battery 21.

Upon completion of the charging of the battery 21, the secondary coil 20 is excited again to generate a magnetic field. In the primary coil 10, the resulting change of the magnetic field is detected by the magnetic sensors 50. Then, the excitation is stopped and the primary coil 10 is lowered. Thus, the charging of one electric automotive vehicle E is completed.

If another electric automotive vehicle E is subsequently parked in the parking lot, the charging is performed by electromagnetically coupling the primary and secondary coils 10, 20 in the same manner. Since the magnetic sensors 50 detect the position of the secondary coil 20, every electric automotive vehicle can be coped with without labor. Therefore, for example, an unmanned parking lot for charging electric automotive vehicles may be operated.

The second embodiment is a system which adopts a self-propelled car 60 carrying a primary coil as a coil moving means to guide the primary coil to a position where it is to be electromagnetically coupled with a secondary coil. Hereafter, the content of this embodiment is described with reference to FIGS. 15 to 25.

Figure 15:
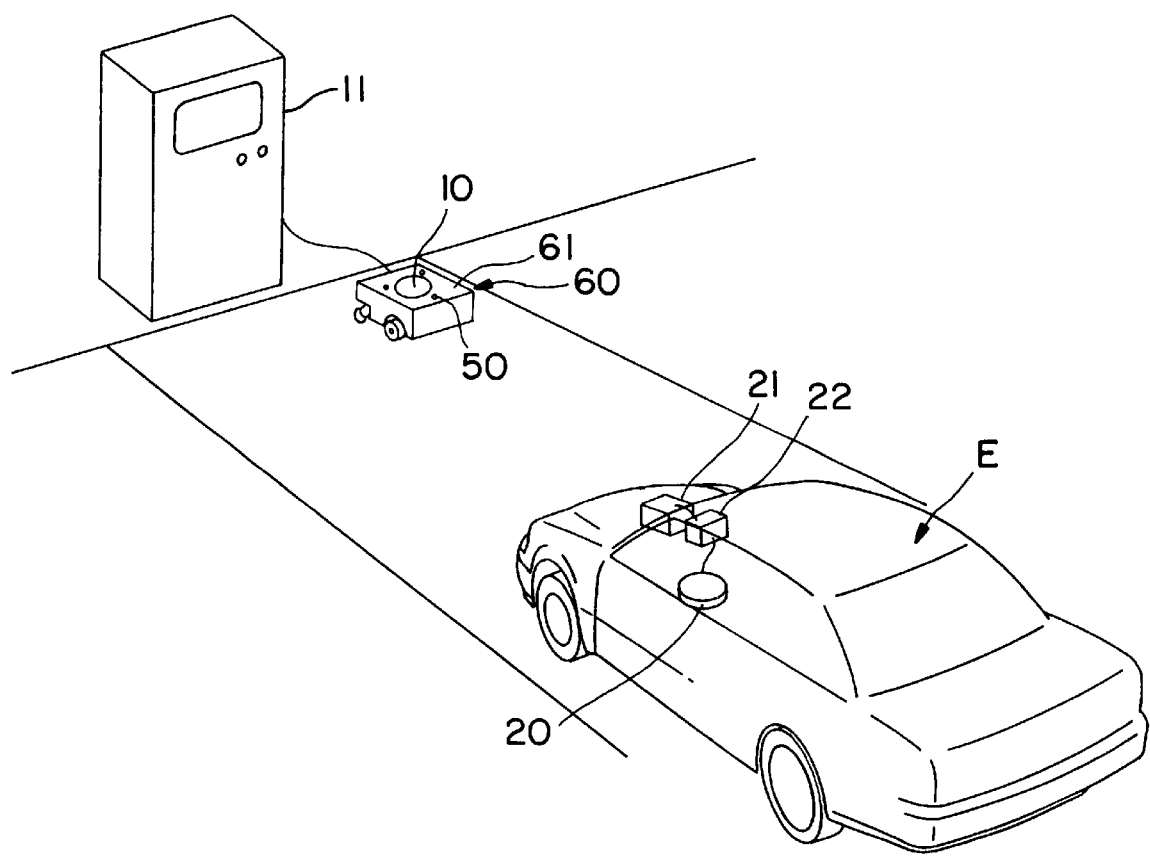
FIG. 15 is a perspective view of a second embodiment of the invention.

FIG. 15 shows an electric automotive vehicle E advancing into a parking lot equipped with the above system.

Figure 16:
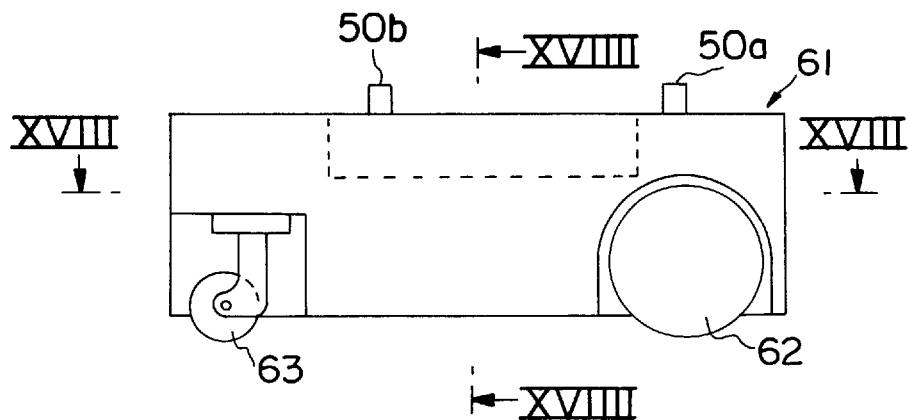
FIG. 16 is a side view of a self-propelled car as a coil moving means.
Figure 17:
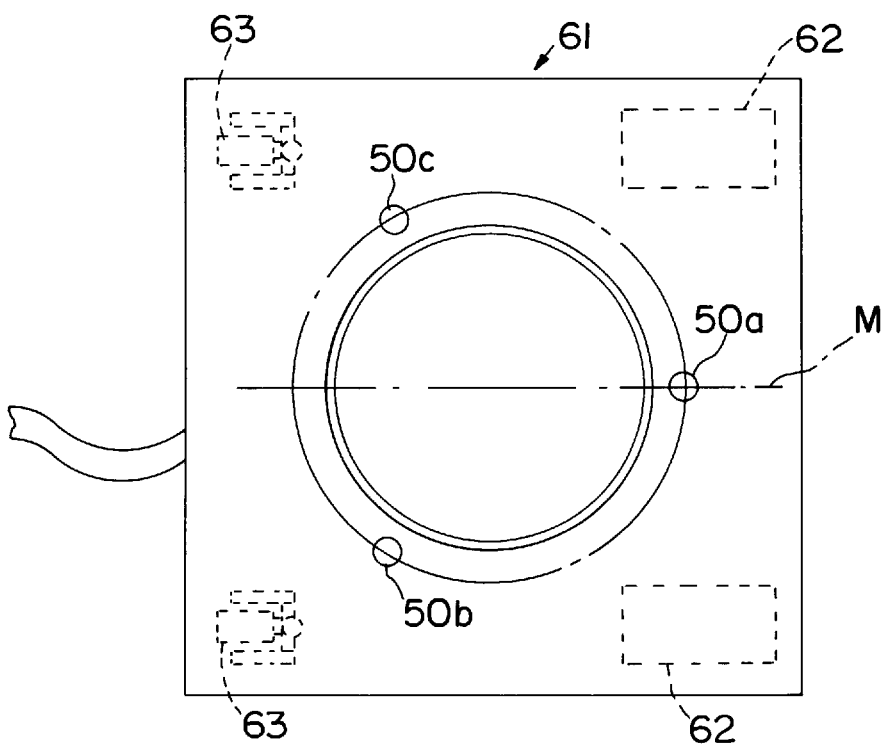
FIG. 17 is a plan view of the self-propelled car.
Figure 18:
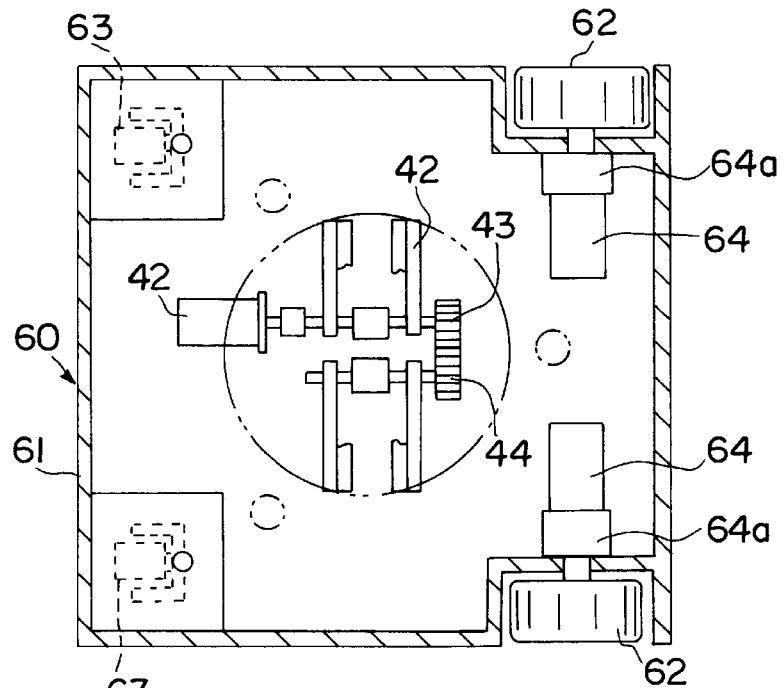
FIG. 18 is a section along XVIII—XVIII of FIG. 16.

On the ground of the parking lot, the self-propelled car 60 connected with an external power supply equipment 11 is waiting on standby. The car 60 has preferably four wheels at the bottom of a flat boxlike car body 61, and can run on the ground of the parking lot. The four wheels include larger front wheels 62 and smaller rear wheels 63 as shown in FIGS. 16 and 17. As shown in FIG. 18, motors 64 are connected with the front wheels 62 via speed reducers 64a so that the front wheels 62 can be separately driven, and casters are used as the rear wheels 63 so that the running direction can be freely changed. Accordingly, the self-propelled car 60 linearly moves if the left and right front wheels 62 are evenly driven, while the car 60 changes its direction if the front wheels 62 are differently driven.

Figure 19:
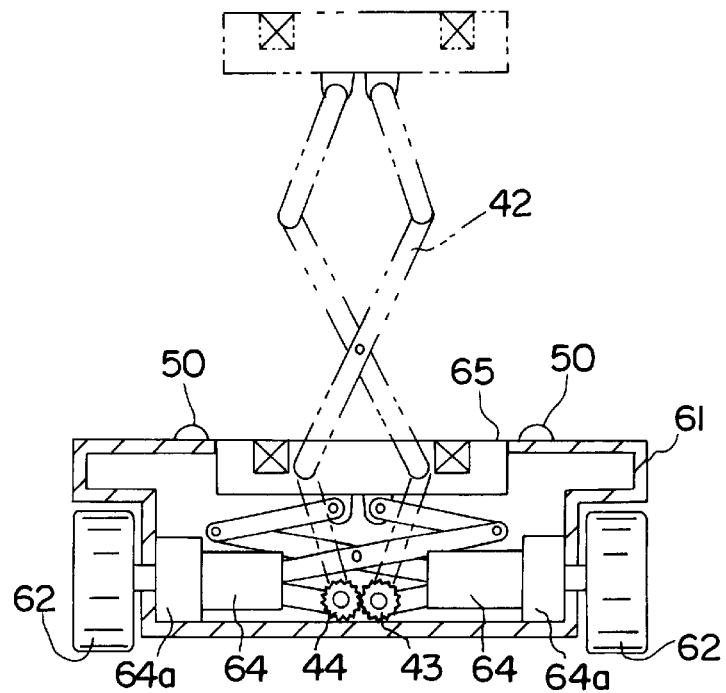
FIG. 19 is a section along XVIIII—XVIIII of FIG. 16.

As shown in FIG. 19, an opening 65 is formed in the upper surface of the car body 61. A primary coil 10 is provided in the opening 65, and three magnetic sensors 50 are equally spaced around the opening 65. As shown in FIG. 17, the primary coil 10 and the magnetic sensors 50 are symmetrically arranged with respect to a center line (M in FIG. 17) along the widthwise direction of the wheels, and one of the three magnetic sensors 50 (magnetic sensor 50a) is located on the center line M at the front side of the car body 61. Similar to the first embodiment, a pantograph 43 or the like and a drive motor 42 therefor are provided in the car body 61 to move the primary coil 10 upward and downward.

Power transmission lines or signal lines of the aforementioned motors 64, motor 42 and primary coil 10 are bundled at the rear surface of the car body 61 and connected with the external power supply equipment 11.

Since the other construction is similar to that of the first embodiment, no description is given thereto by identifying the same parts by the same reference numerals in order to avoid repetition. Hereafter, the operation of the charging system is described.

Figure 20:
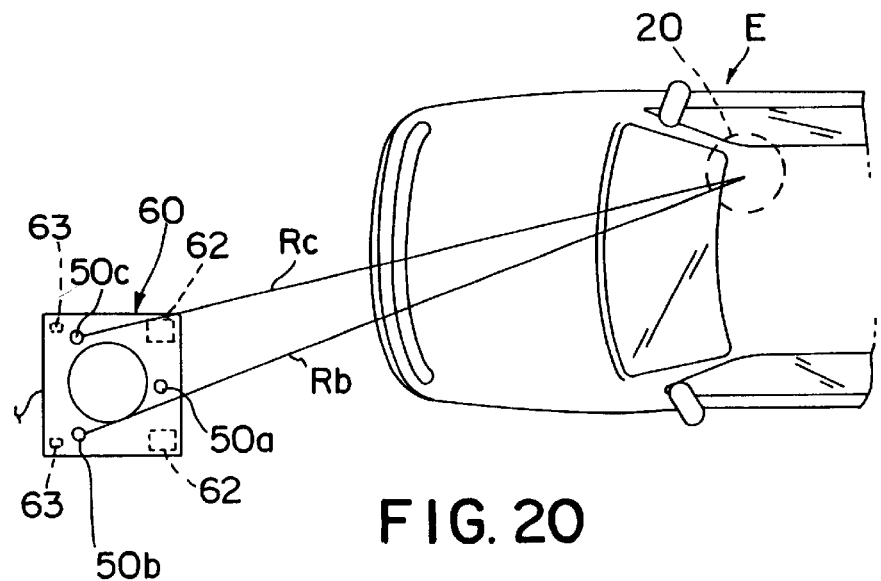
FIG. 20 is a plan view showing a state where a primary coil of the self-propelled car is distanced from the secondary coil of the vehicle.
Figure 23:
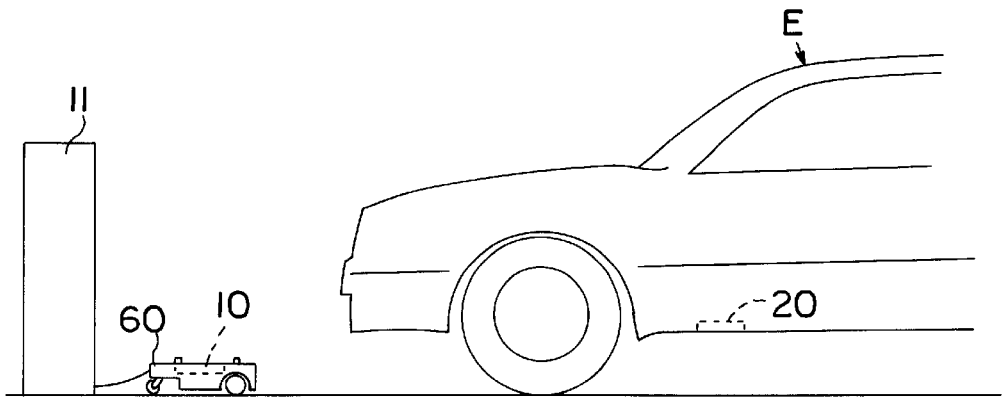
FIG. 23 is a side view showing a state where the primary coil of the self-propelled car is distanced from the secondary coil of the vehicle.

The vehicle E is advanced into the parking lot and parked in a suitable position before or in proximity of the self-propelled car 60 waiting on the ground (FIGS. 20, 23). The secondary coil 20 is switched to a charging preparatory state by an operation unit of the vehicle E to generate an alternating magnetic field used for the position detection.

Then, the magnetic field extends to the three magnetic sensors 50 provided at the self-propelled car 60, and the intensity thereof is detected by the sensors 50. The detection results of the sensors 50 are compared by a main controller 12 as follows, and a coil moving device 30 is driven in accordance with the comparison result.

Figure 21:
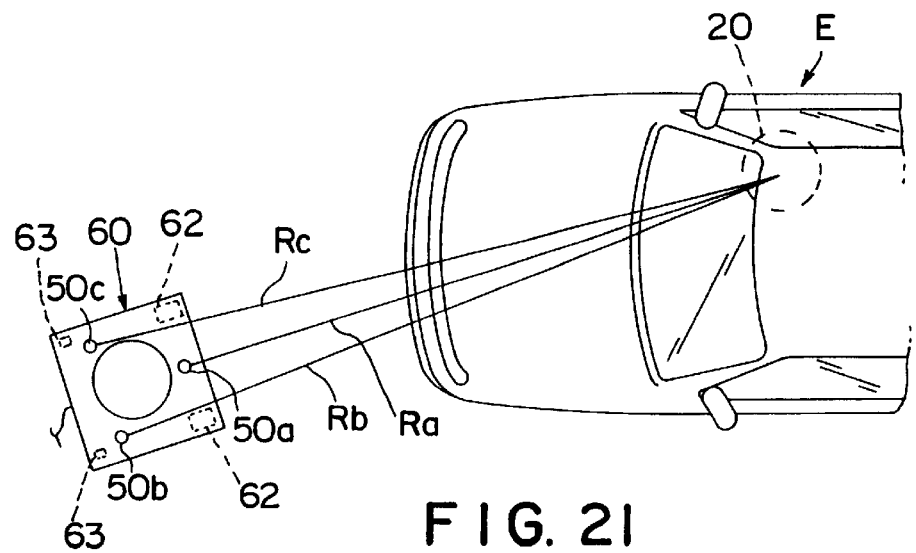
FIG. 21 is a plan view showing a state where the self-propelled car is directed toward the secondary coil.

First, in order to determine a direction with respect to the secondary coil 20 on the automotive vehicle E toward which the self-propelled car 60 is advanced, the detection results of the two magnetic sensors 50b, 50c arranged at the rear part of the car body 61 (50b, 50c refer to the magnetic sensors arranged clockwise from the magnetic sensor 50a) are compared. The front wheel 62 as a driving wheel of the side where the magnetic sensor 50b having detected the weaker magnetic field intensity is provided is driven forward until the intensity deviation becomes nil i.e. the magnetic sensors 50b, 50c detect substantially equal magnetic intensities. As a result, as shown in FIG. 21, the self-propelled car 60 stops, facing toward the secondary coil 20.

Figure 22:
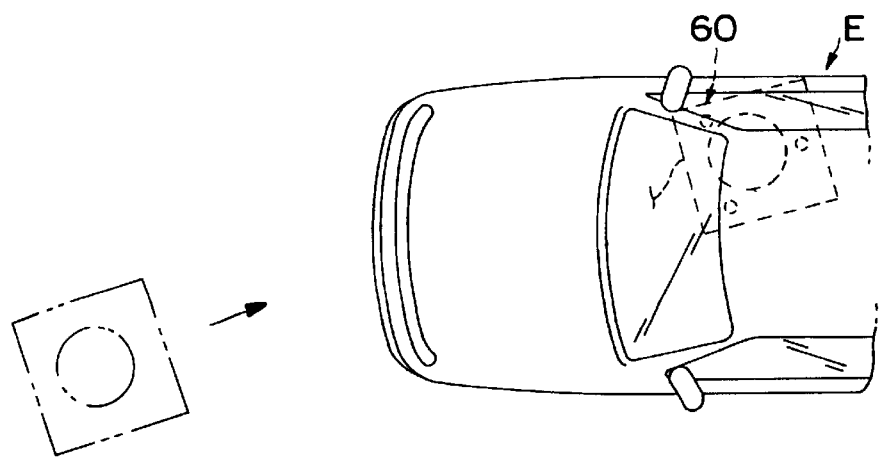
FIG. 22 is a plan view showing a state where the self-propelled car is advanced to move the primary coil to a position below the secondary coil.
Figure 24:
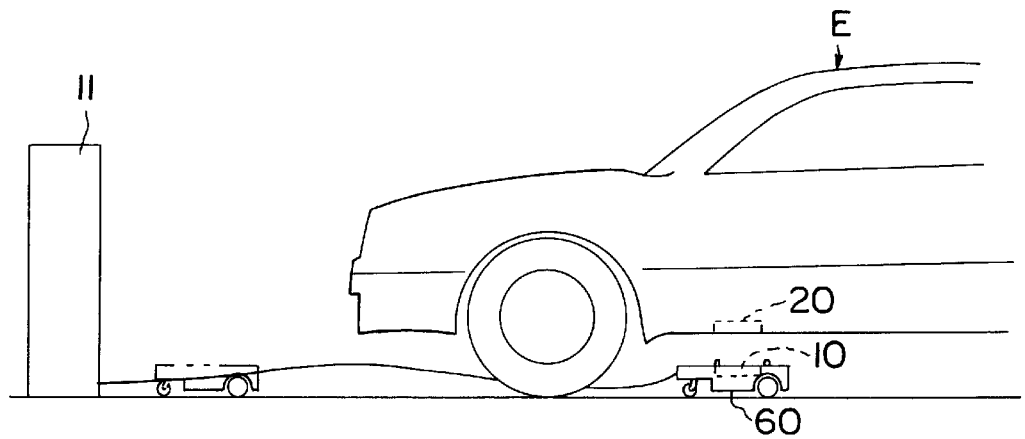
FIG. 24 is a side view showing a state where the self-propelled car is advanced to move the primary coil to the position below the secondary coil.
Figure 25:
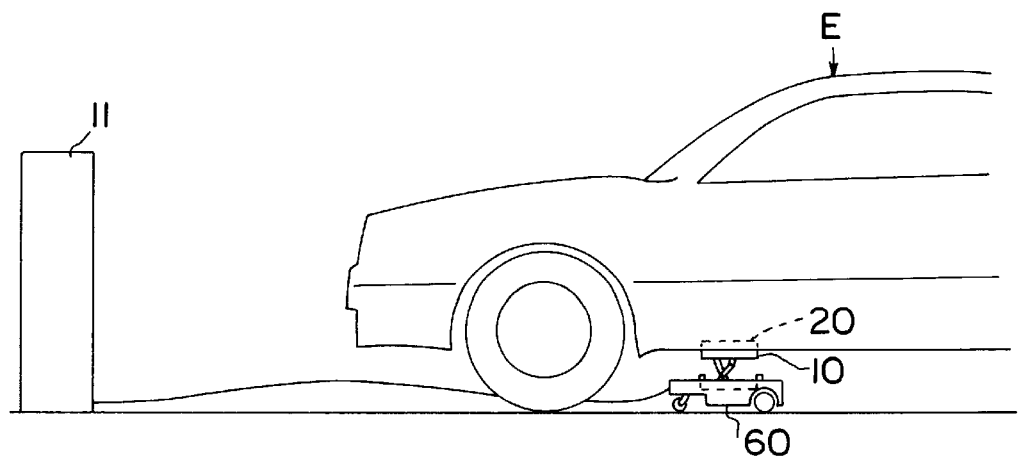
FIG. 25 is a side view showing a state where the primary and secondary coils are brought into contact.

Subsequently, the detection results of the magnetic sensor 50a and the magnetic sensor 50b (may also be 50c) at the rear side of the car body 61 are compared, and the left and right front wheels 62 are driven forward until both detection results agree, thereby advancing the car 60. As a result, as shown in FIGS. 22 and 24, the self-propelled car 60 stops in a position where the primary and secondary coils 10, 20 are opposed to each other.

In this position, the pantograph 43 is extended to bring the protection casings of both coils 10, 20 substantially into contact (FIG. 25), and the charging as mentioned above is performed. Upon completion of the charging, the drive motors 64 are driven in an order reverse of the aforementioned one to bring the car 60 back to its standby position. If another electric automotive vehicle E is subsequently parked in the parking lot, the charging is performed by electromagnetically coupling the primary and secondary coils 10, 20 in the same manner.

In this embodiment, it is sufficient to park the vehicle E before the self-propelled car 60 and, hence, parking is not restricted very much. Accordingly, the vehicle E can be easily parked. Further, since the car 60 can be moved to its standby position when charging is not performed, the charging facility does not take up a large space. Furthermore, this system can be installed in already existing parking facility without any large scale reconstruction.

The present invention is not limited to the foregoing embodiments. For example, embodiments described below are also embraced by the technical scope of the present invention as defined in the claims. Further, besides the following embodiments, a variety of changes can be made without departing from the spirit and scope of the present invention as defined in the claims.

(1) Coil Position Detecting Means

Although the coil position detecting means detects the position of the coil using the magnetic sensors in the foregoing embodiments, it may be, for example, such that a light source is provided at the secondary coil while a plurality of photodetectors are provided at the primary coil to detect the position of the secondary coil. Alternatively, a radio wave transmission source may be provided at the secondary coil and the position of the coil may be detected based on that. However, if the coil position detecting means taking advantage of a magnetic field is used, a magnetic field used for the position detection can be generated using a coil used for the charging. Accordingly, it is not necessary to newly provide a light source or radio wave transmission source, leading to a reduced production cost.

As described below, a plurality of magnetic sensors may not be necessary, but a single magnetic sensor may be able to guide the primary coil to the position where it is to be coupled with the secondary coil. In other words, the magnetic field intensity detected by the magnetic sensor is in inverse proportion to the distance to the secondary coil. Accordingly, the primary coil is experimentally moved in a predetermined direction by a specified distance. The primary coil is moved in the opposite direction if the magnetic field intensity detected by the magnetic sensor becomes weaker, while being further moved in the same direction if it becomes stronger, thereby making the magnetic field intensity constantly stronger. Subsequently, the primary coil is experimentally moved in a direction particularly rotated by about 90° to find a direction in which the magnetic field intensity becomes stronger. If the above operation is repeated, the primary coil approaches the secondary coil along a zigzag trail and consequently reaches the position where it is to be coupled with the secondary coil.

Further, the following arrangement enables the use of the primary coil as a magnetic sensor for the position detection. In other words, where the vehicle is parked, the secondary coil is excited with a specified frequency to generate an alternating magnetic field for the position detection. This magnetic field extends to the primary coil, thereby inducing an electromotive force of the same frequency in the primary coil. The intensity of this electromotive force is in inverse proportion to the distance between the primary and secondary coils. Accordingly, by measuring the electromotive force induced in the primary coil, the intensity of the magnetic field generated by the secondary coil can be measured and, therefore, the distance to secondary coil can be measured.

Further, the following arrangement makes it unnecessary to generate an alternating magnetic field for the position detection. Where the vehicle is parked, the secondary coil is excited with a specified frequency. Then, a magnetic flux from the primary coil links with the secondary coil, thereby generating an induced electromotive force in the secondary coil. At this stage, if a suitable load is connected with the secondary coil, a load current flows through the secondary coil and also through the primary coil by the action of mutual induction. A phase difference between the load current at the primary coil and the exciting voltage differs depending upon the degree of connection of both coils, i.e. the distance between both coils. The shorter the distance between the coils, the higher the degree of magnetic connection, i.e. the phase difference between the load current at the primary coil and the exciting voltage of the primary coil becomes smaller. Therefore, the distance between the coils can be measured by measuring the above phase difference.

(2) Coil Moving Means

Figure 26:
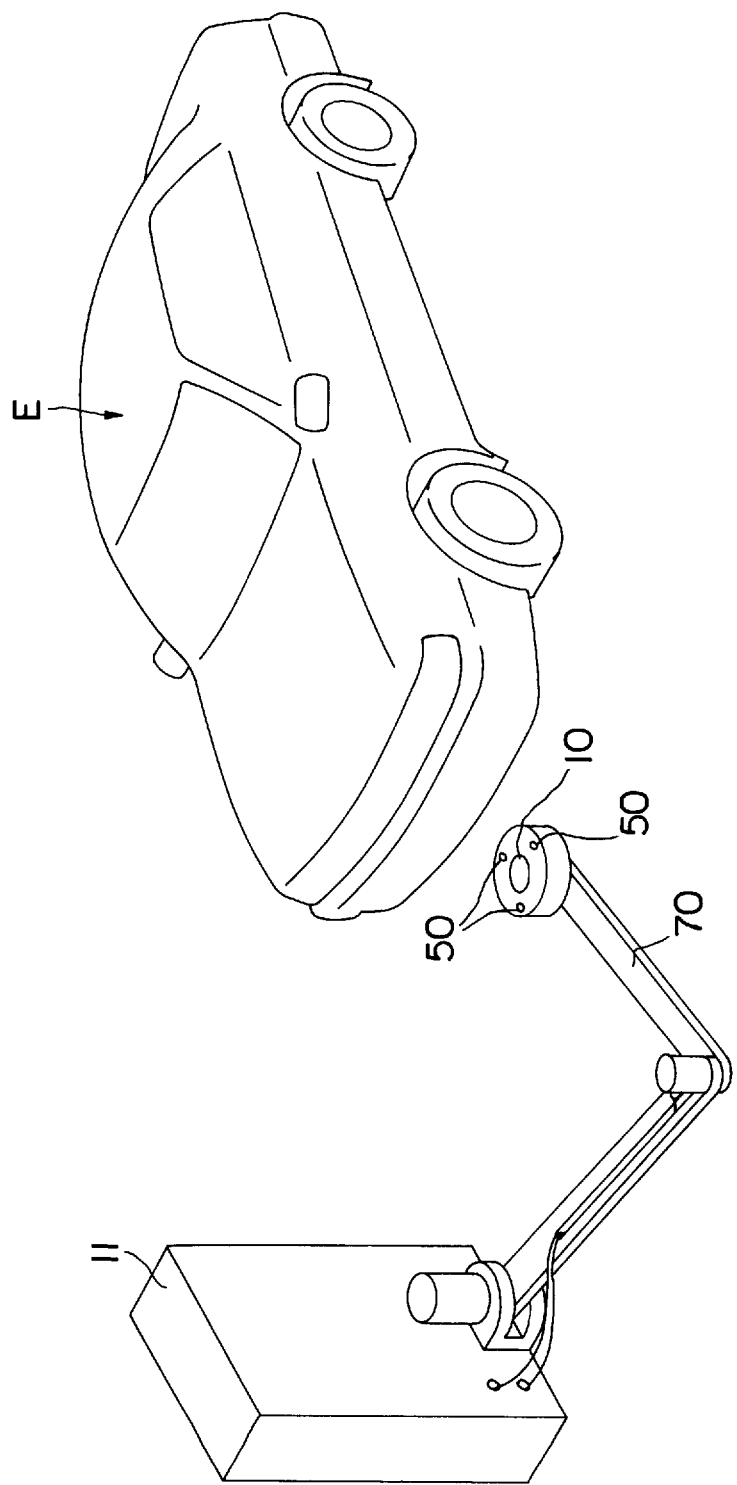
FIG. 26 is a perspective view of a first modification of the coil moving means as a third embodiment.

Instead of the aforementioned coil moving means, for example, a manipulator 70 having two or more movable members and two or more drive shaft means, as shown in FIG. 26 may be used, and the primary coil 10 and the magnetic sensors 50 may be provided at its leading end. Such coil moving means can cope with electric automotive vehicles E in which the secondary coil is provided on one side surface or the ceiling surface thereof by changing the mount position of the manipulator 70. Further, if the number of drive shafts of the manipulator 70 itself is increased, the above can be coped with without changing the mount position.

A coil moving means may be provided (not shown) with a telescopic arm, being in particular rotatably supported at an end opposite to an end, where the primary coil is mounted. The coil moving means may further comprise a rotatable arm being rotatably or pivotably mounted at the end, where the primary coil is mounted.

Figure 27:
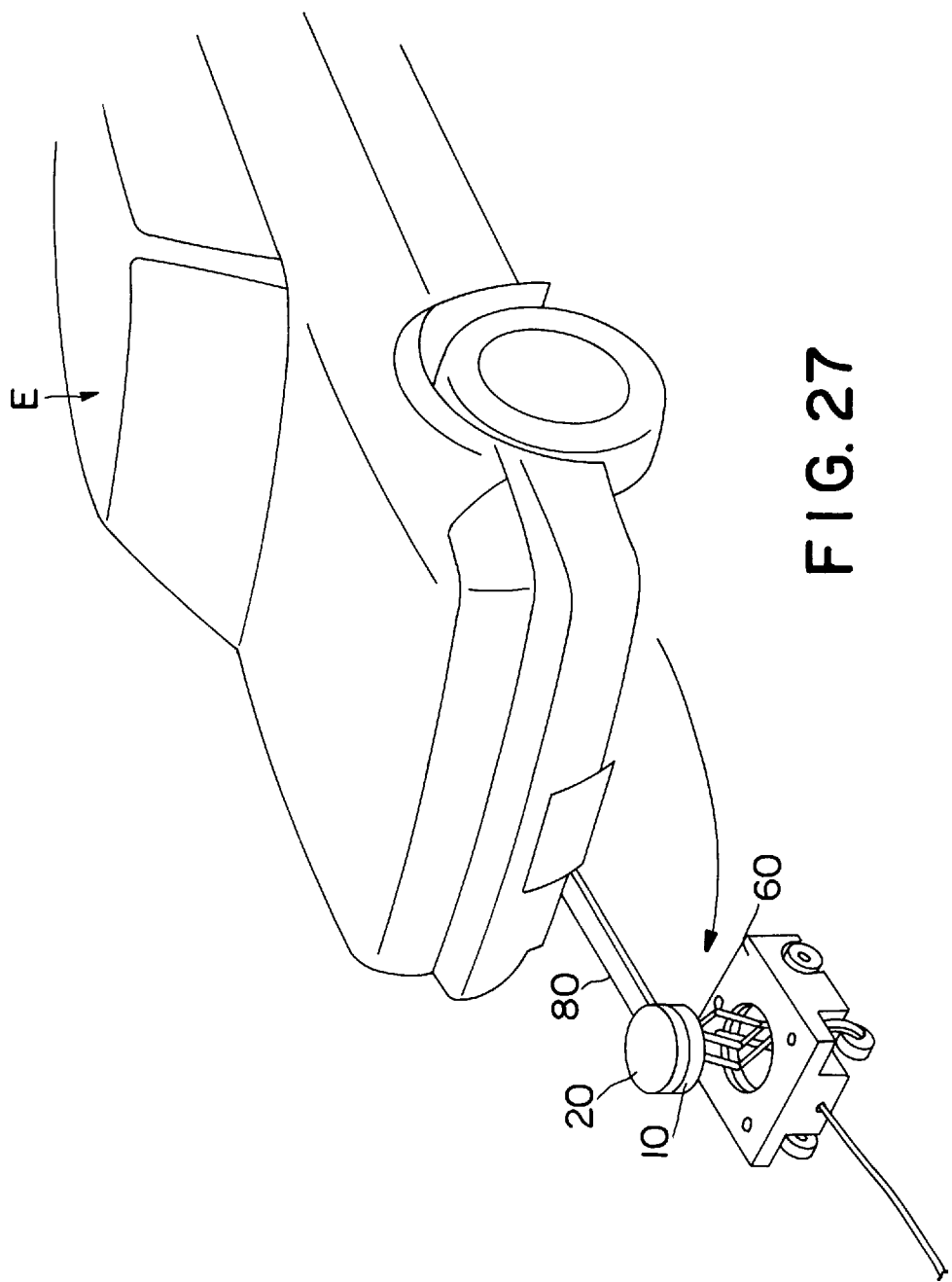
FIG. 27 is a perspective view of a second modification of the coil moving means as a fourth embodiment.

The coil moving means may not necessarily be so constructed as to move only the primary coil 10. For example, as shown in FIG. 27, a rotatable lever 80 as a coil moving means may be provided at the secondary coil 20 of the vehicle E so that the primary coil 10 is moved while the secondary coil 20 is moved. Further, a large displacement may be corrected by the coil moving means of the vehicle E, and fine positioning may be done by the coil moving means provided at the parking lot.

(3) Control Means

The aforementioned control means controls the coil moving means in two stages (displacement along X- and Y-directions in the first embodiment, and orientation and distance in the second embodiment) by comparing the detection results of two each of the three sensors. However, the control means may perform a continuous control by comparing the detection results of the three sensors at once without comparing in two stages, or may calculate a shortest route to a target position based on the detection results which vary as the sensors move to position the primary and secondary coils.

Hereafter, a fifth embodiment of the invention is described with reference to FIGS. 28 to 32.

Figure 28:
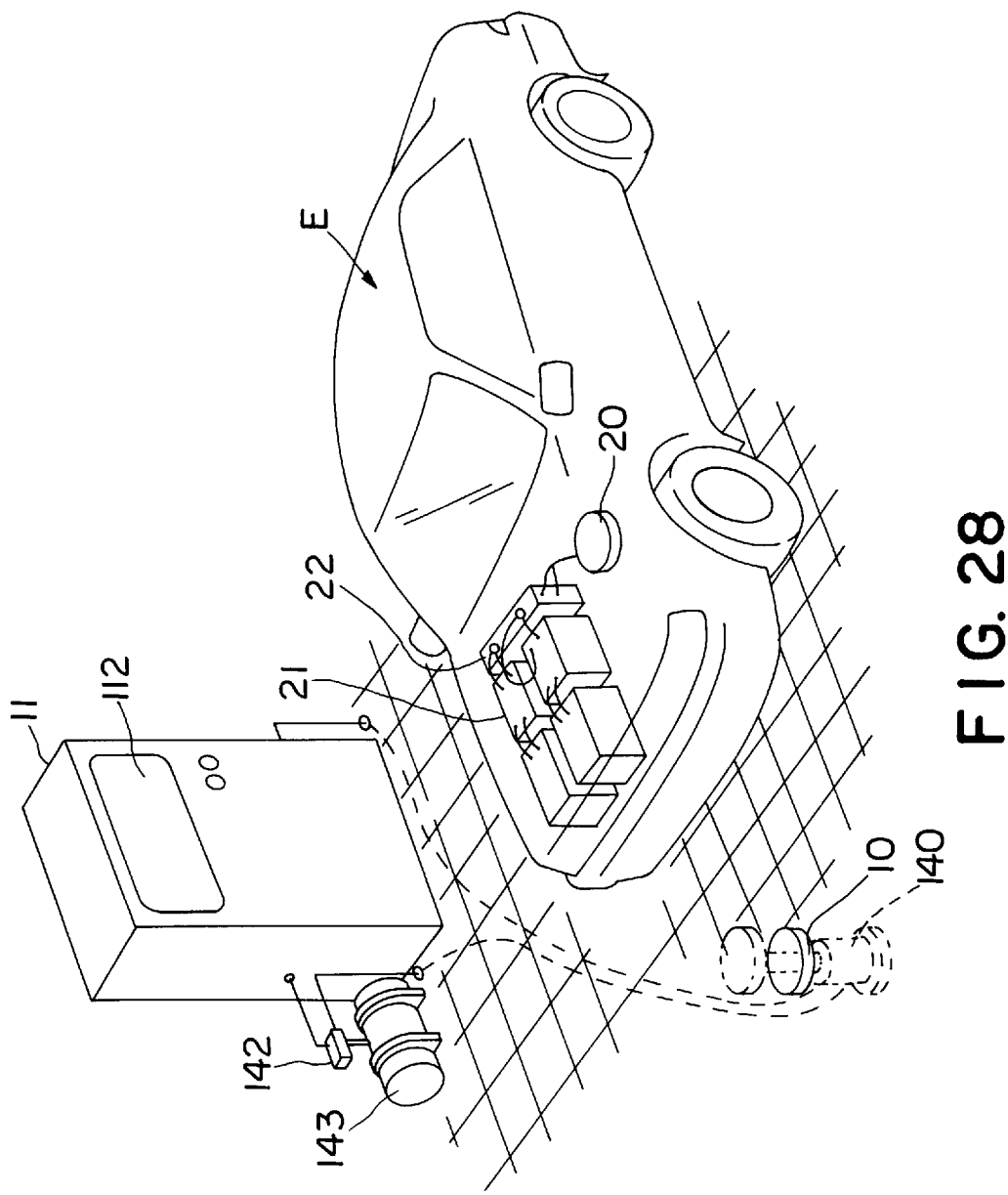
FIG. 28 is a perspective view of a fifth embodiment according to the invention.
Figure 29:
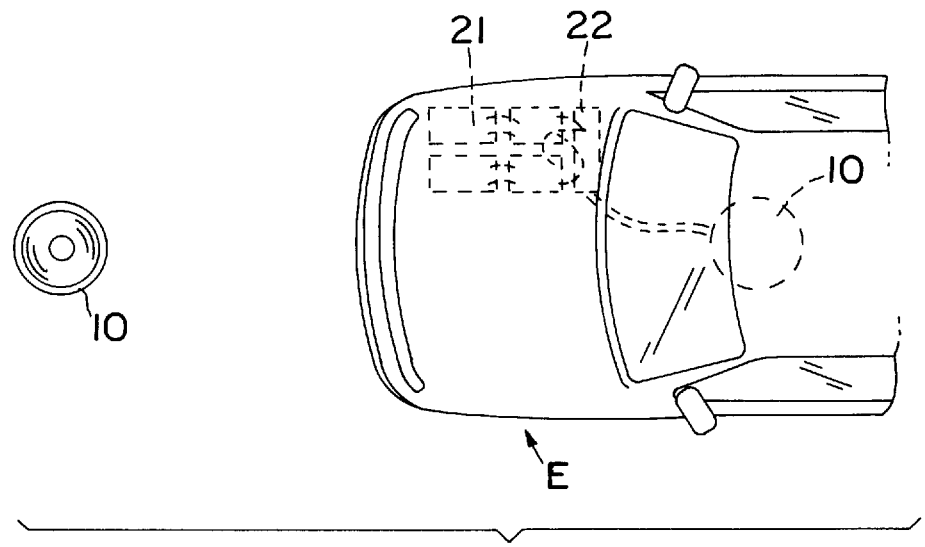
FIG. 29 is a plan view of the fifth embodiment.

FIG. 28 shows an electric automotive vehicle E provided with a primary coil 20 which is advancing into a parking lot equipped with a secondary coil 10.

The vehicle E includes, as a main power source, a load and/or a battery 21 which is a charging or storing device for a driving source. Upon receipt of power supplied from the battery 21, a motor functions for driving the vehicle and a variety of electric devices. A secondary coil 20 is connected with the battery 21 via a charging circuit 22, and the battery 21 is charged by rectifying an alternating current induced by the secondary coil 20.

The secondary coil 20 is preferably in the form of a flat plate formed by, e.g. winding a wire around a magnetic core of ferrite, and is accommodated in a protection casing e.g. of synthetic resin. The secondary coil 20 is mounted in particular at a bottom portion of the vehicle body with the longitudinal axis of the magnetic core substantially along the vertical direction, so as to face the ground.

Figure 31:
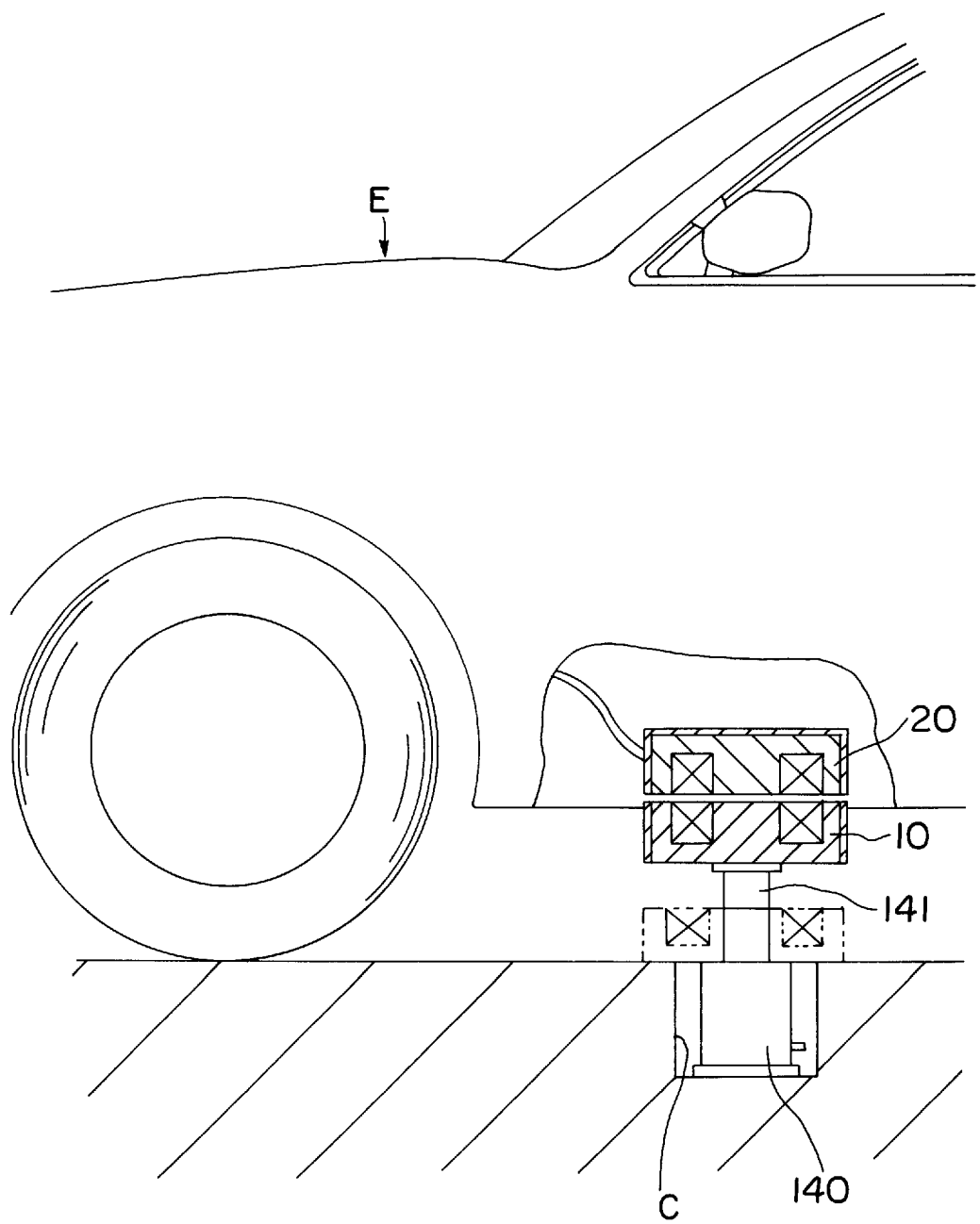
FIG. 31 is a partial enlarged side view of the fifth embodiment.

On the other hand, the parking lot is equipped with an external power source unit 11 used for the external charging, and a primary coil unit 10 connected with this external power source unit 11 is installed in the ground of the parking lot. As shown in FIG. 31, the primary coil unit includes the primary coil 10 which is in the form of a flat plate formed by, e.g. winding a wire around a magnetic core of ferrite, and is accommodated in a protection casing. The primary coil 10 is supported at the leading end of a drive shaft 141 of an air cylinder 140 with the longitudinal axis of its magnetic core along the vertical direction. This air cylinder 140 is embedded in a recess C formed in the ground of the parking lot such that only the primary coil 10 projects from the ground. To the air cylinder 140 is supplied a compressed air from a compressor 143 via an electromagnetic valve 142. By opening and closing the electromagnetic valve 142 by using an operation panel 112 provided in the external power source unit 11, the drive shaft 141 is driven along an extension direction of the air cylinder 140, e.g. substantially upward and downward. When the drive shaft 141 is driven downward, the primary coil 10 is located at a height where it does not or is unlikely to interfere the bottom of the vehicle E. When the driven shaft 141 is driven upward, protection casings of the coils 10, 20 are substantially brought into contact, considerably enhancing a degree of electrical connection of the coils 10, 20. Since a compressed air is kept being supplied to the air cylinder 140 while the coils 10, 20 are in contact with each other, the coils 10, 20 are pressed against each other. The drive force of the cylinder 140 is set such that an excessively large force is not exerted on the coils 10, 20. Alternatively a locking means may be provided for locking the air cylinder 140 in its extended position.

Next, how the electric vehicle E is charged in this embodiment is described.

Figure 30:
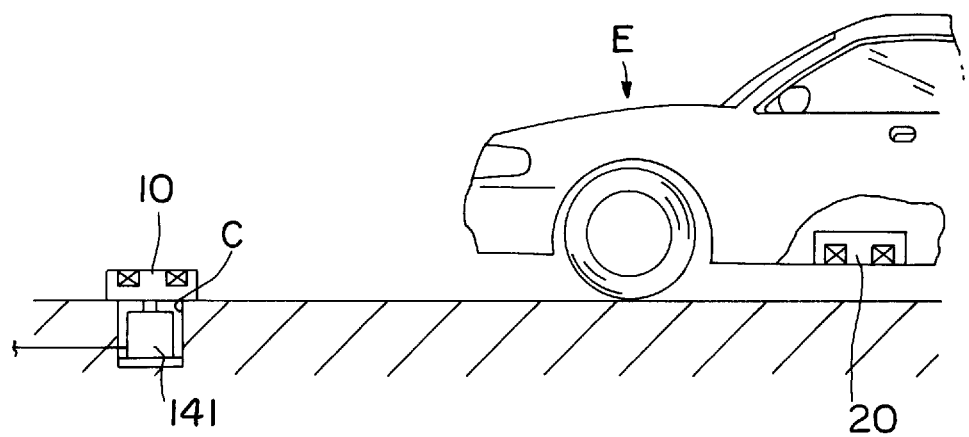
FIG. 30 is a side view of the fifth embodiment.

When the vehicle E is advanced into the parking lot, The drive shaft 141 of the air cylinder 140 is moved to its retracted or standby position, e.g. substantially lowered so that the primary coil 10 does not interfere with the bottom of the electric vehicle E as shown in FIGS. 28 and 30. Next, the vehicle E is parked in a charging position, and the secondary coil 20 provided at the bottom of the vehicle E is brought to a position substantially above the primary coil 10 installed in the ground of the parking lot. Since the bottom of the vehicle E is (depending on the type of vehicle E) constantly located at a specified height from the ground of the parking lot, the coils 10, 20 are caused to face at a specified distance from each other only by parking the vehicle E such that the primary coil 10 is located between the wheels of the vehicle E. In other words, there is no likelihood that the charging cannot be performed because the vehicle is parked with the coils 10, 20 spaced apart for fear that the coils come into contact. Since the longitudinal axes of the magnetic cores of the respective coils 10, 20 extend substantially along the vertical direction and the bottom of the vehicle E is substantially in parallel with the ground of the parking lot, the longitudinal axes of the magnetic cores of the coils 10, 20 do not obliquely face whichever direction the vehicle E is oriented. In other words, the vehicle E can easily be parked for the charging by fixing a distance between the coils 10, 20 and the orientation thereof irrespectively of how the vehicle E is parked.

Figure 32:
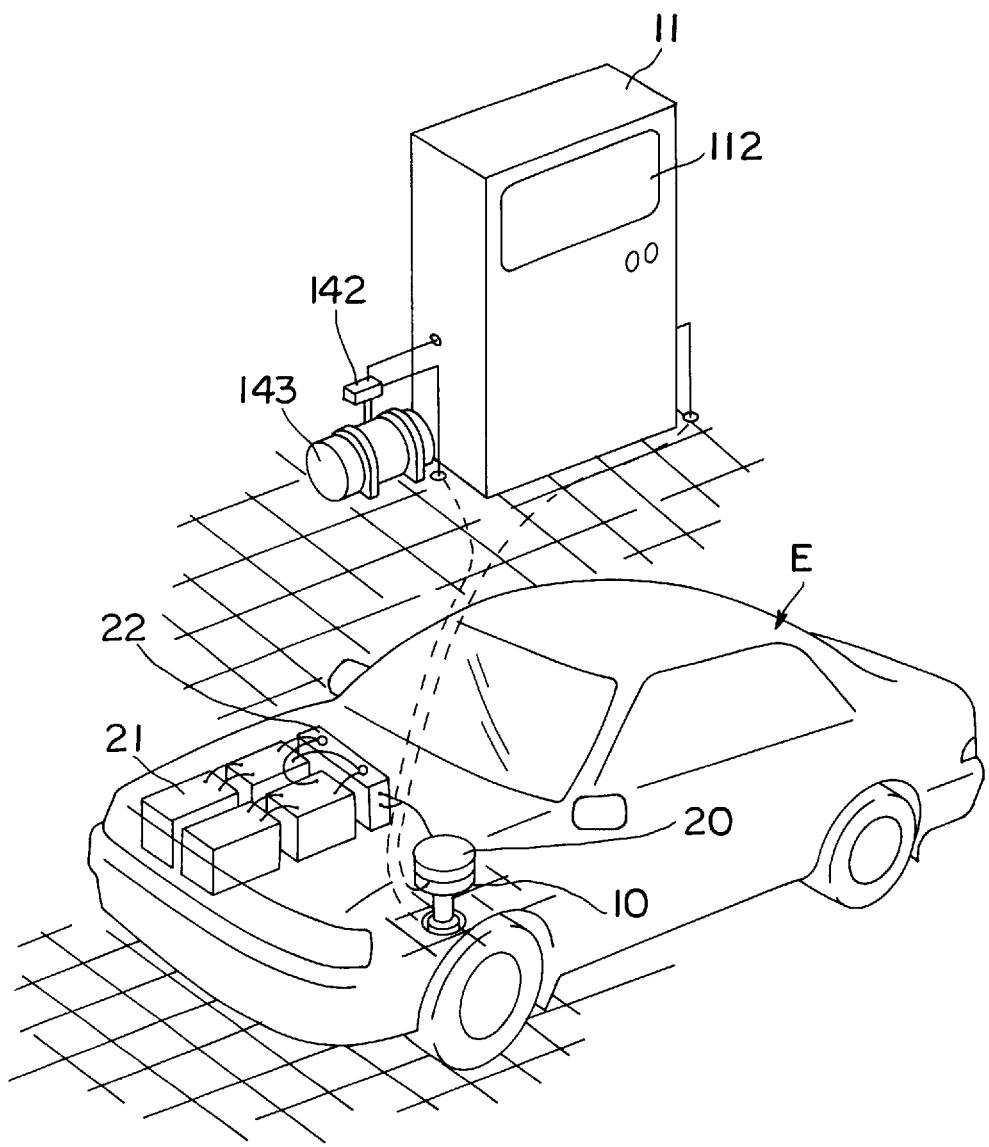
FIG. 32 is a perspective view showing a state where coils of the fifth embodiment are electromagnetically connected.

After the vehicle E is parked in a specified position, the primary coil unit is operated by the operation panel 112 provided at the external power source unit 11 to move or displace the primary coil 10 by the air cylinder 140. Then, as shown in FIGS. 31 and 32, the secondary coil 20 and the primary coil 10 are held with the protection casings thereof in contact with each other. Since the above operation is performed below the body of the vehicle E, an obstacle or the like does not come between the coils held in contact.

After the coils 10, 20 substantially face in contact with each other, the external power source unit 11 is operated to excite the primary coil 10. Then, a voltage is generated in the secondary coil 20 by electromagnetic induction, and the charging circuit 22 charges the battery 21 of the vehicle E. When the battery 21 is charged to a specified degree, the excitation of the primary coil 10 is stopped and the primary coil 10 is lowered, thereby completing the charging.

Figure 33:
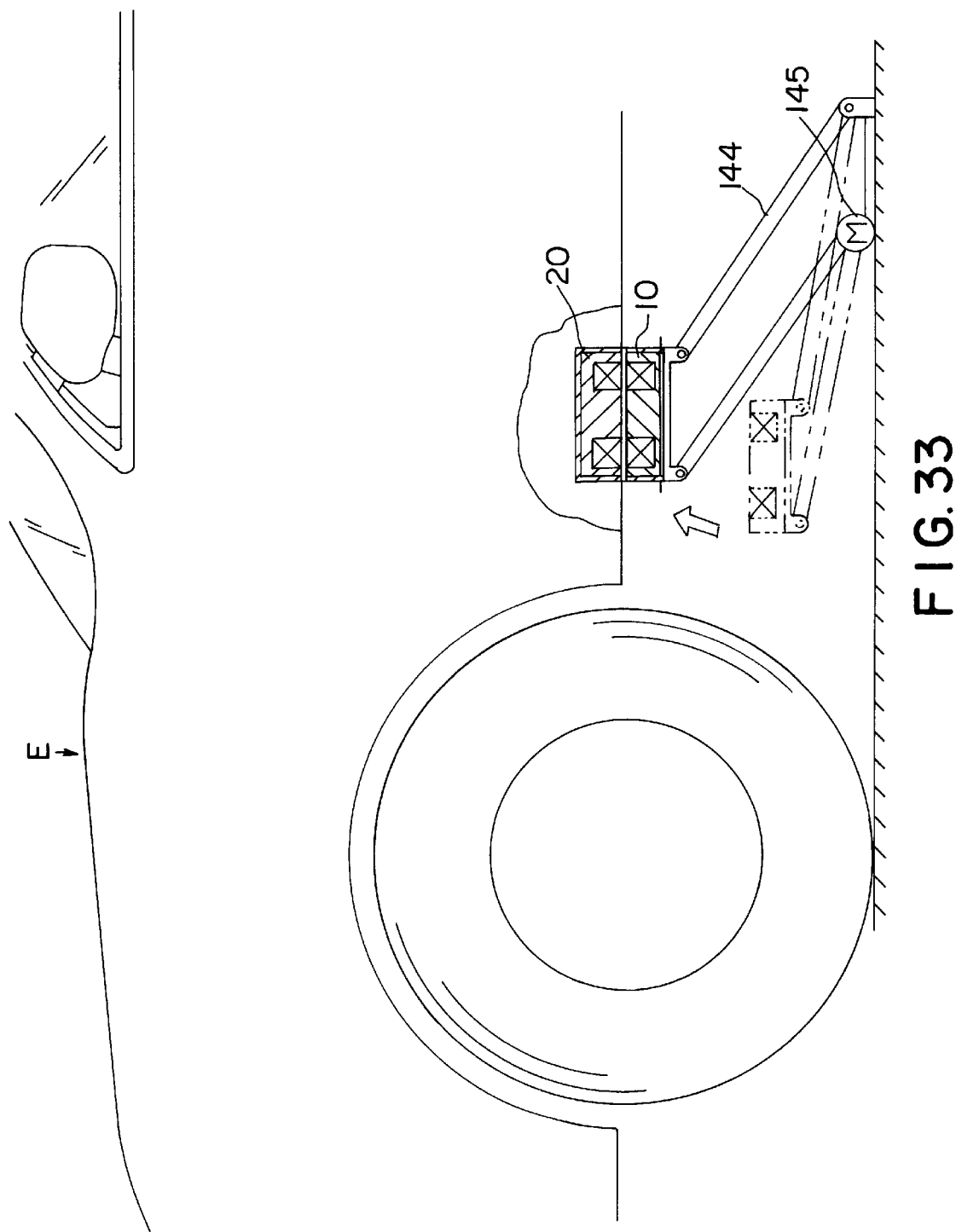
FIG. 33 is a side view of a fifth modification of a coil moving means of the fifth embodiment.
Figure 34:
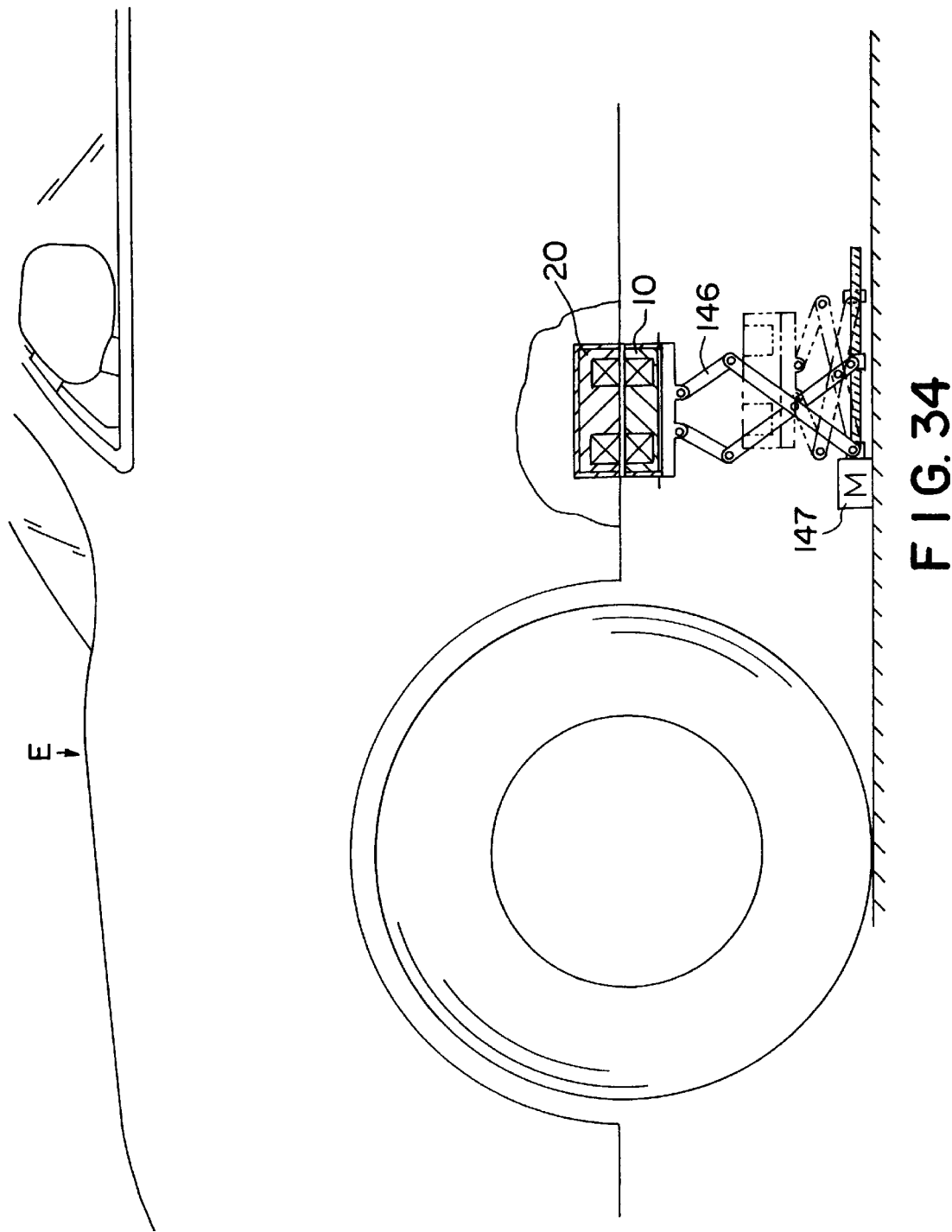
FIG. 34 is a side view of a second modification of the coil moving means of the fifth embodiment.
Figure 35:
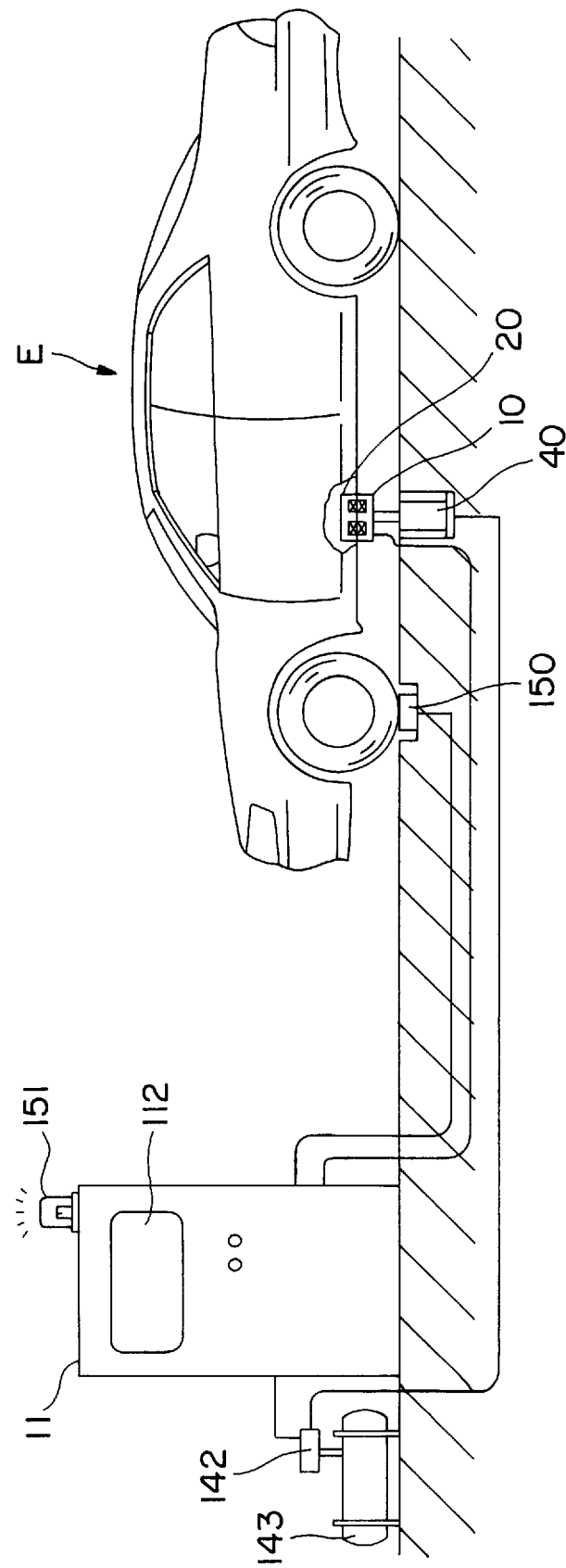
FIG. 35 is a side view of a sixth embodiment according to the invention.

Although the coil moving means is of air actuated cylinder type in this embodiment, it may include an elevating mechanism such as a parallel link mechanism 144 as shown in FIG. 33 or a pantograph mechanism 146 as shown in FIG. 34 which is driven by a motor 145 or 147. The coil moving means including the parallel link mechanism 144 and the pantograph mechanism 146 can have a lower height as compared with the cylinder type coil moving means.

Although the supply of compressed air is continued while the coils 10, 20 are held in contact with each other in this embodiment, the coils 10, 20 may not necessarily be pressed against each other after being brought substantially into contact with each other. For example, a pressure sensor or the like may be provided at the primary coil 10 to detect the contact of the coils 10, 20, and the extension, in particular substantially upward movement of the primary coil 10 is stopped in a position of substantial contact. In such a case, the detection of the contact of the coils 10, 20 may trigger or start the automatic activation of the external power source unit 11 for the automatic charging.

The sixth embodiment relates to a charging system for an electric automotive vehicle provided with a parking position detecting means for detecting that an electric automotive vehicle E has been parked in a charging position. Hereafter, the contents of this embodiment are described with reference to FIGS. 35 to 38.

Figure 36:
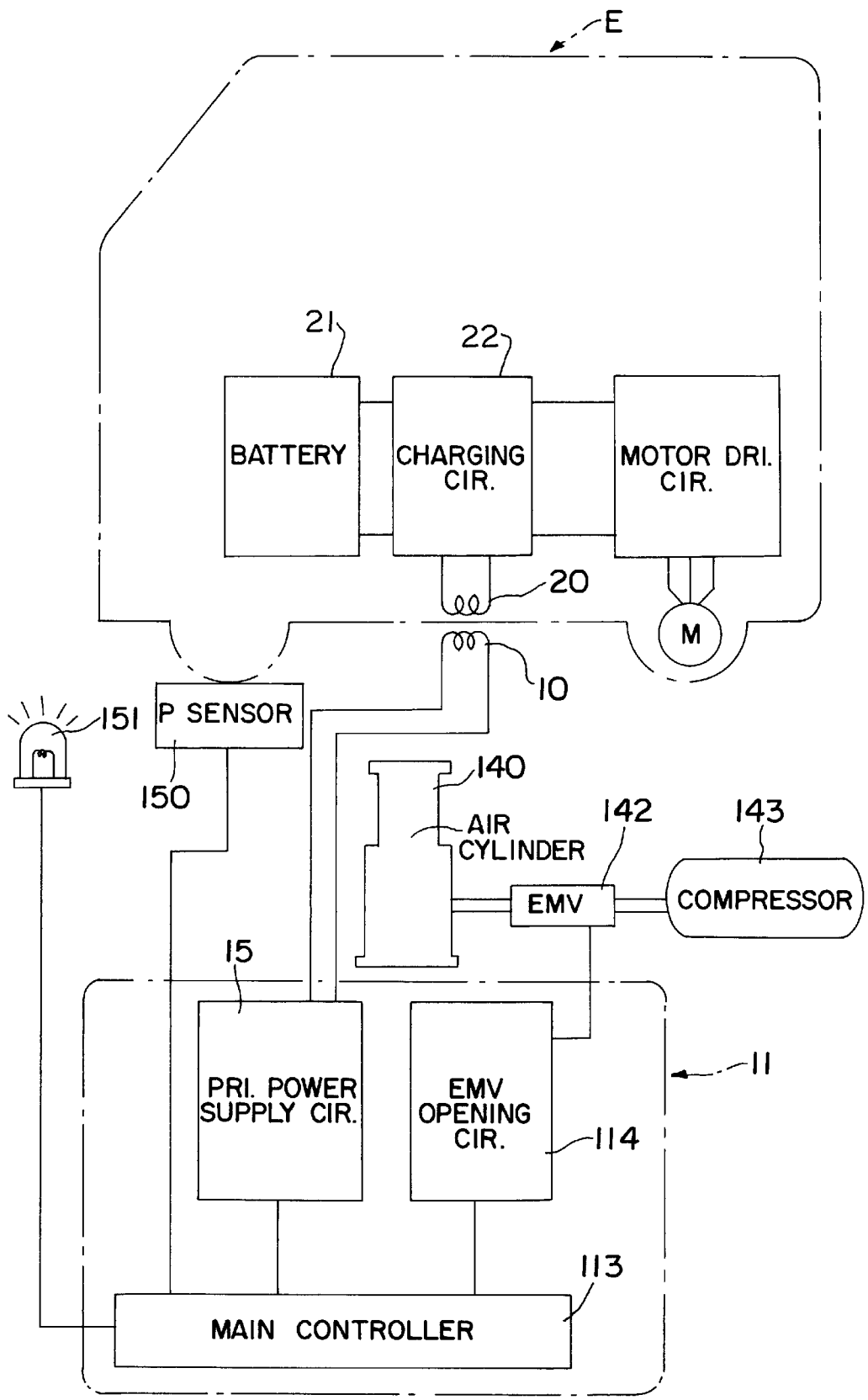
FIG. 36 is a block diagram of the sixth embodiment.

A primary coil 10 similar to the one in the fifth embodiment is installed in the ground of a parking lot, and a contactor pressure sensor 150 for detecting a contact or load acting from above is disposed in a recess formed in front of the primary coil 10 (left side in FIG. 36). The pressure sensor 150 is so disposed as to be located right below front wheels when the vehicle E is parked such that the primary and secondary coils 10, 20 face each other. In other words, the pressure sensor 150 instructs the parking position detecting means for detecting whether the vehicle E is properly parked in a charging position.

A signal line extending from the pressure sensor 150 is connected with a main controller 113 provided in an external power source unit 11 as shown in a block diagram of FIG. 36. In accordance with a sensor signal from the pressure sensor 150, an electromagnetic valve opening circuit 114 for actuating an air cylinder 140 and a primary power supply circuit 15 for exciting the primary coil 10 are controlled. A signalization or display means, e.g. a lamp 151 is provided at the external power source unit 11 so as to notify a driver that the vehicle E is in a proper charging position when the pressure sensor 150 detects a load. The lamp 151 is controlled by the main controller 113 so as to turn on in response to the pressure sensor 150. Here, a buzzer or the like may be used instead of the lamp 151.

Since the other construction is similar to the fifth embodiment, no repetitive description is given thereon by identifying the same elements by the same reference numerals. The operation of this charging system is described hereafter.

The vehicle E is parked in the parking lot. When the vehicle E reaches the proper charging position, the front wheels of the vehicle E are positioned on the pressure sensor 150. Accordingly, a large load acts on the pressure sensor 150, and a sensor signal is sent to the main controller 113. Upon the receipt of the sensor signal, the main controller 113 sets a flag indicative of, e.g. a charging enabled state, enabling a series of operations for the charging such as the driving of the air cylinder 140 and the excitation of the coil 10 as described above. If the front wheels of the vehicle E do not reach the pressure sensor 150 or pass it, no sensor signal is sent from the pressure sensor 150, with the result that the main controller 113 determines that the vehicle E is not in the predetermined charging position and the charging is not performed. Therefore, there is no likelihood that the charging is started while the coils 10, 20 are displaced from each other.

Figure 37:
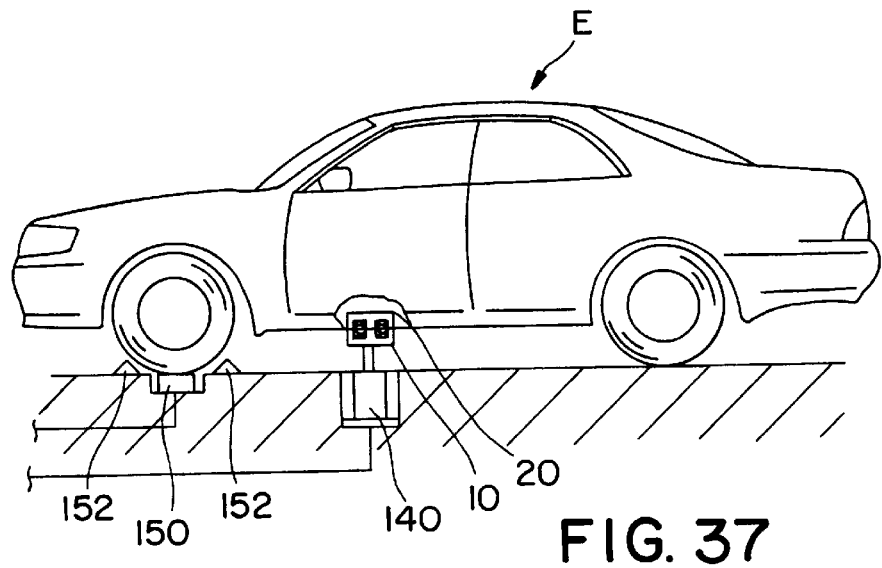
FIG. 37 is a side view of a first modification of a parking position detecting means of the sixth embodiment.
Figure 38:
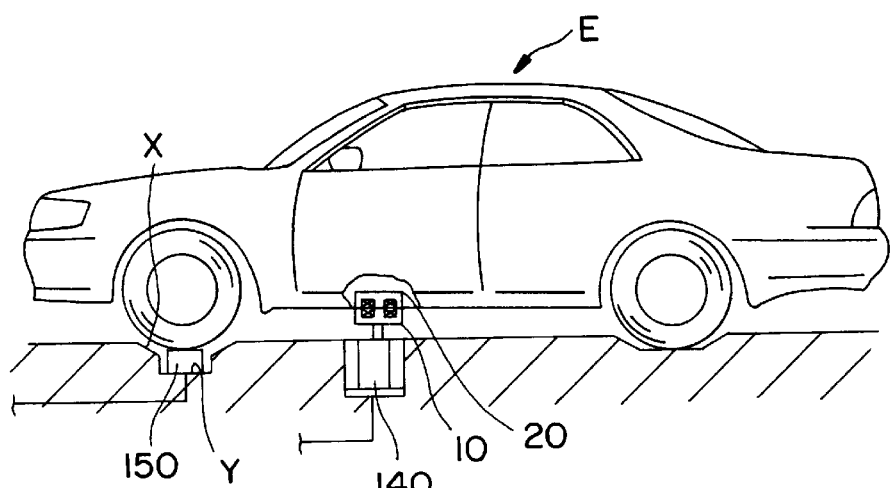
FIG. 38 is a side view of a second modification of a parking position detecting means of the sixth embodiment.
Figure 39:
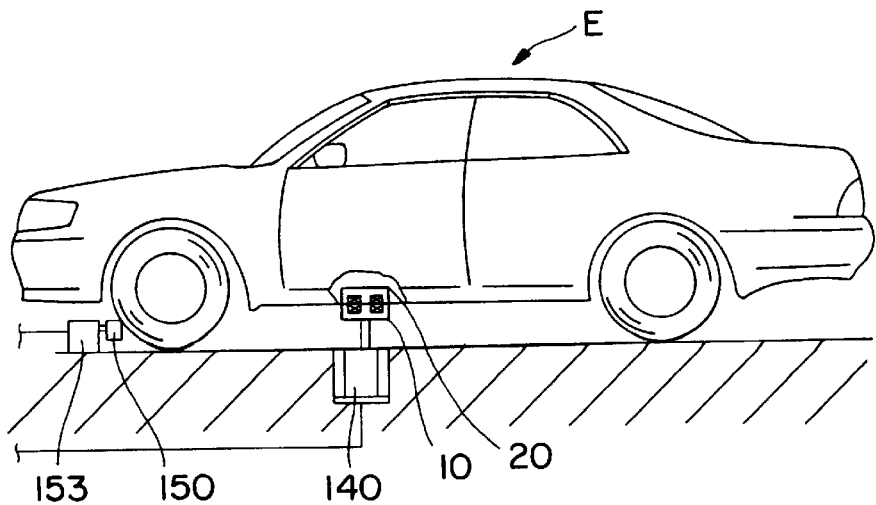
FIG. 39 is a side view of a third modification of a parking position detecting means of the sixth embodiment.

Although the parking position detecting means according to the sixth embodiment is such that the front wheels of the vehicle E are located on the pressure sensor 150, it may detect the parking position by bringing a bumper of the vehicle E into contact with a limit switch or a proximity switch. Furthermore an induction sensor or an infrared sensor or a radar sensor or the like non-contact sensors may be provided to detect whether a vehicle E has reached a predetermined or predeterminable position. Further, with the parking position detecting means including the pressure sensor, projections 152 may be provided at the periphery of the recess as shown in FIG. 37 or a bevelled portion X may be formed at the periphery of a recess Y for accommodating the pressure sensor 150 as shown in FIG. 38. Further, as shown in FIG. 39, a stopper 153 may be provided at the parking lot, and the pressure sensor 150 may be provided on a side surface of the stopper 153 such that the wheel comes into contact therewith. With the parking position detecting means as shown in FIGS. 37 to 39, a driver can sense from a vibration transmitted from tires that the vehicle has reached the proper charging position.

A seventh embodiment relates to a charging system for an electric automotive vehicle which guides an electric automotive vehicle to a charging position by a wheel guide. Hereafter, the contents of this embodiment are described with reference to FIGS. 40 to 42.

Figure 40:
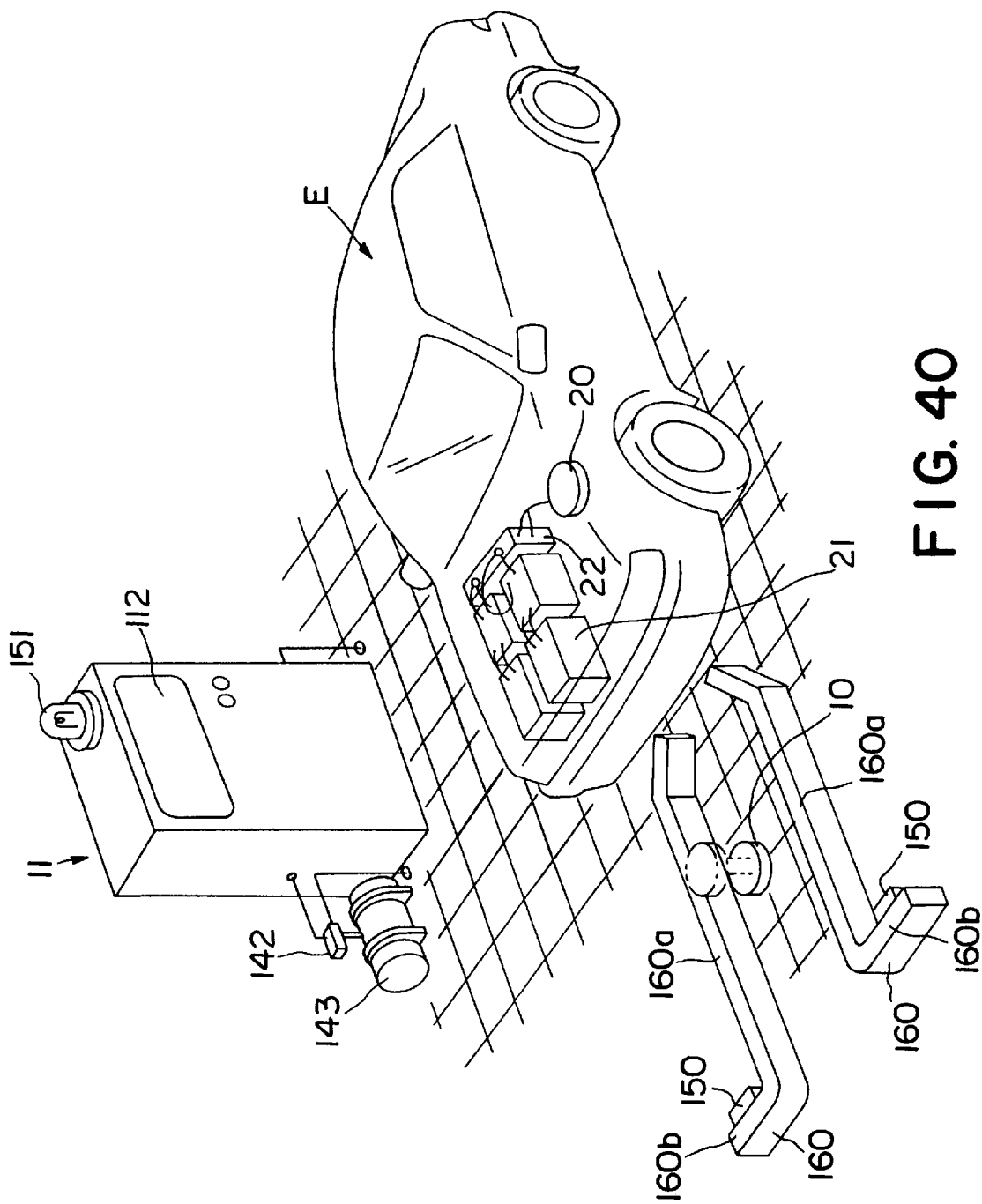
FIG. 40 is a perspective view of a seventh embodiment according to the invention.

FIG. 40 is a perspective view showing an electric automotive vehicle E being advanced into a parking lot equipped with a wheel guide 160. The wheel guide 160 includes two projecting, preferably upstanding substantially L-shaped rails symmetrically arranged on the ground of the parking lot with their longer sides 160a faced in substantially parallel directions. The longer sides 160a are so spaced as to be fittingly located between the left and right wheels of the vehicle E, and have their leading ends bent such that a distance therebetween decreases toward the leading ends. Shorter sides 160b extend in opposite or outward directions from the longer sides 160a and have such a length that the front wheels of the vehicle E can come into contact therewith. Accordingly, if the vehicle E is advanced into the parking lot with the longer sides 160a located between the left and right wheels, it stops where the front wheels come into contact with the shorter sides 160b. More specifically, the vehicle E is parked while its orientation and position are determined by the wheel guide 160.

The primary coil unit is mounted on the ground between the longer sides 160a. When the vehicle E is parked along the wheel guide 160, the secondary coil 20 comes to face the primary coil 10. Further, a pressure sensor 150 is provided at each shorter side 160b where the corresponding front wheel comes into contact. The pressure sensors 150 detect that the vehicle E has parked along the wheel guide 160, and their detection results are sent to a main controller 113 provided in an external power source unit 11.

Since the other construction is similar to the fifth to sixth embodiments, no repetitive description is given thereon by identifying the same elements by the same reference numerals. The operation of this charging system is described hereafter.

When the vehicle E is advanced into the parking lot with the longer sides 160a of the wheel guide 160 between the left and right wheels, it is guided with its advancing direction restricted by the longer sides 160a. The vehicle E cannot make any further advance when the front wheels come to positions where they are in contact with the shorter sides 160b, with the result that a driver can know that the vehicle E is in the charging position. When the pressure sensors 150 are pressed by the front wheels, a lamp 151 provided at the external power source unit 11 is turned on. The driver can also know from this lamp 151 that the vehicle E is in the charging position. When the vehicle E is stopped in the charging position, the secondary coil 20 is opposed to the primary coil 10. Subsequently, in the same manner as described in the fifth embodiment, the primary coil 10 is moved to an induction position, e.g. substantially upward, to contact the secondary coil 20 and a battery of the vehicle E is charged in this state.

As described above, once that the vehicle E is brought to the wheel guide, the vehicle can easily be parked in the charging position regardless of the parking technique of the driver.

Although the wheel guide and the primary coil are separately formed and are so arranged as to have a specified positional relationship in the seventh embodiment, the primary coil and the wheel guide may be formed as a single unit and arranged in the parking lot. Further, although the left and right wheels of the vehicle E are guided in the seventh embodiment, the vehicle E may be guided by restricting the opposite side surface of the wheel of the vehicle E at one side by a narrow substantially u-shaped wheel guide 161 as shown in FIG. 41.

Figure 42:
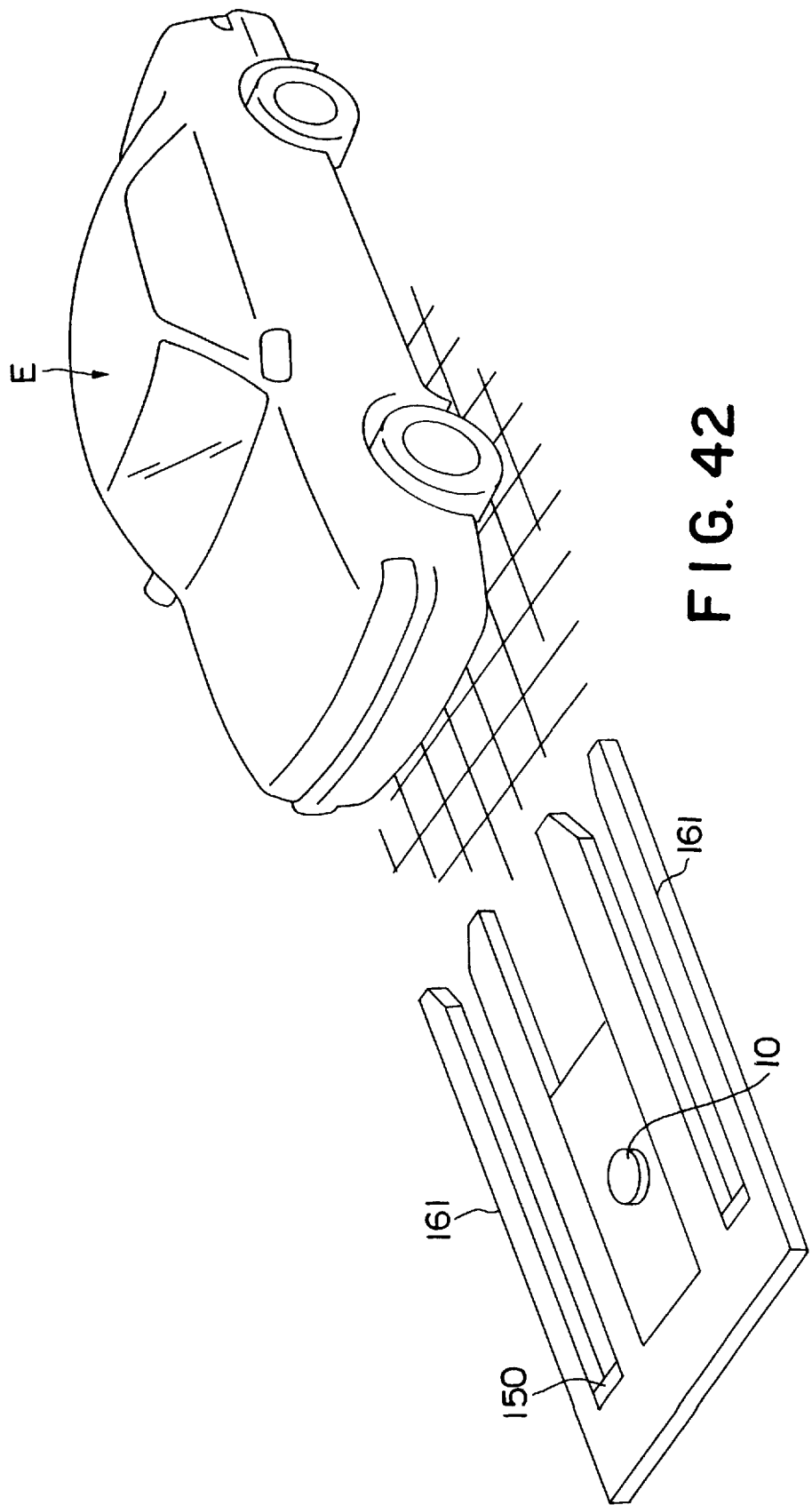
FIG. 42 is a perspective view of a second modification of the wheel guide of the seventh embodiment.

Further, as shown in FIG. 42, two U-shaped wheel guides 161 are substantially symmetrically arranged on the opposite sides of the primary coil unit so as to facilitate an advancing movement of the vehicle E into the wheel guides 161.

An eighth embodiment relates to a charging system for an electric automatic vehicle which discriminates the type of an electric automatic vehicle E to be parked by a vehicle type discriminating apparatus and automatically adjusting the positions of wheel guides with respect to that of a primary coil 10 in accordance with the discriminated vehicle type so as to guide the vehicle to a proper charging position. Hereafter, the eighth embodiment is described with reference to FIGS. 43 and 44.

Figure 43:
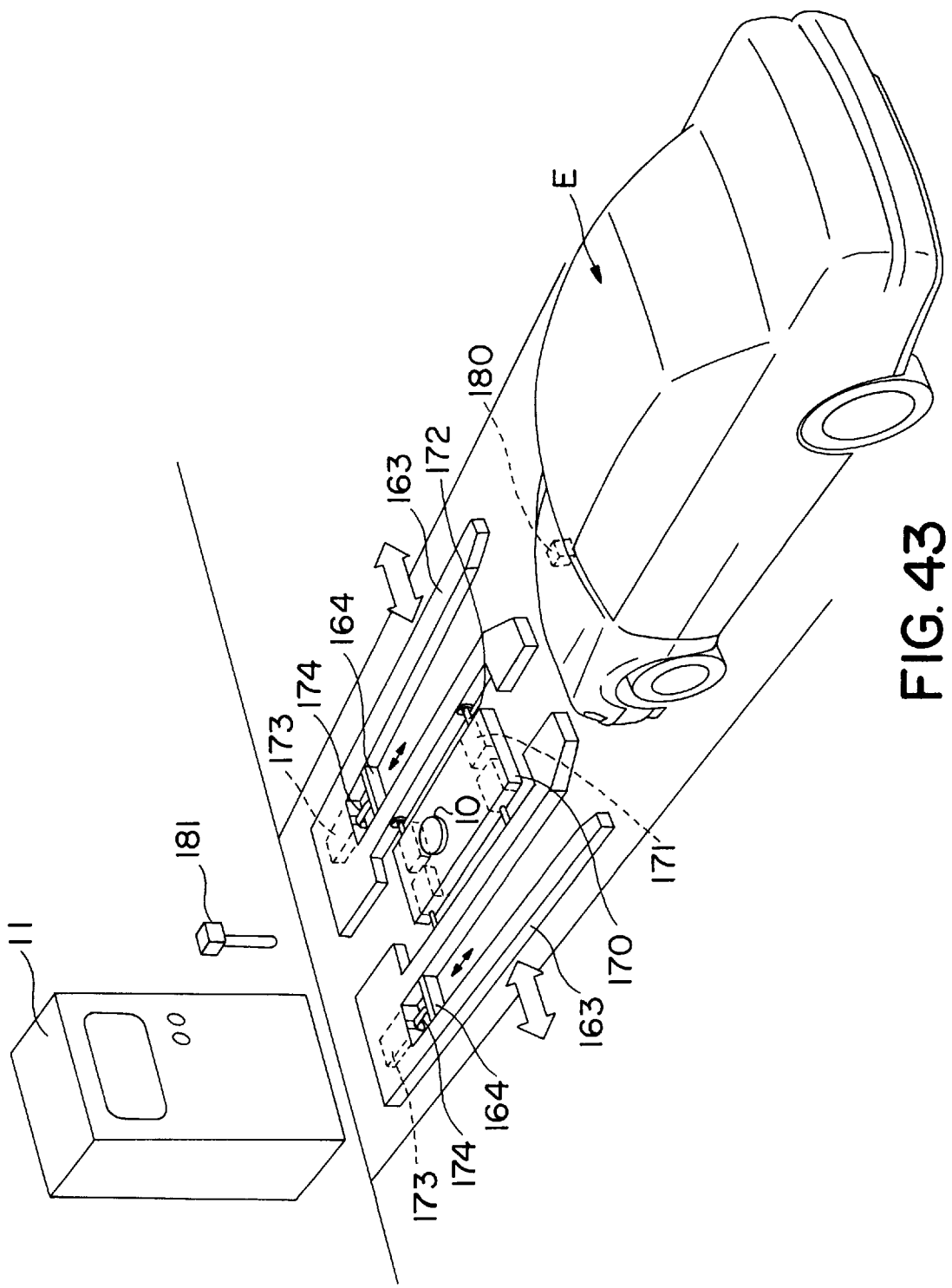
FIG. 43 is a perspective view of a eighth embodiment according to the invention.

FIG. 43 is a perspective view showing an electric automotive vehicle E being advanced into a parking lot equipped with a position adjusting apparatus for adjusting the position of wheel guides 163 and that of a primary coil 10.

The primary coil 10 is provided in a flat box-shaped base 170 fixed to the ground of the parking lot, and is movable between an induction position and a resting or standby position, preferably substantially upward and downward by an elevating apparatus provided in the base 170. The elevating apparatus may be constructed by a pantograph mechanism as shown in FIG. 34, and is contained in the base 170 when the primary coil 10 is lowered.

Narrow U-shaped wheel guides 163 are so arranged at the opposite side surfaces of the base 170 as to open in the same direction. The wheel guides 163 act to guide the vehicle E to a predetermined parking position by restricting the inner and outer surfaces of wheels in the same manner as the wheel guides 161 shown in FIG. 42. Pairs of sliding devices 171 (e.g. including an absolute encoder equipped motor and a ball screw in combination) are provided at the opposite sides in the base 170. Drive shafts 172 of the sliding devices 171 project from the opposite side surfaces of the base 170 to be connected with the wheel guides 163 so that the wheel guides 163 are slidable along a widthwise direction, i.e. a direction at an angle different from 0° or 180°, in particular substantially normal, to the length of the base 170 or to the direction of movement of the vehicle E. Substantially at the closed end of each U-shaped wheel guide 163, a sliding device 173 is provided. A drive shaft 174 of each sliding device 173 is connected with a contact plate 164 so that the depth of the wheel guide 163 is freely changeable. In other words, the sliding devices 171, 173 construct the position adjusting apparatus for changing the relative positions of the primary coil 10 and the wheel guides 164. With the sliding devices 171, 173, the vehicle E provided with the secondary coil 20 can be located in any desired position with respect to the base 170 provided with the primary coil 10. Unillustrated casters are provided at the bottom surfaces of the wheel guides 163 lest no strong bending load should be exerted on the drive shafts 172.

On the other hand, the vehicle type discriminating apparatus includes a transmitter 180 mounted on the vehicle E and a receiver 181 installed in the parking lot, and a e.g. radio or 47 infrared communication concerning the vehicle type is conducted therebetween. The receiver 181 is connected with a main controller 113 for centrally controlling this charging system via a communication controller 182 in the external power source unit 11.

Further, as shown in FIG. 44, a storage device 183 for storing the positional relationships of the wheels and the secondary coil for different types of vehicles is connected with the main controller 113. The positional relationship corresponding to the received vehicle type information is fed to the main controller 113, which in turn drives the aforementioned position adjusting apparatus to position the wheel guides 163 in conformity with each vehicle E.

Since the other construction is similar to the fifth to seventh embodiments, no repetitive description is given thereon by identifying the same elements by the same reference numerals. The operation of this charging system is described hereafter.

When the vehicle approaches the parking lot, the vehicle type information is transmitted from the transmitter 180 of the vehicle E. This vehicle type information is received by the receiver 181 installed in the parking lot and fed to the main controller 113. The main controller 113 accesses the storage device 183 to read a positional relationship information of the wheels and the secondary coil for this vehicle type. The sliding devices 171, 173 are driven in accordance with this positional relationship information so as to correspond the relative position of the primary coil 10 with respect to the wheel guides 163 to the positional relationship of the secondary coil at the bottom of the vehicle with respect to the wheels. The spacing between the wheel guides 163 is adjusted to the spacing between the left and right wheels of the vehicle E, enabling an advancing movement of the vehicle E to the charging position. When the vehicle E is advanced to the position where the front wheels come into contact with the contact plates 164 at the closed ends of the wheel guides 163, the secondary coil faces the primary coil. Hereafter, a series of operations for the charging similar to those described in the fifth to seventh embodiments are performed. When an electric automotive vehicle E of another type comes to the parking lot after this vehicle E leaves, the positional relationship of the wheel guides and the primary coil is readjusted in conformity with this vehicle type.

Accordingly, this charging system enables the charging for a plurality of types of electric automotive vehicles in the same parking lot.

Figure 45:
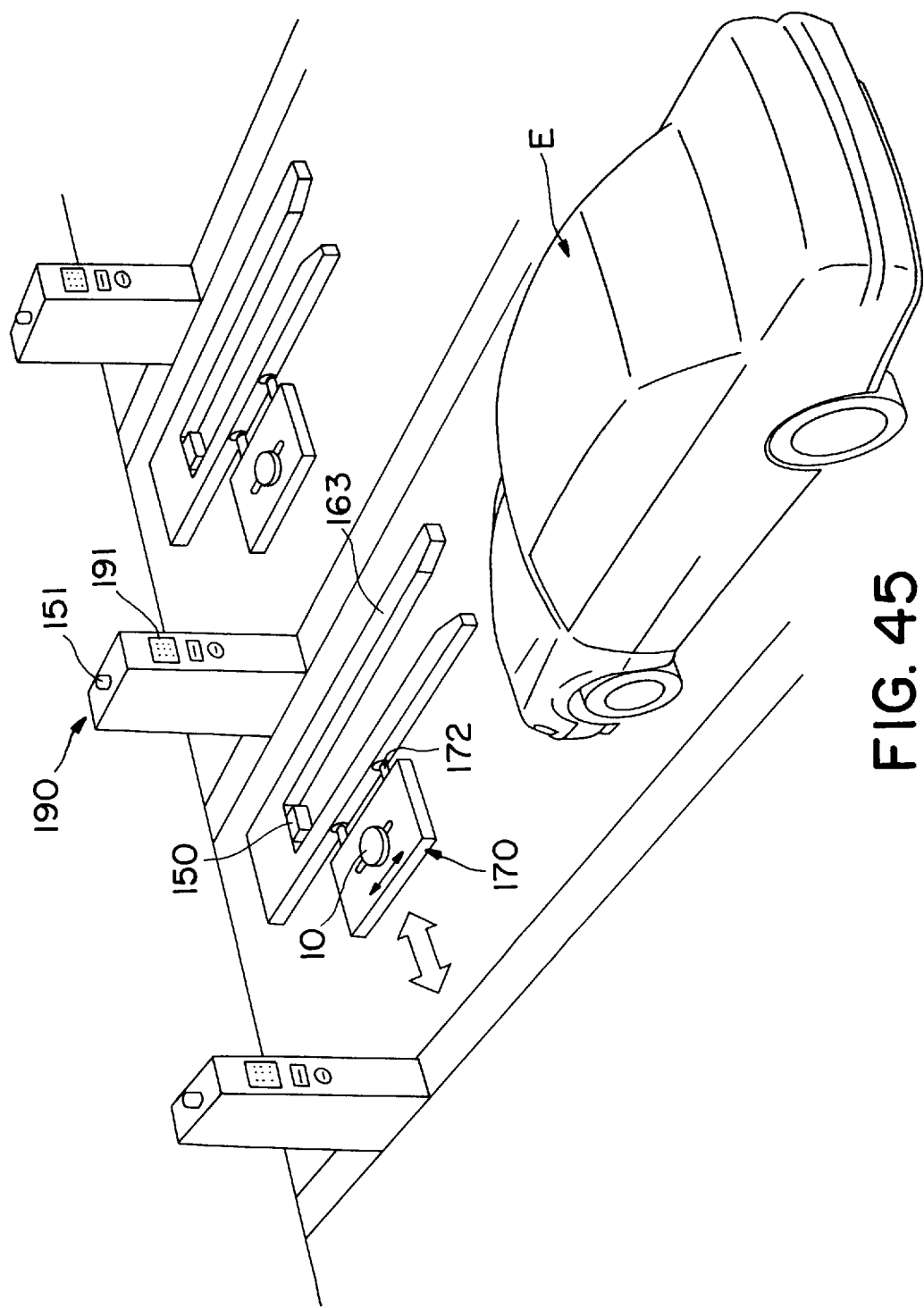
FIG. 45 is a perspective view of a modification of the eighth embodiment.

Although the vehicle type information is fed to the controller via the communication means in the eighth embodiment, it may be input by an input apparatus installed in a specified position of the parking lot or it may be transmitted from a data transmitter provided in a vehicle E and having a storing means for storing the positional relationship of the secondary coil 20 (with respect to a predetermined or predeterminable position on or at the vehicle E). For example, if payment boxes 190 for collecting a charging fee are installed in the parking lot as shown in FIG. 45, the vehicle type information may be input by a number panel 191 provided at each payment box 190. Alternatively, using a prepaid card or the like, the vehicle type information recorded therein may be input. In such a case, if the primary coil 10 is made movable while the wheel guide 163 is fixed in the parking lot, the primary and secondary coils 10, 20 can be connectably positioned in accordance with the input vehicle type information after the vehicle E is properly parked with respect to the wheel guide 163. The wheel guide 163 is U-shaped, and drive shafts 172 of a sliding device provided in the base 170 are connected with one side surface. Further, the wheel guide 163 is fixed to the ground, and the base 170 are fitted with casters at its bottom. Inside the base 170, the primary coil unit including an elevating device is so supported as to be positionable by the sliding device in a direction normal to the actuating direction of the aforementioned air cylinder.

The above construction operates as follows.

The vehicle E is advanced until the wheel at one side comes into contact with the closed end of the wheel guide 163 and parked there. A pressure sensor 150 detects this contact, and a lamp 151 provided in the payment box 190 is turned on to notify the driver of its detection. The driver inputs his desired charging amount and the vehicle type by means of the number panel 191 of the payment box 190, and pays the charging fee and parking fee. Instead of the input by the number panel 191, the driver may input the vehicle type information and pay the fees by a prepaid card. Upon the completion of charging, the lamp 151 is turned on again to notify the driver of it. Further, if the stay exceeds the parking time, the driver may be warned by blinkingly turning the lamp 151 on.

Since the other construction is similar to the fifth to eighth embodiments, no repetitive description is given thereon by identifying the same elements by the same reference numerals.

Unlike the eighth embodiment which discriminates the vehicle type, the ninth embodiment relates to an electric vehicle charging system which measures a positional relationship of the wheels of an electric automotive vehicle and a secondary coil 20 by a measuring apparatus and automatically adjusts the relative positions of a wheel guide 163 and a primary coil 10 in accordance with the measurement result. Hereafter, this embodiment is described with reference to FIGS. 46 and 47.

Figure 46:
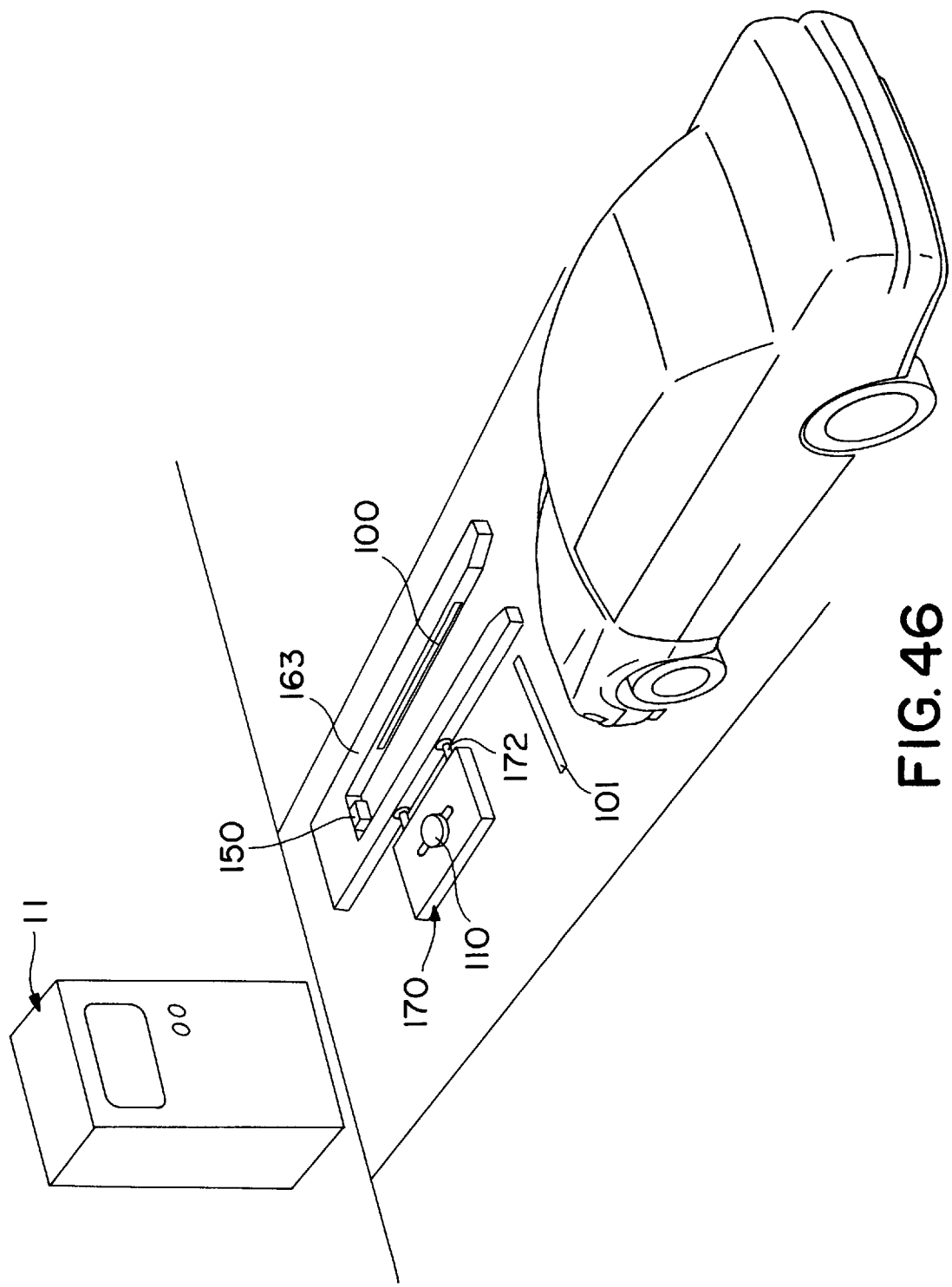
FIG. 46 is a perspective view of a ninth embodiment according to the invention.

FIG. 46 is a perspective view of an electric automotive vehicle E advancing into a parking lot equipped with the above measuring apparatus. A wheel guide 163 and a base 170 are basically same as those described in the modification (FIG. 45) of the eighth embodiment. The ninth embodiment is further provided with a wheel position sensor 100 for detecting the position of a wheel and a coil position sensor 101 for detecting the position of a secondary coil 20.

Both sensors 100, 101 are formed by linearly arranging photosensors. The wheel position sensor 100 is mounted along one inner surface of the wheel guide 163, whereas the coil position sensor 101 is embedded in the ground of the parking lot before the base 170 so as to extend in a direction normal to the advancing direction of the vehicle E. Since the secondary coil 20 of the vehicle E is provided with a reflection portion or reflection mirror (not shown) for reflecting light (or other waves or signals) emitted from the photosensors (or wave or signal emitters) so as to intensify the reflection light (or other waves or signals) more than the other part, the coil position sensor 101 can detect the position of the secondary coil 20.

Figure 48:
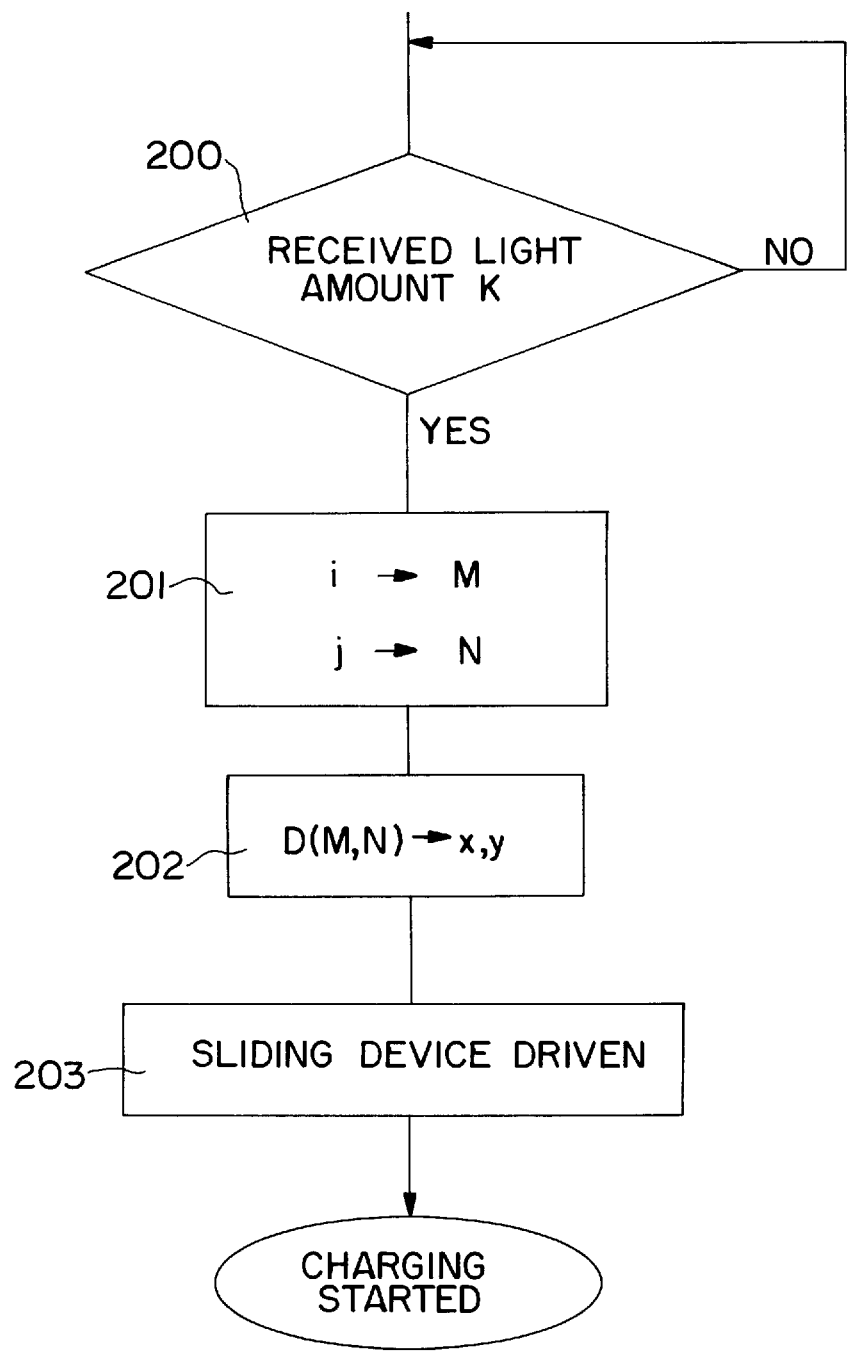
FIG. 48 is a flow chart showing a positioning operation according to the ninth embodiment.

The outputs of both sensors 100, 101 are sent to a main controller 113 provided in an external power source unit 11, and the main controller 113 calculates a positional relationship of the wheels and the secondary coil 20 in the vehicle E based on the detection data. Specifically, as shown in FIG. 47, the respective photosensors are numbered for data processing, and the position detection is made as follows in accordance with a flow chart of FIG. 48.

In Step 200, whether an amount of light or waves or signals received by the coil position sensor 101 is larger than a predetermined value K is discriminated. Upon the passage of the reflection mirror of the secondary coil 20, the received light amount exceeds the predetermined value K. Then, the discrimination result becomes "YES", followed by Step 201. In Step 201, a number "i" of the contact sensor or photosensor or photosensor where the wheel passed and a number "j" of the photosensor where the received light amount was at maximum because of the passage of the reflection portion provided at the secondary coil 20 are stored in memories M, N. Subsequently, in Step 202, drive amounts (X, Y) by which the sliding devices of the wheel guide 163 and of the primary coil 10 are read from a dimension map D(M, N) provided in the storage device 183. The respective sliding devices are driven based on the read data in Step 203. At this time, with the vehicle E parked in contact with the wall of the closed end of the wheel guide 163, the secondary coil 20 is positioned right above the primary coil 10.

After the primary coil 10 is positioned with respect to the secondary coil 20 as above, a series of operations for the charging similar to those described above are performed.

Since the other construction is similar to the fifth to eighth embodiments, no repetitive description is given thereon by identifying the same elements by the same reference numerals.

In the tenth embodiment, a coil positioning apparatus 280, is supported inclinably with respect to the wall surface W in a substantially horizontal plane via elastic support mechanisms 290 so that the coils can automatically be positioned along the lateral direction and automatically be opposed in parallel to each other. Hereafter, the tenth embodiment is described with reference to FIGS. 49 to 53.

Figure 49:
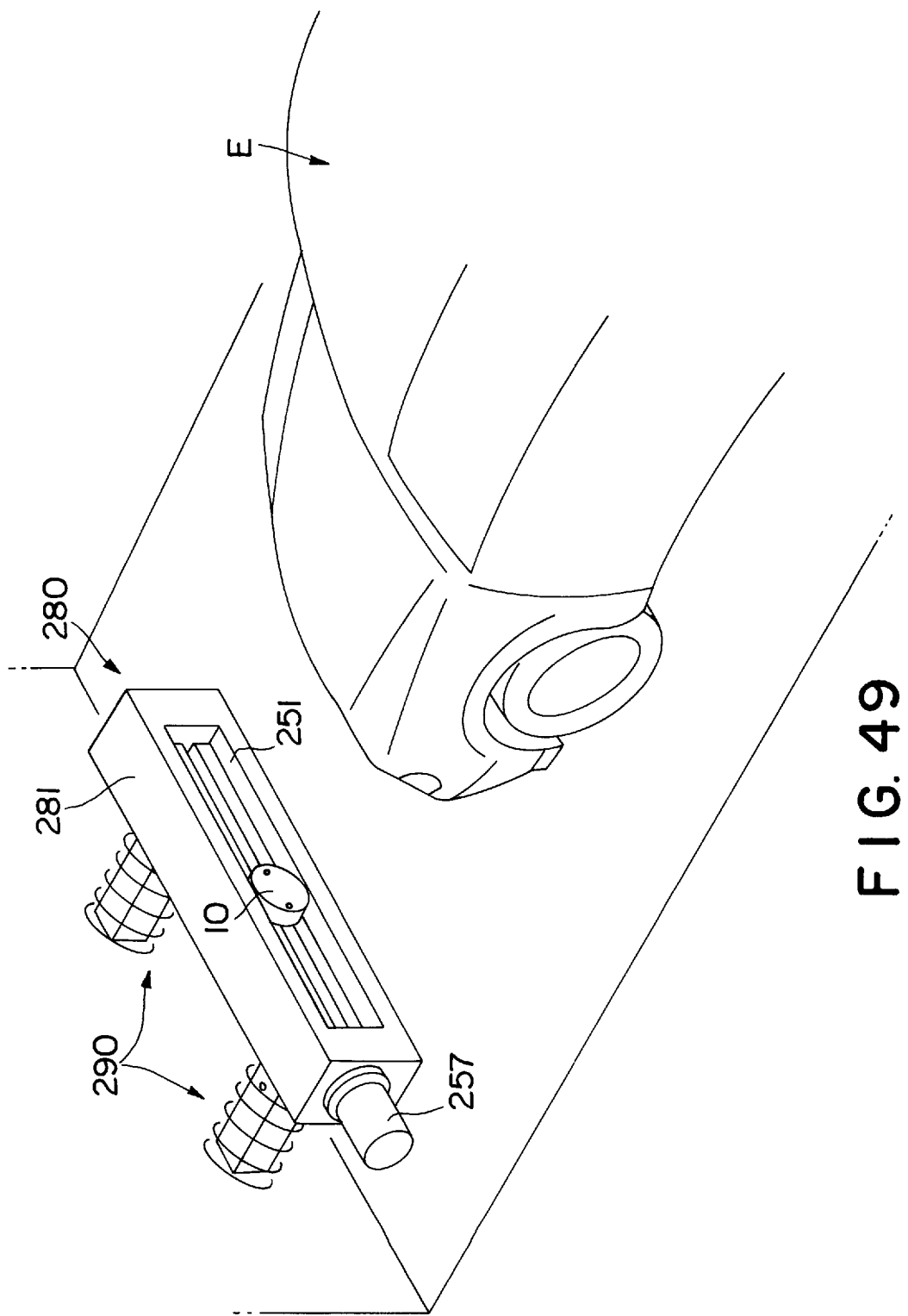
FIG. 49 is a perspective view of a parking space according to a tenth embodiment of the invention.
Figure 50:
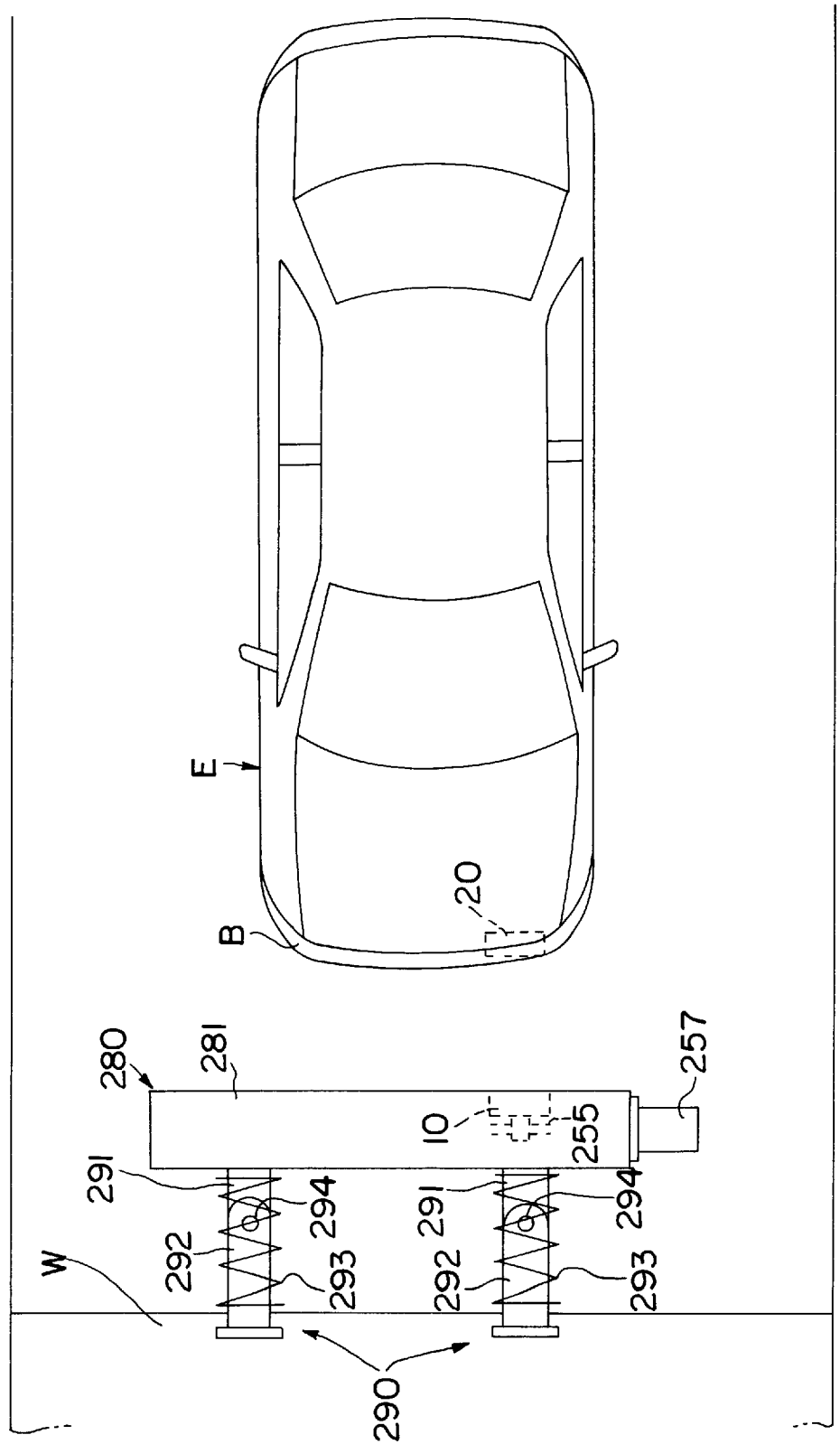
FIG. 50 is a plan view of an electric automotive vehicle parked in the parking space according to the tenth embodiment.
Figure 51:
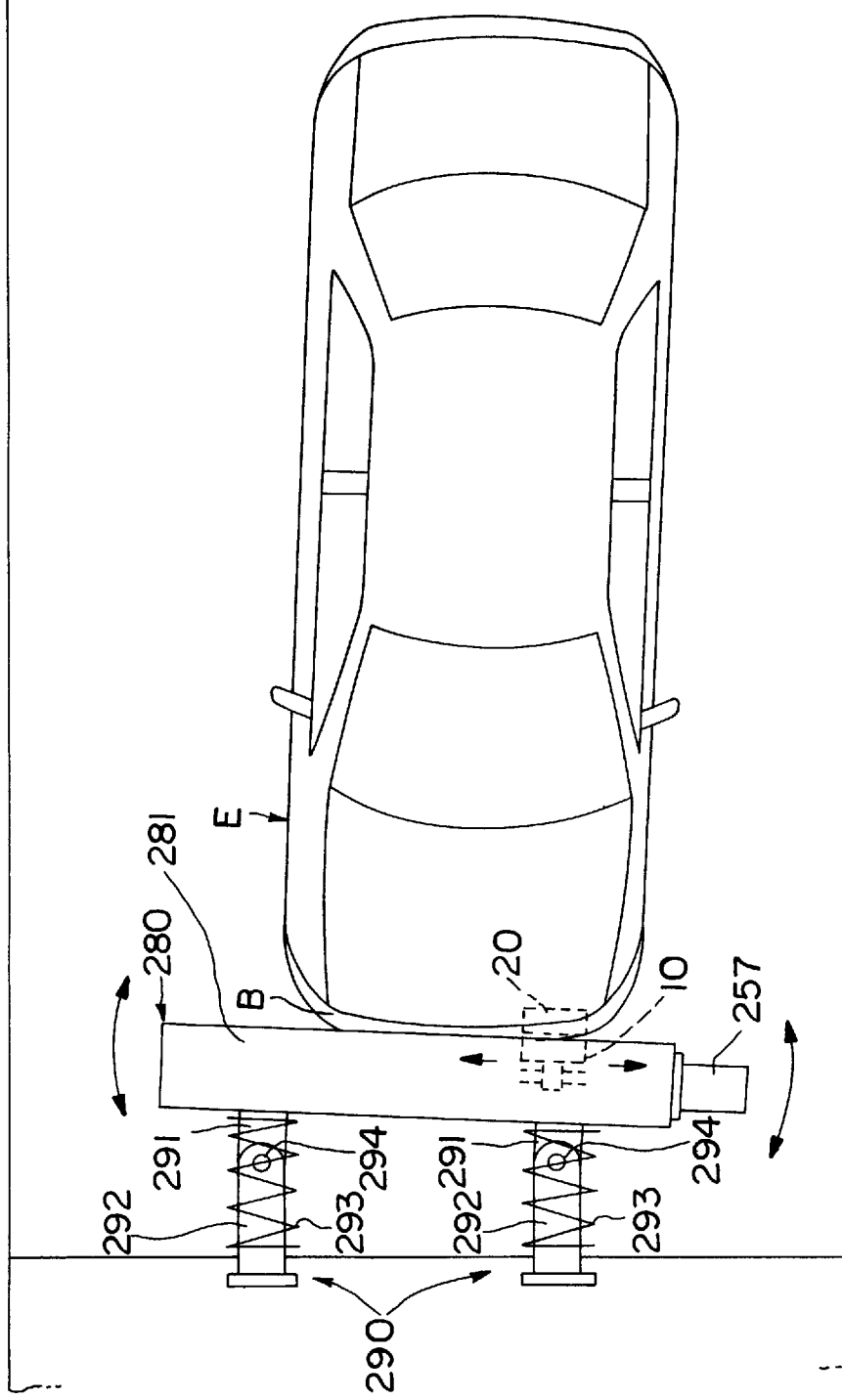
FIG. 51 is a plan view of an electric automotive vehicle obliquely parked in the parking space according to the tenth embodiment.
Figure 52:
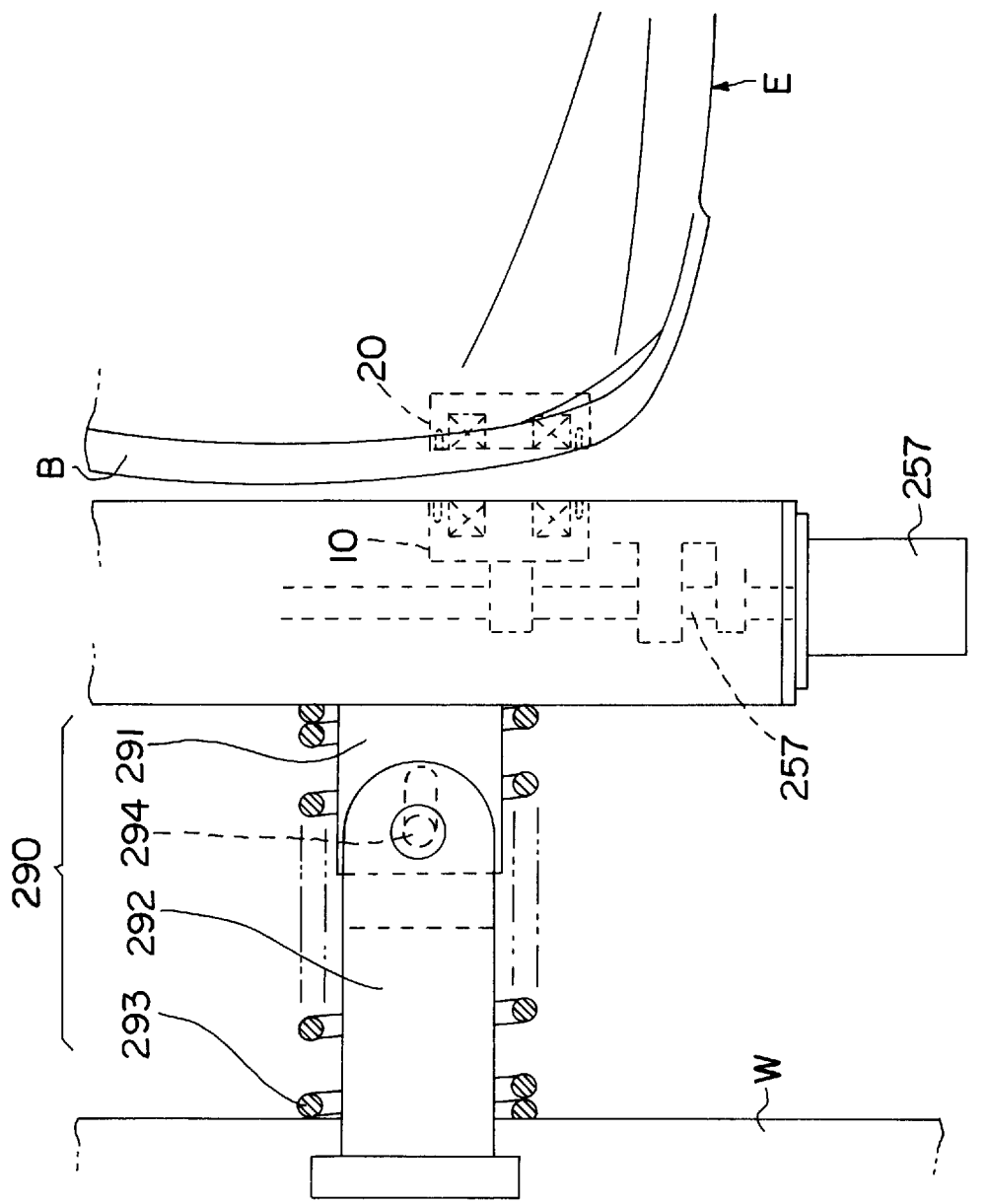
FIG. 52 is a plan view showing an electromagnetically connected state in the tenth embodiment.

The coil positioning apparatus 280 includes a laterally long housing 281 as shown in FIG. 49 or 50. A support rail 51, a ball screw 55 and the like are accommodated in the housing 281 so as to render the same function as the coil positioning apparatus 50 described in the fourth embodiment.

An unillustrated pressure switch 40 is provided in the housing 281 to detect that the support rail 51 provided at the front surface of the housing 281 is pressed. Further, an infrared communication device (not shown) is provided in a specified position of the lower part of the housing 281 to obtain pieces of necessary information such as a charged amount of the vehicle E.

The housing 281 is mounted on the wall surface W of the parking space via the elastic support mechanisms 290 which include each a support bracket 291 extending from the back surface of the housing 281 and a strut 292 projecting from the wall surface W of the parking space. The struts 292 of the mechanisms 290 are placed apart side by side along the horizontal direction by the same distance as the support brackets 291 of the mechanisms 290.

Figure 53:
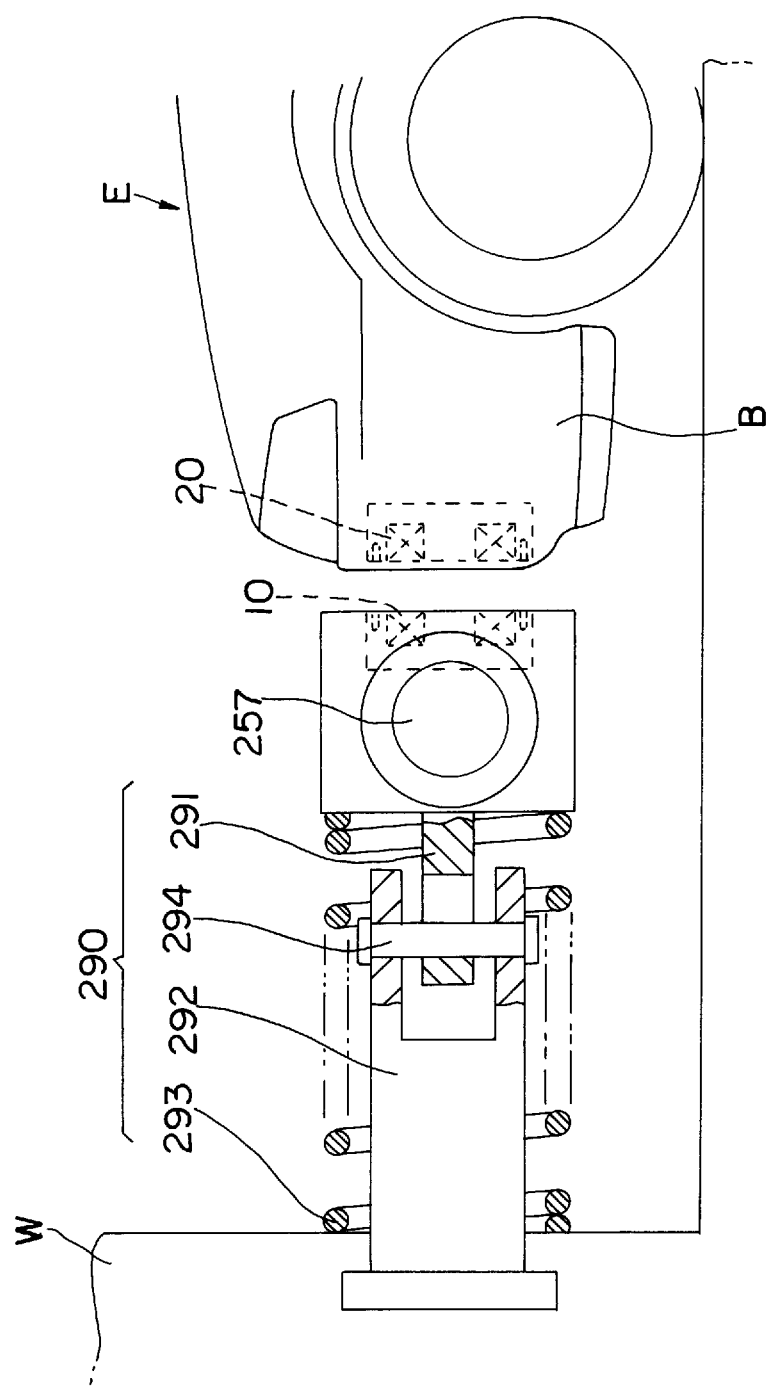
FIG. 53 is a side view showing the electromagnetically connected state in the tenth embodiment.

As shown in FIG. 53, the leading end of each strut 292 is substantially U-shaped and separated into two parts: upper and lower parts, and a shaft 294 is mounted through these upper and lower parts and the support bracket 291 disposed between the upper and lower parts. Through holes formed in the strut 292 through which the shaft 294 is inserted have the same diameter as the shaft 294, but through holes formed in support bracket 291 are oblong holes so as to permit the support bracket 291 to move along forward and backward directions with respect to the shaft 294. Accordingly, the support bracket 291 is pivotally and slidably coupled with the leading end of the strut 292 via the shaft 294. The support bracket 291 is also inclinable because the shaft 294 can be inclined in the oblong holes.

As shown in FIG. 53, the opposite ends of the shaft 294 are secured by, e.g. clips, nuts or the like.

The struts 292 and the support brackets 291 coupled as described above are biased in a projecting direction by compression coil springs 293 fitted thereon. Accordingly, the support brackets 291 are securely and stably held in their projected positions, and act as follows. For example, if the vehicle E is obliquely parked, one end of the bumper B comes into contact with one end of the coil positioning apparatus 280. Thus, only the elastic support mechanism 290 at the side pressed by the bumper B slides, and the one at the other side rotates, with the result that the coil positioning apparatus 280 is inclined with respect to the wall surface W along the horizontal plane so that the bumper B of the vehicle E and the coil positioning device 280 are opposed in parallel to each other. Further, if the vehicle E is parked straight, the coil positioning apparatus 280 is equally pressed by the bumper B. Accordingly, both elastic support mechanisms 290 make a sliding movement and the shock is absorbed by the compression coil springs 293. Further, since the elastic support mechanisms 290 are inclinable along the forward and backward directions, they are capable of bringing the coil positioning apparatus 280 and the bumper B into close contact by offsetting the inclinations of the coil positioning apparatus 280 and the bumper B along the forward and backward directions.

On the other hand, the vehicle E is provided with a secondary coil 20 at its front surface. The electromagnetic connection surface of the secondary coil 20 is oriented in conformity with a contact surface of the bumper B with the coil positioning apparatus 280. Accordingly, if the coil positioning apparatus 280 and the bumper B are opposed in parallel to each other as described above, the electromagnetic connection surfaces of the coils 10, 20 are opposed in parallel to each other. Further, since the coil positioning apparatus 280 is inclinable along the forward and backward directions as described above, if the contact surface of the bumper B is inclined, the electromagnetic connection surface of the secondary coil 20 may be accordingly inclined.

Since the other construction is similar to the fourth embodiment, no repetitive description is given thereon by identifying the same elements by the same reference numerals.

Next, how the vehicle E is charged according to the tenth embodiment is described. The vehicle E is advanced in the parking space to bring the bumper B into contact with the coil positioning apparatus 280 projecting from the wall surface W. The vehicle E is stopped when a stop lamp 241 is turned on in response to a pressure switch 240. At this time, even if the vehicle E comes into contact with the coil positioning apparatus 280 along an oblique direction, the elastic support mechanisms 290 act to offset the resulting inclination, thereby allowing the bumper B of the vehicle E to face the coil positioning apparatus 280 substantially straight. Accordingly, the driver needs not consider an angle of the vehicle with respect to the coil positioning apparatus 280. Thus any inclination of the vehicle E with respect to the coil positioning apparatus 280 can be compensated for.

Simultaneously, the coil positioning apparatus 280 starts operating in response to the pressure switch 240, thereby guiding the primary coil 10 to a position where it is electromagnetically connectable with the secondary coil 20 in the same manner as in the fourth embodiment for the charging. At this time, since the bumper B of the vehicle E and the coil positioning apparatus 280 face substantially straight each other, the coils 10, 20 can constantly brought to their proper electromagnetically connectable positions. Therefore, the charging can efficiently be performed.

Figure 54:
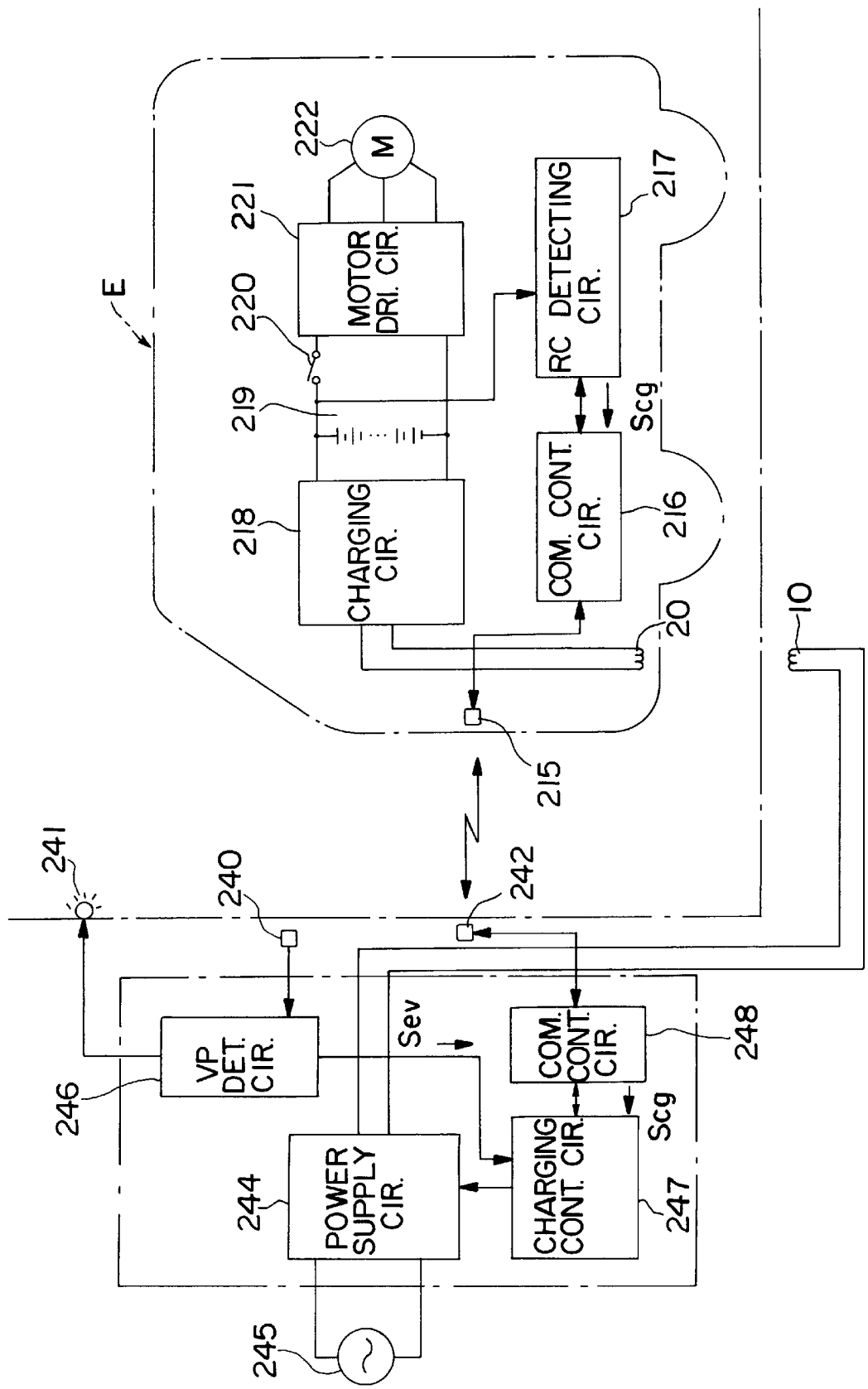
FIG. 54 is a block diagram of a charging system according to the eleventh embodiment.

The electrical construction of the connection or charging system according to an eleventh embodiment of the invention may be as shown in FIG. 54. A power supply circuit 244 provided in the parking space is connected with the primary coil 10. The power supply circuit 244 supplies a high frequency current of, e.g. 40 kHz to the primary coil 10 by suitably shaping, e.g. by rectifying and/or switching a commercial power source 245. A vehicle position detecting circuit 246 detects that the vehicle E has parked in the specified position upon receipt of a signal from the pressure switch 240. Based on this detection, the detecting circuit 246 turns the stop lamp 241 on and outputs a vehicle detection signal Sev to a charging control circuit 247. Upon receipt of the signal Sev from the vehicle position detecting circuit 246 and a capacity shortage signal Scg from a communication control circuit 248, the charging control circuit 247 actuates the power supply circuit 244 to excite the primary coil 10. The communication control circuit 248 is connected with the infrared communication device 242, and receives an information concerning the charging from a capacity detecting circuit via the infrared communication device 215 and a communication control circuit 216 of the vehicle E.

On the other hand, in the vehicle E, a charging circuit 218 is connected with the secondary coil 20 to charge a battery 219. The charging circuit 218 rectifies an ac current induced in the secondary coil 20 and generates a dc voltage necessary to charge the battery 219. A motor driving circuit 221 is connected with the battery 219 via a main switch 220 for driving a drive motor 222 of the vehicle E. A remaining capacity detecting circuit 217 receives an information concerning the remaining capacity of the battery 219 via an output line of the battery 219. For example, the remaining capacity detecting circuit 217 estimates the remaining capacity of the battery 219 by adding up consumed power based on the current having flowed in the output line, and outputs the capacity shortage signal Scg when the estimated remaining capacity falls short of a predetermined value. The remaining capacity detecting circuit 217 also receives, from the charging circuit 218, an information concerning a charge current flowed into the battery 219; estimates a remaining capacity increasing by the charging based on the received information; and stops outputting the capacity shortage signal Scg when the estimated remaining capacity reaches the predetermined rated value. Alternatively the remaining capacity detecting circuit 217 may directly measure the remaining capacity of the battery 219, e.g. basing upon variations of inductance or capacity of the battery 219. The remaining capacity detecting circuit 217 may also measure a temperature of the battery 219 for determining the remaining capacity, at least as a factor for such a determination.

Next, how the vehicle E is charged in this embodiment is described. The vehicle E is slowly advanced toward the wall surface W in the parking space. When the vehicle E comes to a position where the primary coil unit 10 is coupleable or connectable with the secondary coil unit 20, the front bumper B of the vehicle E may press the pressure switch 240, thereby operating the same. Accordingly, the stop lamp 241 is turned on in response to the signal from the vehicle position detecting circuit 246. If the vehicle E is stopped in this position, the primary coil 10 is substantially coaxially located with the secondary coil 20 in the receptacle 211, being enabled to be electromagnetically connected with the secondary coil 20.

Simultaneously, the vehicle position detecting circuit 246 outputs the vehicle detection signal Sev to the charging control circuit 247. At this time, unless the remaining capacity of the battery 219 exceeds the predetermined value, the capacity shortage signal Scg is sent to the charging control circuit 247 from the remaining capacity detecting circuit 217 via the infrared communication devices 215, 242, with the result that the power supply circuit 244 operates to excite the primary coil 10. As a result, a voltage is generated in the secondary coil 20 by an electromagnetic induction phenomenon, and the charging circuit 218 charges the battery 219 of the vehicle E with the generated voltage. When the remaining capacity of the battery 219 reaches the predeterminable or predetermined rated value by the charging, the output of the capacity shortage signal Scg is stopped. Thus, the excitation of the primary coil 10 by the charging circuit 218 is stopped, completing the charging.

According to this embodiment, the primary and secondary coils 10, 20 are connected only by a usual action of parking the vehicle E in the specified position of the parking space, garage, parking lot, gas station, or the like, and power is supplied to the charging circuit 218 of the vehicle E from the commercial power source 245 in the parking space to charge the battery 219, completely obviating need for the engagement of the connectors as in the prior art. Therefore, the charging system according to this embodiment enables a remarkably easy charging and is also very suited to the use at home.

Figure 55:
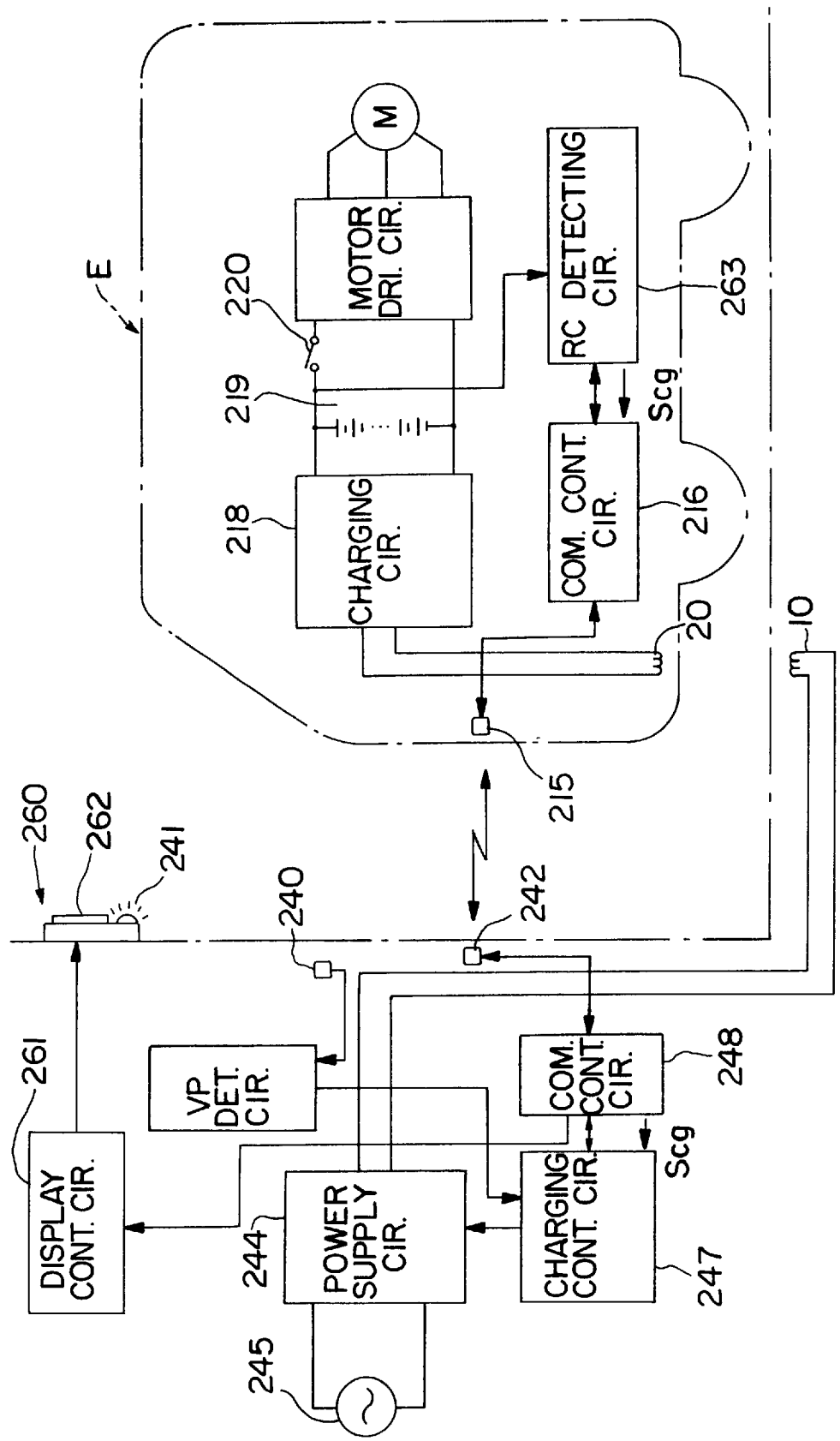
FIG. 55 is a block diagram of a twelfth embodiment of the invention.

The twelfth embodiment is similar to the eleventh embodiment except that a display means for displaying a charged state corresponding to the remaining capacity of the battery 219 is additionally provided in the parking space. Accordingly, no repetitive description is given on the identical or similar construction by identifying the same elements by the same reference numerals, and only a different construction is described with reference to FIG. 55.

At an upper part of the wall surface W of the parking space, there is provided a display unit 260 which is controllably turned on by a display control circuit 261. The display unit 260 includes a stop lamp 241 and a remaining capacity indicator 262 formed e.g. by vertically arranging a plurality of LEDs.

A remaining capacity detecting circuit 263 provided in an electric automotive vehicle E constantly detects the remaining capacity of a battery 219 being charged and sends the detection data to the display control unit 261 via infrared (or the like) communication devices 215, 242 to make a display corresponding to the detected remaining capacity in the capacity indicator 262. In other words, a display in proportion to the remaining capacity is made in this embodiment: all LEDs of the capacity indicator 262 are turned on when the battery 219 is fully charged, and half the number of LEDs are turned on when the battery 219 is half charged. Such a display is convenient because the remaining capacity of the battery 219 being charged is easily visible.

Figure 56:
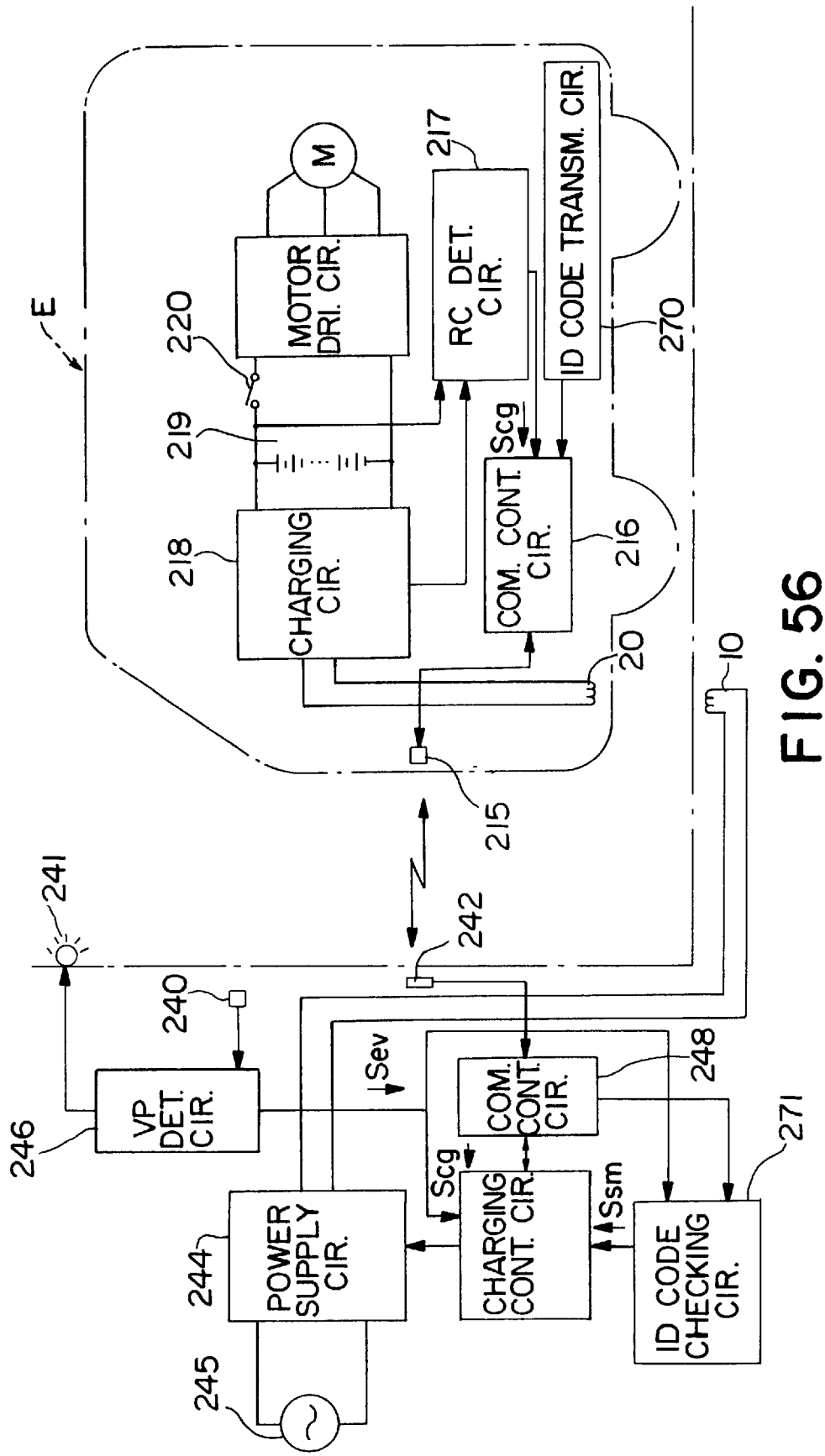
FIG. 56 is a block diagram of a thirteenth embodiment of the invention.
Figure 57:
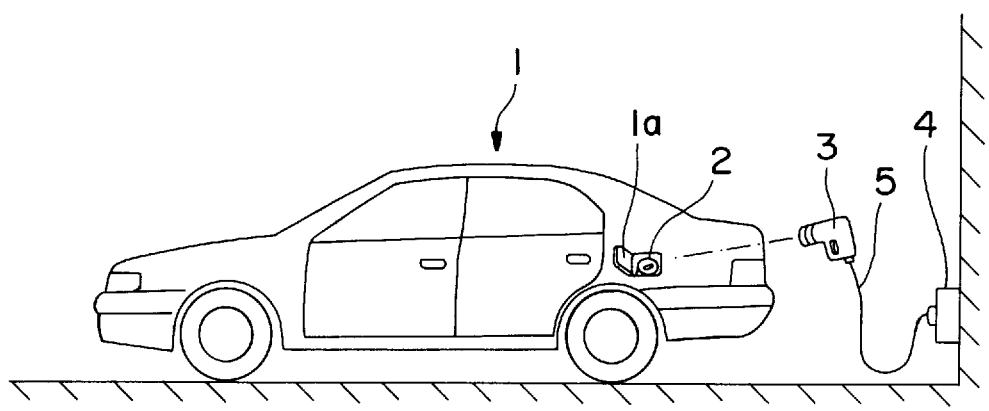
FIG. 57 is a side view of a prior art charging system.

The thirteenth embodiment is similar to the eleventh embodiment except that the charging is performed only when identification (ID) codes of the vehicle agree. Accordingly, no repetitive description is given on the identical or similar construction by identifying the same elements by the same reference numerals, and only a different construction is described with reference to FIG. 56.

An electric automotive vehicle E is provided with an ID code transmitting circuit 270 which is connected with a communication control circuit 216. In a parking space, there is provided an ID code checking circuit 271 which is connected with a communication control circuit 248 and a charging control circuit 247. Upon receipt of a vehicle detection signal Sev from a vehicle position detecting circuit 246, the ID checking circuit 271 sends a signal to the ID transmitting circuit 270 of the vehicle E via infrared communication devices 215, 242, causing the ID transmitting circuit 270 to respond by sending an ID code peculiar to the vehicle E via the infrared communication devices 215, 242. If the received ID code agrees with the code stored in the ID code checking circuit 271, the ID code checking circuit 271 outputs an agreement signal Ssm to the charging control circuit 247. In this embodiment, the charging control circuit 247 starts the excitation of the primary coil 10 on condition that it received the vehicle detection signal Sev, the capacity shortage signal Scg and the agreement signal Ssm.

By constructing the charging system as above, the charging is not started unless the ID code from the vehicle E agrees with the ID code stored in advance in the ID code checking circuit 271. Accordingly, a possibility that the other's car parked in the parking space is charged, or the other's car is intruded into the parking space and charged without permission can securely be prevented.

What is claimed is:

1. A connection system for charging a battery (21) of an electric automotive vehicle (E) used to drive the vehicle (E), comprising: a primary coil (10) disposed externally of the vehicle (E) and being connectable with an external power source (11); a secondary coil (20) disposed on the vehicle (11) and being connectable with the battery (21), said secondary coil (20) being operative for generating an alternating magnetic field by being excited in a specified cycle; a plurality of magnetic sensors (50) concentrically disposed around said primary coil (10), said magnetic sensors (50) being equally spaced from one another, and each being operative for detecting intensity of the alternating magnetic field generated by the secondary coil (20); and coil moving means (30; 60; 70) for moving the primary coil (10) and the magnetic sensors (50) in unison until each of the magnetic sensors (50) detects a substantially identical intensity of magnetic field indicative of substantial registration of said primary and secondary coils, wherein the primary coil (10) is electromagnetically coupleable with the secondary coil (20) for inducing a current in the secondary coil (20).

2. A connection system according to claim 1, wherein the coil moving means (30; 43; 60; 70) has a driving device (36; 64) for moving the primary coil (10) to a desired position.

3. A connection system according to claim 2, further comprising a control means (12; 113) for controlling the driving device (36; 64) of the coil moving means (30; 60; 70) based on a detection result of the magnetic sensors (50) to position the primary coil (10) in a predeterminable positional relationship with respect to the secondary coil (20) and to guide the primary coil (10) to a position where the coils (10; 20) are to be electromagnetically coupled.

4. A connection system according to claim 2, wherein the coil moving means (30) comprises:

a body (40), on a ground of a parking area to support the primary coil (10),

X-axis driving means (31X–36X) for linearly moving the body (40) along a specified direction (X), and Y-axis driving means (31Y–36Y) for linearly moving the body (40) along a direction arranged at an angle different from 0° and 180° with respect to the moving direction (X) of the body (40) by the X-axis driving means (31X–36X).

5. A connection system according to claim 2, wherein the coil moving means (60) comprises:

a body (60) for supporting the primary coil (10), at least one wheel (62, 63) mounted on the body (60) to drive the body (60) on the ground, and driving mechanism (64), to drive the wheel (62, 63).

6. A connection system according to claim 2, wherein the primary coil (10) and the coil moving means (30; 43; 60; 70 are provided on a wall surface of a parking lot, the parking lot having a ground surface for supporting the vehicle (E), and the wall surface being substantially normal to the ground surface, the coil moving means moving the primary coil (10) along at least one direction, including a direction substantially parallel to the ground surface.

7. A connection system according to claim 6, wherein the coil moving means is provided on a coil positioning apparatus (280) supported by an elastic support means (290) on the wall surface (W), the elastic support means (290) allowing for an elastic positioning of the coil positioning apparatus (280) in dependence of a side wall portion of the vehicle (E), for achieving a connection of the primary and secondary coils (10; 20).

8. A connection system according to claim 2, wherein the coil moving means (30; 43; 60; 70) is selected from the group consisting of a pantograph mechanism (43), a ball screw mechanism and an fluid cylinder mechanism.

9. A connection system according to claim 1, wherein the at least one magnetic sensor (50a–50c) is selected from the group consisting of at least one coil, at least one Hall probe and at least one magnetoresistant device.

10. A connection system according to claim 1, wherein a charging control circuit (247) for controlling the exciting of the primary coil (10) comprises a remaining capacity detecting means (263) for detecting a remaining capacity of the battery (21), and means for exciting the primary coil (10) on condition that the remaining capacity detected by the remaining capacity detecting means (263) is not greater than a predetermined or predeterminable value.

11. A connection system according to claim 10, wherein a display means (260;262;241) for displaying a charging state corresponding to the remaining capacity of the battery (21) is provided.

12. A connection system according to claim 1, further comprising an identification code transmitting means (270) provided in connection with the secondary coil (20) in the vehicle (E), and an identification code checking means (271) is provided in connection with the primary coil (10) for comparing an identification code received from the identification code transmitting means (270) with a prestored identification code, wherein a charging control circuit (247) excites the primary coil (10) on condition that the identification codes compared by the identification code checking means (271) agree.

13. A connection system for charging a battery (21) of an electric automotive vehicle (E) used to drive the vehicle (E), comprising: a primary coil (10) spaced from the vehicle and connectable with an external power source (11), a secondary coil (20) mounted on the vehicle (E) and connectable with the battery (21), at least one wheel guide (160; 163) which is so provided as to have a predeterminable positional relationship with respect to the primary coil (10), at least one wheel of the vehicle (E) being guidable by the wheel guide (160; 163) to an electromagnetic connection position, where the secondary coil (20) of the vehicle (E) is electromagnetically connectable with the primary coil (10), switch means (150) in proximity to the wheel guide (160; 163) for generating a signal indicative of proper positioning of the vehicle (E) relative to the wheel guide (160; 163), and coil moving means (140, 141; 144, 145; 146, 147) responsive to activation of the switch means (150) for moving the primary coil (10) into coupling position relative to the secondary coil (20) for inducing a current in the secondary coil (20).

14. A connection system according to claim 13, further comprising:

a position adjusting apparatus (171; 173) for differing or adjusting relative positions of the wheel guide (160; 163) and the primary coil (10), and a vehicle type discriminating apparatus (180; 181) for discriminating a type of the vehicle (E) to be parked, wherein in particular the secondary coil (20) of the vehicle (E) and the primary coil (10) are guided to the electromagnetic connection position by driving the position adjusting apparatus (170; 171) in accordance with the vehicle type discriminated by the vehicle type discriminating apparatus (180; 181).

15. A connection method for charging a battery (21) of an electric automotive vehicle (E) used to drive the vehicle (E), comprising the steps of:

providing a primary coil (10) connected with an external power source (11) and a secondary coil (20) connected with a battery (21), the secondary coil being operative to generate an alternating magnetic field by being excited in a specified cycle, a plurality of magnetic sensors (50a–50c) being mounted concentrically around the primary coil (10) in fixed spaced relationship to one another, the magnetic sensors (50a–50c) each being operative for detecting the magnetic field intensity of the secondary coil (20);

exciting the secondary coil (20) at a specified frequency;

detecting magnetic field intensities from the secondary coil (20) with each of said magnetic sensors (50a–50c);

analyzing the detection signals of the magnetic sensors (50a–50c) for determining positional relationships (Ra–Rc) of each of said magnetic sensors (50a–50c) relative to said secondary coil (20);

automatically moving the primary coil (10) into a positional relationship where the detection signals of the magnetic sensors (50a–50c) are substantially equal to one another;

moving said positioned primary coil (20) toward the secondary coil (20) and into electromagnetic coupled engagement therewith; and inducing a current from the primary coil (10) in the secondary coil (20).

* * * * *